United States Patent
Moon et al.

(10) Patent No.: US 11,115,665 B2
(45) Date of Patent: Sep. 7, 2021

(54) METHOD AND DEVICE FOR ENCODING AND DECODING IMAGE SIGNAL

(71) Applicant: Industry Academy Cooperation Foundation of Sejong University, Seoul (KR)

(72) Inventors: Joo Hee Moon, Seoul (KR); Dong Jae Won, Goyang-si (KR); Sung Won Lim, Seoul (KR)

(73) Assignee: Industry Academy Cooperation Foundation of Sejong University, Seoul (KR)

( * ) Notice: Subject to any disclaimer, the term of this patent is extended or adjusted under 35 U.S.C. 154(b) by 0 days.

(21) Appl. No.: 16/860,112

(22) Filed: Apr. 28, 2020

(65) Prior Publication Data

US 2020/0260089 A1    Aug. 13, 2020

Related U.S. Application Data

(62) Division of application No. 16/097,464, filed as application No. PCT/KR2017/004465 on Apr. 26, 2017, now Pat. No. 10,681,353.

(30) Foreign Application Priority Data

Apr. 29, 2016  (KR) .......................... 10-2016-0052691
Apr. 29, 2016  (KR) .......................... 10-2016-0052694
(Continued)

(51) Int. Cl.
H04N 19/14    (2014.01)
H04N 19/11    (2014.01)
(Continued)

(52) U.S. Cl.
CPC .............. *H04N 19/14* (2014.11); *H04N 19/11* (2014.11); *H04N 19/176* (2014.11); *H04N 19/593* (2014.11)

(58) Field of Classification Search
USPC .................................................... 375/240.02
See application file for complete search history.

(56) References Cited

U.S. PATENT DOCUMENTS 9,491,463 B2    11/2016  Sole Rojals et al.
2007/0154090 A1   7/2007  Howard
(Continued)

FOREIGN PATENT DOCUMENTS

CN    102893604 A    1/2013
CN    104079935 A    10/2014
(Continued)

OTHER PUBLICATIONS

Sullivan, Gary et al., "Overview of the High Efficiency Video Coding (HEVC) Standard", *IEEE Transactions on Circuits and Systems for Video Technology*, vol. 22, No. 12, 2012 (pp. 1649-1668).
(Continued)

*Primary Examiner* — Patricia I Young
(74) *Attorney, Agent, or Firm* — NSIP Law

(57) ABSTRACT

A method for encoding image signal, according to the present invention, can: encode a partial block coefficient flag indicating whether a coefficient of a current partial block is a non-zero coefficient; encode a first flag indicating whether an absolute value of the coefficient is greater than 1, encode a second flag indicating whether the absolute value of the coefficient is greater than 2; encode the residual coefficients, which have not been encoded, on the basis of the first flag or the second flag in the current partial block; and encode a code for the coefficient of the current partial block.

9 Claims, 35 Drawing Sheets

(30) Foreign Application Priority Data

| | | | |
|---|---|---|---|
| Apr. 29, 2016 | (KR) | ........................ | 10-2016-0052706 |
| Apr. 18, 2017 | (KR) | ........................ | 10-2017-0050048 |
| Apr. 18, 2017 | (KR) | ........................ | 10-2017-0050050 |
| Apr. 18, 2017 | (KR) | ........................ | 10-2017-0050053 |

(51) Int. Cl.
*H04N 19/176* (2014.01)
*H04N 19/593* (2014.01)

(56) References Cited

U.S. PATENT DOCUMENTS

| | | |
|---|---|---|
| 2013/0272414 A1 | 10/2013 | Sole Rojals et al. |
| 2014/0003515 A1 | 1/2014 | Ohgose et al. |
| 2014/0219339 A1 | 8/2014 | Park |
| 2015/0030081 A1 | 1/2015 | Kim et al. |
| 2015/0117546 A1 | 4/2015 | Kim |
| 2015/0139297 A1 | 5/2015 | Kim |
| 2015/0189324 A1 | 7/2015 | Kim et al. |
| 2015/0245067 A1 | 8/2015 | Howard |
| 2015/0365692 A1 | 12/2015 | Liu et al. |
| 2019/0174128 A1 | 6/2019 | Jang et al. |

FOREIGN PATENT DOCUMENTS

| | | |
|---|---|---|
| CN | 104205832 A | 12/2014 |
| CN | 105007485 A | 10/2015 |
| JP | 2014-33460 A | 2/2014 |
| JP | 2014-96638 A | 5/2014 |
| KR | 10-2015-0009615 A | 1/2015 |
| KR | 10-2015-0037781 A | 4/2015 |
| WO | WO 2013/099892 A1 | 7/2013 |

OTHER PUBLICATIONS

United States Office Action dated Jan. 1, 2021 in counterpart U.S. Appl. No. 17/017,808 (15 pages in English).

Chinese Office Action dated Dec. 17, 2020 in counterpart Chinese Application No. 201780041200.3 (13 pages in English, 10 pages in Chinese).

Wiatr, Kazimierz et al. "Embedded Zero Wavelet Coefficient coding Method for FPGA Implementation of Video Codec in Real-Time Systems." Proceedings International Conference on Information Technology: Coding and Computing Institute of Electronics, AGH Technical University of Cracow, Poland, Aug. 2002 (6 pages in English).

Li Haihua Zhang Baoju (School of Physics and Electronic Information, Tianjin Normal University, Tianjin 300387), Explore the New Generation of Video Coding Standard H.264, 2008, 11 (1 page in English and 1 page in Chinese).

Notice of Allowance dated Jun. 28, 2021 in counterpart Chinese Patent Application No. 201780041200.3 (4 pages in English and 4 pages in Chinese).

Korean Office Action dated Jul. 21, 2021 in counterpart Korean Patent Application No. 10-2017-0050053 (3 pages in Korean).

"Standard Codes: Images Compression to Advanced Video Coding" China Academic Journal Electronics Publishing House, Nov. 2018 (1 page in English and 1 page in Chinese).

1.TYPES OF QUAD-TREE PARTITIONING: 2
(PARTITIONING×/HORIZONTAL,VERTICAL PARTITIONING½)→0,1

2.TYPES OF BINARY-TREE PARTITIONING: 7
(PARTITIONING×/HORIZONTAL¼HORIZONTAL½/HORIZONTAL¾/VERTICAL¼/
VERTICAL½/VERTICAL¾)→0,1,2,3,4,5,6

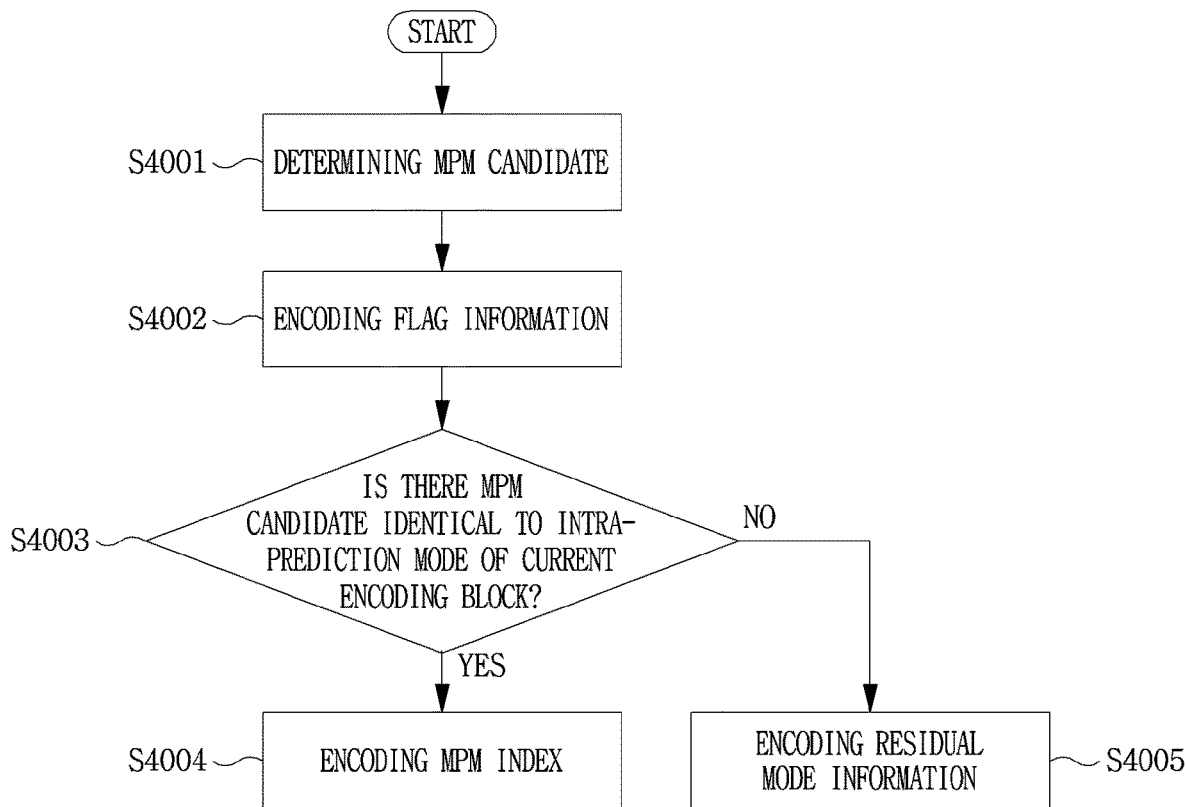

FIG. 44

| PRIORITY | MPM PREDICTION MODE CANDIDATE |
|---|---|
| 1 | NEIGHBORING BLOCK A → NEIGHBORING BLOCK B |
| 2 | Planar → DC |
| 3 | NEIGHBORING BLOCK C → NEIGHBORING BLOCK D → NEIGHBORING BLOCK E |
| 4 | WHEN THERE IS ANGULAR MODE AMONG CANDIDATES SO FAR, ANGULAR MODE CORRESPONDING TO ±1 OF EACH ANGULAR MODE |
| 5 | WHEN PREDETERMINED NUMBER OF CANDIDATES NOT REACHED, ADD MPM CANDIDATES IN ORDER OF VERTICAL, HORIZONTAL, MODE 2, DIAGONAL PREDICTION MODE UNTIL REACHING PREDETERMINED NUMBER OF CANDIDATES |

FIG. 45

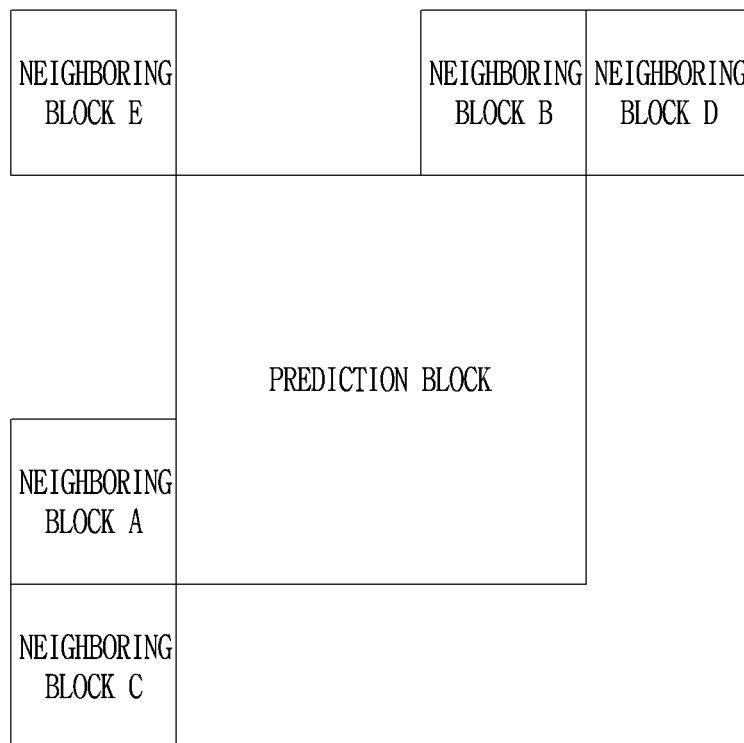

METHOD AND DEVICE FOR ENCODING AND DECODING IMAGE SIGNAL

This application is a divisional application of U.S. patent application Ser. No. 16/097,464 filed on Oct. 29, 2018, which is a U.S. National Stage Application of International Application No. PCT/KR2017/004465, filed on Apr. 26, 2017, which claims the benefit under 35 USC 119(a) and 365(b) of Korean Patent Application No. 10-2016-0052691, filed on Apr. 29, 2016, Korean Patent Application No. 10-2016-0052694, filed on Apr. 29, 2016, Korean Patent Application No. 10-2016-0052706, filed on Apr. 29, 2016, Korean Patent Application No. 10-2017-0050048, filed on Apr. 18, 2017, Korean Patent Application No. 10-2017-0050050, filed on Apr. 18, 2017, Korean Patent Application No. 10-2017-0050053, filed on Apr. 18, 2017 in the Korean Intellectual Property Office.

TECHNICAL FIELD

The present invention relates to a method and an apparatus for encoding and decoding image signal.

BACKGROUND ART

Recently, demands for multimedia data such as video have been rapidly increasing on internet. However, developing rate of bandwidths of channels is hard to follow the amount of multimedia data that is rapidly increasing.

DISCLOSURE

Technical Problem

An object of the present invention is to improve compression efficiency of an image by efficiently encoding/decoding coefficients in a partial block.

An object of the present invention is to improve compression efficiency of an image by efficiently encoding/decoding partitioning method of a target encoding/decoding block in encoding/decoding an image.

An object of the present invention is to improve compression efficiency of an image by efficiently encoding/decoding intra-prediction mode information of a target encoding/decoding block in encoding/decoding an image.

Technical Solution

A method and an apparatus for encoding an image signal according to the present invention may encode a partial block coefficient flag indicating whether a coefficient of a current partial block is a non-zero coefficient; encode a first flag indicating whether an absolute value of the coefficient is greater than 1; encode a second flag indicating whether an absolute value of the coefficient is greater than 2; encode a residual coefficient not encoded based on the first flag or the second flag in the current partial block; and encode a sign for the coefficient of the current partial block.

A method and an apparatus for encoding an image signal according to the present invention may encode a maximum value among absolute values of coefficients of the current partial block.

A method and an apparatus for encoding an image signal according to the present invention may determine whether absolute values of all coefficients in the current partial block is smaller than a current threshold value; and encoding a first threshold value flag for the current partial block based on a result of the determination.

In a method and an apparatus for encoding an image signal according to the present invention, when the absolute values of all coefficients in the current partial block is greater than or equal to the current threshold value, the first threshold value flag may be encoded as false, and when the absolute values of all coefficients in the current partial block is smaller than the current threshold value, the first threshold value flag may be encoded as true.

In a method and an apparatus for encoding an image signal according to the present invention, when the first threshold value flag is encoded as false, the current threshold value may be updated to a next threshold value.

In a method and an apparatus for encoding an image signal according to the present invention, at least one of the first flag or the second flag may be selectively encoded according to a value of the first threshold value flag.

In a method and an apparatus for encoding an image signal according to the present invention, the current threshold value may be a threshold value belonging to a predetermined threshold value range.

In a method and an apparatus for encoding an image signal according to the present invention, the predetermined threshold value may be determined based on at least one of a quantization parameter, a block size or a pixel value range.

A method and an apparatus for decoding an image signal according to the present invention may decode a partial block coefficient flag indicating whether a coefficient of a current partial block is a non-zero coefficient; decode a first flag indicating whether an absolute value of the coefficient is greater than 1; decode a second flag indicating whether an absolute value of the coefficient is greater than 2; decode a residual coefficient not encoded based on the first flag or the second flag in the current partial block; and decode a sign for the coefficient of the current partial block.

A method and an apparatus for decoding an image signal according to the present invention may decode a maximum value among absolute values of coefficients of the current partial block.

A method and an apparatus for decoding an image signal according to the present invention may decode a first threshold value flag for the current partial block.

In a method and an apparatus for decoding an image signal according to the present invention, when the first threshold value flag is false, absolute values of all coefficients in the current partial block may be greater than or equal to the current threshold value, and when the first threshold flag is true, the absolute values of all coefficients in the current partial block may be smaller than the current threshold value.

In a method and an apparatus for decoding an image signal according to the present invention, when the first threshold value flag is false, the current threshold value may be updated to a next threshold value.

In a method and an apparatus for decoding an image signal according to the present invention, at least one of the first flag or the second flag may be selectively decoded according to a value of the first threshold value flag.

In a method and an apparatus for decoding an image signal according to the present invention, the current threshold value may be a threshold value belonging to a predetermined threshold value range, and In a method and an apparatus for decoding an image signal according to the present invention, the predetermined threshold value may be determined based on at least one of a quantization parameter, a block size or a pixel value range.

A method and an apparatus for encoding an image signal according to the present invention may encode a partial block flag indicating whether at least one non-zero coefficient exists in a current partial block; encode a partial block coefficient flag indicating whether a current coefficient of the current partial block is the non-zero coefficient; encode an absolute value of the current coefficient of the current partial block; and encode a sign of the current coefficient of the current partial block.

In a method and an apparatus for encoding an image signal according to the present invention, the partial block coefficient flag may be encoded based on the number of non-zero coefficients in a previous partial block.

In a method and an apparatus for encoding an image signal according to the present invention, the encoding the partial block coefficient flag may include changing probability information of the partial block coefficient flag based on the number of non-zero coefficients in the previous partial block.

In a method and an apparatus for encoding an image signal according to the present invention, the partial block coefficient flag may be encoded based on the number of non-zero coefficients up to a previous coefficient in the current partial block.

In a method and an apparatus for encoding an image signal according to the present invention, the encoding the partial block coefficient flag may include changing probability information of the partial block coefficient flag based on the number of non-zero coefficients up to the previous coefficient.

A method and an apparatus for decoding an image signal according to the present invention may decode a partial block flag indicating whether at least one non-zero coefficient exists in a current partial block; decode a partial block coefficient flag indicating whether a current coefficient of the current partial block is the non-zero coefficient; decode an absolute value of the current coefficient of the current partial block; and decode a sign of the current coefficient of the current partial block.

In a method and an apparatus for decoding an image signal according to the present invention, the partial block coefficient flag may be decoded based on the number of non-zero coefficients in a previous partial block.

In a method and an apparatus for decoding an image signal according to the present invention, the decoding the partial block coefficient flag may include changing probability information of the partial block coefficient flag based on the number of non-zero coefficients in the previous partial block.

In a method and an apparatus for decoding an image signal according to the present invention, the partial block coefficient flag may be decoded based on the number of non-zero coefficients up to a previous coefficient in the current partial block.

In a method and an apparatus for decoding an image signal according to the present invention, the decoding the partial block coefficient flag may include changing probability information of the partial block coefficient flag based on the number of non-zero coefficients up to the previous coefficient.

A method and an apparatus for decoding an image signal according to the present invention may decode partitioning information indicating whether a current decoding block is partitioned into two partial blocks, and when the partitioning information indicates that the current decoding block is partitioned into two partial blocks, decode information on a pattern of partitioning of the current decoding block, and partition the current decoding block into two partial blocks based on the information on the pattern of partitioning.

In a method and an apparatus for decoding an image signal according to the present invention, the information on the pattern of partitioning may include at least one of direction information indicating a partitioning direction of the current decoding block or information of degree of precision that specifies a size of a partial block generated by partitioning the current decoding block.

In a method and an apparatus for decoding an image signal according to the present invention, a horizontal length or a vertical length of the partial block may have a value of dividing the horizontal length or the vertical length of the decoding block by 2 to the power ($2^N$) of a value (N) specified by the information of degree of precision.

In a method and an apparatus for decoding an image signal according to the present invention, the information on the pattern of partitioning may include index information specifying a partitioned shape of the current decoding block.

A method and an apparatus for decoding an image signal according to the present invention may determine an MPM (Most Probable Mode) candidate for a current decoding block based on an intra-prediction mode of a neighboring block neighboring the current decoding block; decode information indicating whether an MPM candidate identical to an intra-prediction mode of the current decoding block exists; and derive the intra-prediction mode of the current decoding block based on the information.

In a method and an apparatus for decoding an image signal according to the present invention, the number of intra-prediction modes available for the current decoding block may be variably determined depending on a size of the current decoding block, a shape of the current decoding block or an intra-prediction mode of the neighboring block.

In a method and an apparatus for decoding an image signal according to the present invention, when the number of intra-prediction modes available for the current decoding block is different from the number of intra-prediction modes available for the neighboring block, an MPM candidate corresponding to a directional prediction mode may be set as a prediction angle of the directional prediction mode.

A method and an apparatus for encoding an image signal according to the present invention may determine whether a current encoding block is partitioned into two partial blocks; encode partitioning information indicating whether the current encoding block is partitioned into two partial blocks according to a result of the determination; when the current encoding block is determined to be partitioned into two partial blocks, determine a pattern of partitioning of the current encoding block; and encode information for the pattern of partitioning of the current encoding block based on the determination.

In a method and an apparatus for encoding an image signal according to the present invention, the information on the pattern of partitioning may include at least one of direction information indicating a partitioning direction of the current encoding block or information of degree of precision that specifies a size of a partial block generated by partitioning the current encoding block.

In a method and an apparatus for encoding an image signal according to the present invention, a horizontal length or a vertical length of the partial block may have a value of dividing the horizontal length or the vertical length of the encoding block by 2 to the power ($2^N$) of a value (N) specified by the information of degree of precision.

In a method and an apparatus for encoding an image signal according to the present invention, the information on the pattern of partitioning may include index information specifying a partitioned shape of the current encoding block.

A method and an apparatus for encoding an image signal according to the present invention may determine an MPM (Most Probable Mode) candidate for a current encoding block based on an intra-prediction mode of a neighboring block neighboring the current encoding block; determine an intra-prediction mode of the current encoding block; encode information indicating whether an MPM candidate identical to the intra-prediction mode of the current encoding block exists.

In a method and an apparatus for encoding an image signal according to the present invention, the number of intra-prediction modes available for the current encoding block may be variably determined depending on a size of the current encoding block, a shape of the current encoding block or an intra-prediction mode of the neighboring block.

In a method and an apparatus for encoding an image signal according to the present invention, when the number of intra-prediction modes available for the current encoding block is different from the number of intra-prediction modes available for the neighboring block, an MPM candidate corresponding to a directional prediction mode may be set as a prediction angle of the directional prediction mode.

Advantageous Effects

According to the present invention, compression efficiency of an image may be improved by efficiently encoding/decoding coefficients in a partial block.

According to the present invention, compression efficiency of an image may be improved by efficiently encoding/decoding partitioning method of a target encoding/decoding block in encoding/decoding an image.

According to the present invention, compression efficiency of an image may be improved by efficiently encoding/decoding intra-prediction mode information of a target encoding/decoding block in encoding/decoding an image.

DESCRIPTION OF DRAWINGS

FIG. 40 is a flowchart illustrating a procedure of encoding an optimal intra-prediction mode for a current encoding block.

FIG. 41 is a diagram illustrating an example of setting an MPM candidate.

FIG. 44 is a diagram illustrating another example of setting an MPM candidate.

FIG. 45 is a diagram illustrating an example of neighboring blocks used to derive an MPM candidate of a current encoding block.

BEST MODE

Figure 1:
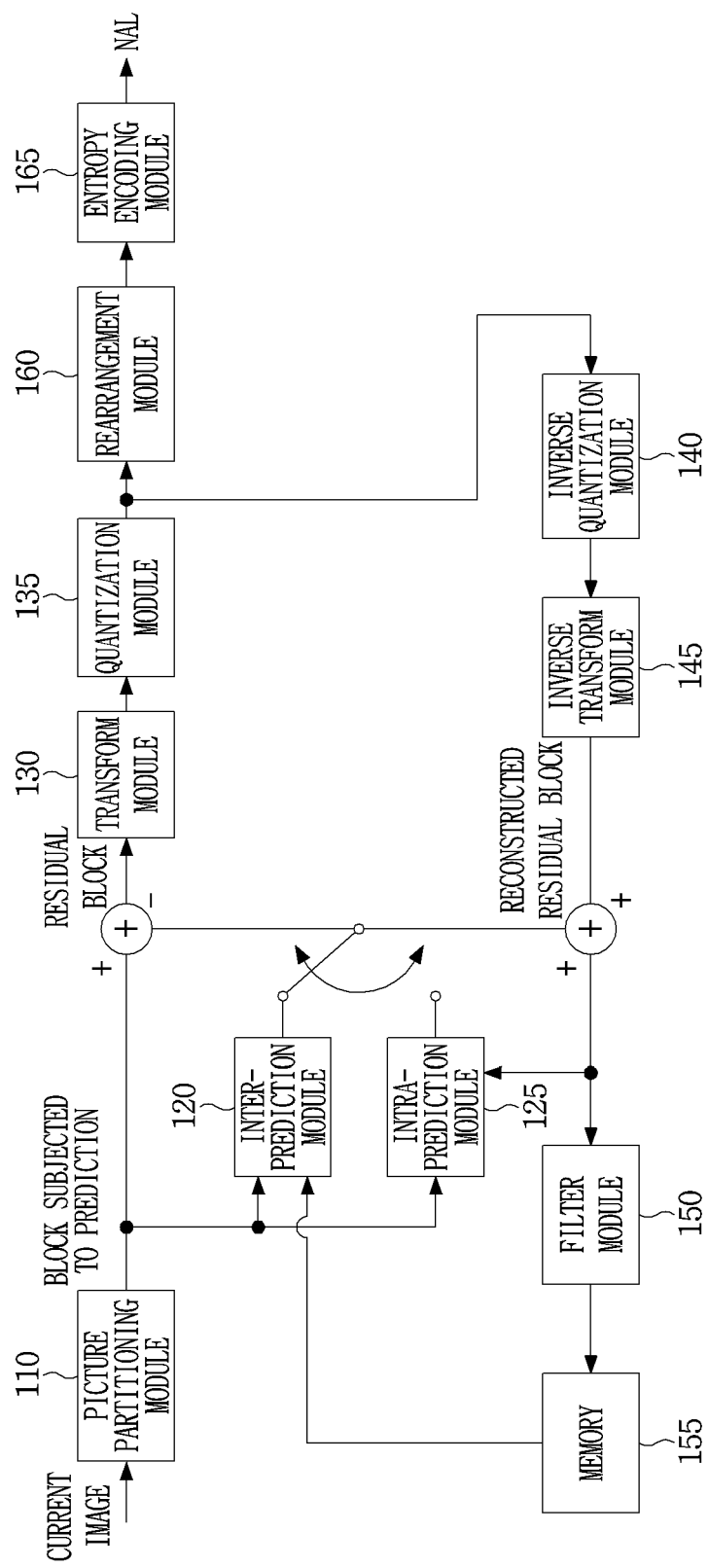
FIG. 1 is a block diagram illustrating a device for encoding image according to an embodiment of the present invention.

A method and an apparatus for encoding an image signal according to the present invention may encode a partial block coefficient flag indicating whether a coefficient of a current partial block is a non-zero coefficient; encode a first flag indicating whether an absolute value of the coefficient is greater than 1; encode a second flag indicating whether an absolute value of the coefficient is greater than 2; encode a residual coefficient not encoded based on the first flag or the second flag in the current partial block; and encode a sign for the coefficient of the current partial block.

A method and an apparatus for encoding an image signal according to the present invention may encode a maximum value among absolute values of coefficients of the current partial block.

A method and an apparatus for encoding an image signal according to the present invention may determine whether absolute values of all coefficients in the current partial block is smaller than a current threshold value; and encoding a first threshold value flag for the current partial block based on a result of the determination.

In a method and an apparatus for encoding an image signal according to the present invention, when the absolute values of all coefficients in the current partial block is greater than or equal to the current threshold value, the first threshold value flag may be encoded as false, and when the absolute values of all coefficients in the current partial block is smaller than the current threshold value, the first threshold value flag may be encoded as true.

In a method and an apparatus for encoding an image signal according to the present invention, when the first threshold value flag is encoded as false, the current threshold value may be updated to a next threshold value.

In a method and an apparatus for encoding an image signal according to the present invention, at least one of the first flag or the second flag may be selectively encoded according to a value of the first threshold value flag.

In a method and an apparatus for encoding an image signal according to the present invention, the current threshold value may be a threshold value belonging to a predetermined threshold value range.

In a method and an apparatus for encoding an image signal according to the present invention, the predetermined threshold value may be determined based on at least one of a quantization parameter, a block size or a pixel value range.

A method and an apparatus for decoding an image signal according to the present invention may decode a partial block coefficient flag indicating whether a coefficient of a current partial block is a non-zero coefficient; decode a first flag indicating whether an absolute value of the coefficient is greater than 1; decode a second flag indicating whether an absolute value of the coefficient is greater than 2; decode a residual coefficient not encoded based on the first flag or the second flag in the current partial block; and decode a sign for the coefficient of the current partial block.

A method and an apparatus for decoding an image signal according to the present invention may decode a maximum value among absolute values of coefficients of the current partial block.

A method and an apparatus for decoding an image signal according to the present invention may decode a first threshold value flag for the current partial block.

In a method and an apparatus for decoding an image signal according to the present invention, when the first threshold value flag is false, absolute values of all coefficients in the current partial block may be greater than or equal to the current threshold value, and when the first threshold flag is true, the absolute values of all coefficients in the current partial block may be smaller than the current threshold value.

In a method and an apparatus for decoding an image signal according to the present invention, when the first threshold value flag is false, the current threshold value may be updated to a next threshold value.

In a method and an apparatus for decoding an image signal according to the present invention, at least one of the first flag or the second flag may be selectively decoded according to a value of the first threshold value flag.

In a method and an apparatus for decoding an image signal according to the present invention, the current threshold value may be a threshold value belonging to a predetermined threshold value range, and In a method and an apparatus for decoding an image signal according to the present invention, the predetermined threshold value may be determined based on at least one of a quantization parameter, a block size or a pixel value range.

A method and an apparatus for encoding an image signal according to the present invention may encode a partial block flag indicating whether at least one non-zero coefficient exists in a current partial block; encode a partial block coefficient flag indicating whether a current coefficient of the current partial block is the non-zero coefficient; encode an absolute value of the current coefficient of the current partial block; and encode a sign of the current coefficient of the current partial block.

In a method and an apparatus for encoding an image signal according to the present invention, the partial block coefficient flag may be encoded based on the number of non-zero coefficients in a previous partial block.

In a method and an apparatus for encoding an image signal according to the present invention, the encoding the partial block coefficient flag may include changing probability information of the partial block coefficient flag based on the number of non-zero coefficients in the previous partial block.

In a method and an apparatus for encoding an image signal according to the present invention, the partial block coefficient flag may be encoded based on the number of non-zero coefficients up to a previous coefficient in the current partial block.

In a method and an apparatus for encoding an image signal according to the present invention, the encoding the partial block coefficient flag may include changing probability information of the partial block coefficient flag based on the number of non-zero coefficients up to the previous coefficient.

A method and an apparatus for decoding an image signal according to the present invention may decode a partial block flag indicating whether at least one non-zero coefficient exists in a current partial block; decode a partial block coefficient flag indicating whether a current coefficient of the current partial block is the non-zero coefficient; decode an absolute value of the current coefficient of the current partial block; and decode a sign of the current coefficient of the current partial block.

In a method and an apparatus for decoding an image signal according to the present invention, the partial block coefficient flag may be decoded based on the number of non-zero coefficients in a previous partial block.

In a method and an apparatus for decoding an image signal according to the present invention, the decoding the partial block coefficient flag may include changing probability information of the partial block coefficient flag based on the number of non-zero coefficients in the previous partial block.

In a method and an apparatus for decoding an image signal according to the present invention, the partial block coefficient flag may be decoded based on the number of non-zero coefficients up to a previous coefficient in the current partial block.

In a method and an apparatus for decoding an image signal according to the present invention, the decoding the partial block coefficient flag may include changing probability information of the partial block coefficient flag based on the number of non-zero coefficients up to the previous coefficient.

A method and an apparatus for decoding an image signal according to the present invention may decode partitioning information indicating whether a current decoding block is partitioned into two partial blocks, and when the partitioning information indicates that the current decoding block is partitioned into two partial blocks, decode information on a pattern of partitioning of the current decoding block, and partition the current decoding block into two partial blocks based on the information on the pattern of partitioning.

In a method and an apparatus for decoding an image signal according to the present invention, the information on the pattern of partitioning may include at least one of direction information indicating a partitioning direction of the current decoding block or information of degree of precision that specifies a size of a partial block generated by partitioning the current decoding block.

In a method and an apparatus for decoding an image signal according to the present invention, a horizontal length or a vertical length of the partial block may have a value of dividing the horizontal length or the vertical length of the decoding block by 2 to the power ($2^N$) of a value (N) specified by the information of degree of precision.

In a method and an apparatus for decoding an image signal according to the present invention, the information on the pattern of partitioning may include index information specifying a partitioned shape of the current decoding block.

A method and an apparatus for decoding an image signal according to the present invention may determine an MPM (Most Probable Mode) candidate for a current decoding block based on an intra-prediction mode of a neighboring block neighboring the current decoding block; decode information indicating whether an MPM candidate identical to an intra-prediction mode of the current decoding block exists; and derive the intra-prediction mode of the current decoding block based on the information.

In a method and an apparatus for decoding an image signal according to the present invention, the number of intra-prediction modes available for the current decoding block may be variably determined depending on a size of the current decoding block, a shape of the current decoding block or an intra-prediction mode of the neighboring block.

In a method and an apparatus for decoding an image signal according to the present invention, when the number of intra-prediction modes available for the current decoding block is different from the number of intra-prediction modes available for the neighboring block, an MPM candidate corresponding to a directional prediction mode may be set as a prediction angle of the directional prediction mode.

A method and an apparatus for encoding an image signal according to the present invention may determine whether a current encoding block is partitioned into two partial blocks; encode partitioning information indicating whether the current encoding block is partitioned into two partial blocks according to a result of the determination; when the current encoding block is determined to be partitioned into two partial blocks, determine a pattern of partitioning of the current encoding block; and encode information for the pattern of partitioning of the current encoding block based on the determination.

In a method and an apparatus for encoding an image signal according to the present invention, the information on the pattern of partitioning may include at least one of direction information indicating a partitioning direction of the current encoding block or information of degree of precision that specifies a size of a partial block generated by partitioning the current encoding block.

In a method and an apparatus for encoding an image signal according to the present invention, a horizontal length or a vertical length of the partial block may have a value of dividing the horizontal length or the vertical length of the encoding block by 2 to the power ($2^N$) of a value (N) specified by the information of degree of precision.

In a method and an apparatus for encoding an image signal according to the present invention, the information on the pattern of partitioning may include index information specifying a partitioned shape of the current encoding block.

A method and an apparatus for encoding an image signal according to the present invention may determine an MPM (Most Probable Mode) candidate for a current encoding block based on an intra-prediction mode of a neighboring block neighboring the current encoding block; determine an intra-prediction mode of the current encoding block; encode information indicating whether an MPM candidate identical to the intra-prediction mode of the current encoding block exists.

In a method and an apparatus for encoding an image signal according to the present invention, the number of intra-prediction modes available for the current encoding block may be variably determined depending on a size of the current encoding block, a shape of the current encoding block or an intra-prediction mode of the neighboring block.

In a method and an apparatus for encoding an image signal according to the present invention, when the number of intra-prediction modes available for the current encoding block is different from the number of intra-prediction modes available for the neighboring block, an MPM candidate corresponding to a directional prediction mode may be set as a prediction angle of the directional prediction mode.

MODE FOR INVENTION

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding image according to an embodiment of the present invention.

Referring to 1, an image encoding device 100 may include a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the image encoding device, and it does not mean that each constitutional part is constituted in a constitutional unit of separated hardware or software. In other words, each constitutional part includes each of enumerated constitutional parts for convenience, and at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be optional constituents improving only performance thereof. The present invention may be implemented by including only the indispensable constitutional parts for implementing the essence of the present invention except the constituents used in improving performance. The structure including only the indispensable constituents except the optional constituents used in improving only performance is also included in the scope of the present invention.

The picture partitioning module 110 may partition an input picture into at least one block. Here, a block may mean a coding unit (CU), a prediction unit (PU), or a transform unit (TU). The partitioning may be performed based on at least one of a quad tree or a binary tree. A quad tree is a method of partitioning an upper-level block into four lower-level blocks whose width and height are half of the upper-level block. A binary tree is a method of partitioning an upper-level block into two lower-level blocks whose width or height is half of the upper-level block. Using the binary tree-based partitioning, a block may have a square shape as well as a non-square shape.

Hereinafter, in embodiments of the present invention, a coding unit may be used as a unit for performing encoding, or may be used as a unit for performing decoding.

The prediction modules 120 and 125 may include an inter-prediction module 120 for performing inter-prediction and an intra-prediction module 125 for performing intra-prediction. Whether to perform inter-prediction or intra-prediction for a prediction unit may be determined, and specific information (e.g., intra-prediction mode, motion vector, reference picture, etc.) according to each prediction method may be determined. Here, a processing unit subjected to prediction may be different from a processing unit for which a prediction method and specific contents are determined. For example, a prediction method, a prediction mode and the like may be determined in units of prediction unit, and a prediction may be performed in units of transform unit.

A residual value (residual block) between the generated prediction block and an original block may be input to the transform module 130. Also, prediction mode information, motion vector information and the like used for prediction may be encoded with the residual value by the entropy encoding module 165 and may be transmitted to a decoding device. When a particular encoding mode is used, it is possible to transmit to a decoding device by encoding the original block as it is without generating the prediction block through the prediction modules 120 and 125.

The inter-prediction module 120 may predict the prediction unit based on information of at least one of a previous picture or a subsequent picture of the current picture, or may predict the prediction unit based on information of some encoded regions in the current picture, in some cases. The inter-prediction module 120 may include a reference picture interpolation module, a motion prediction module, and a motion compensation module.

The reference picture interpolation module may receive reference picture information from the memory 155 and may generate pixel information of an integer pixel or less than the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on a reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an Advanced Motion Vector Prediction (AMVP) method, etc., may be used.

The intra prediction module 125 may generate a prediction unit based on reference pixel information neighboring to a current block which is pixel information in the current picture. When the neighboring block of the current prediction unit is a block subjected to inter-prediction and thus a reference pixel is a pixel subjected to inter-prediction, the reference pixel included in the block subjected to inter-prediction may be replaced with reference pixel information of a neighboring block subjected to intra-prediction. That is, when a reference pixel is not available, at least one reference pixel of available reference pixels may be used instead of unavailable reference pixel information.

Prediction modes in intra-prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra-prediction mode information used to predict luma information or predicted luma signal information may be utilized.

In the intra-prediction method, a prediction block may be generated after applying an Adaptive Intra Smoothing (AIS) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information, and when the prediction mode of the current prediction unit is different from the prediction mode of the neighboring prediction unit, entropy encoding may be performed to encode prediction mode information of the current block.

Also, a residual block including information on a residual value which is a difference between the prediction unit subjected to prediction and the original block of the prediction unit may be generated based on prediction units generated by the prediction modules 120 and 125. The generated residual block may be input to the transform module 130.

The transform module 130 may transform the residual block including residual data using a transform method, such as discrete cosine transform (DCT), discrete sine transform (DST), and Karhunen Loeve Transform (KLT). Here, a transform method may be determined based on intra-prediction mode of the prediction unit used to generate the residual block. For example, depending on intra-prediction mode, DCT may be used for horizontal direction and DST may be used for vertical direction.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The transform module unit 130 and/or the quantization module 135 may be selectively included in the image encoding device 100. That is, the image encoding device 100 may perform at least one of transformation or quantization on the residual data of the residual block, or may skip both the transformation and the quantization, thereby encoding the residual block. A block provided as an input of the entropy encoding module 165 is generally referred to as a transform block even though either the transformation or the quantization is not performed or both the transformation and the quantization are not performed in the image encoding device 100.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a predetermined scanning method so as to change the coefficients to be in the form of one-dimensional vectors.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode various information, such as residual value coefficient information and block type information of the coding unit, prediction mode information, partition unit information, prediction unit information and transmit unit information, motion vector information, reference frame information, interpolation information of a block, filtering information, etc. from the rearrangement module 160 and the prediction modules 120 and 125. In the entropy encoding module 165, the coefficient of the transform block may be encoded, in units of partial block in a transform block, as a non-zero coefficient, a coefficient whose absolute value is larger than 1 or 2, and various types of flags indicating a sign of a coefficient, etc. The coefficient that is not encoded with only the flag may be encoded through the absolute value of the difference between the coefficient encoded through the flag and the coefficient of the actual transform block. A method of encoding the coefficients of the transform block will be described in detail with reference to FIG. 3 and FIG. 12.

The entropy encoding module 165 may entropy encode coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra-prediction module included in the prediction modules 120 and 125 so as to generate a reconstructed block.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns included in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU), and the shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150, and the stored reconstructed block or picture may be provided to the prediction modules 120 and 125 in performing inter-prediction.

Figure 2:
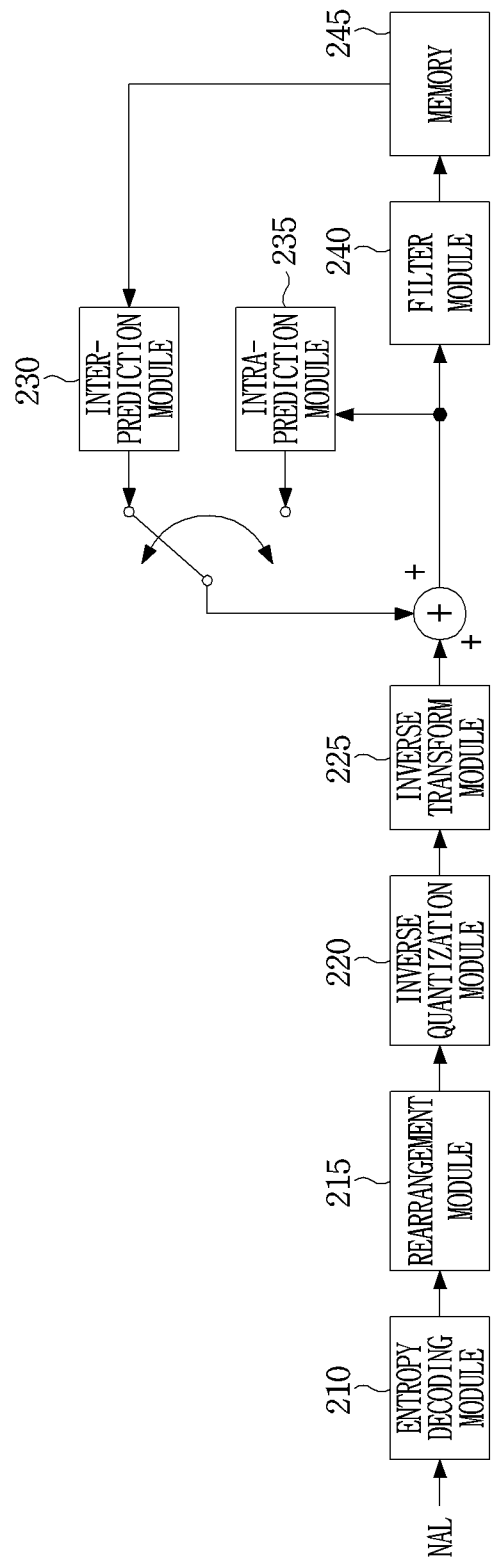
FIG. 2 is a block diagram illustrating a device for decoding an image according to an embodiment of the present invention.

FIG. 2 is a block diagram illustrating a device for decoding an image according to an embodiment of the present invention.

Referring to FIG. 2, the image decoding device 200 may include an entropy decoding module 210, a rearrangement module 215, an inverse quantization module 220, an inverse transform module 225, prediction modules 230 and 235, a filter module 240, and a memory 245.

When an image bitstream is input from the image encoding device, the input bitstream may be decoded according to an inverse process of the image encoding device.

The entropy decoding module 210 may perform entropy decoding according to an inverse process of entropy encoding by the entropy encoding module of the image encoding device. For example, corresponding to the methods performed by the image encoding device, various methods, such as exponential Golomb coding, context-adaptive variable length coding (CAVLC), and context-adaptive binary arithmetic coding (CABAC) may be applied. In the entropy decoding module 210, the coefficient of the transform block may be decoded, in units of partial block in a transform block, based on a non-zero coefficient, a coefficient whose absolute value is larger than 1 or 2, and various types of flags indicating a sign of a coefficient, etc. The coefficient that is not represented by only the flag may be decoded through combination of coefficient represented by the flag and coefficient that is signaled. A method of decoding the coefficients of the transform block will be described in detail with reference to FIG. 7 and FIG. 14.

The entropy decoding module 210 may decode information on intra-prediction and inter-prediction performed by the image encoding device.

The rearrangement module 215 may perform rearrangement on the bitstream entropy decoded by the entropy decoding module 210 based on the rearrangement method used in the image encoding device. The rearrangement may include reconstructing and rearranging the coefficients in the form of one-dimensional vectors to the coefficient in the form of two-dimensional blocks. The rearrangement module 215 may receive information related to coefficient scanning performed in the image encoding device and may perform rearrangement via a method of inversely scanning the coefficients based on the scanning order performed in the image encoding device.

The inverse quantization module 220 may perform inverse quantization based on a quantization parameter received from the image encoding device and the rearranged coefficients of the block.

The inverse transform module 225 may perform the inverse transform of the inverse quantized transform coefficients according to a predetermined transform method. Here, the transform method may be determined based on a prediction method (inter/intra-prediction), a size/shape of a block, information on intra-prediction mode, etc.

The prediction modules 230 and 235 may generate a prediction block based on information on prediction block generation received from the entropy decoding module 210 and previously decoded block or picture information received from the memory 245.

The prediction modules 230 and 235 may include a prediction unit determination module, an inter-prediction module, and an intra-prediction module. The prediction unit determination module may receive various information, such as prediction unit information, prediction mode information of an intra-prediction method, information on motion prediction of an inter-prediction method, etc. from the entropy decoding module 210, may divide a current coding unit into prediction units, and may determine whether inter-prediction or intra-prediction is performed on the prediction unit. By using information required in inter-prediction of the current prediction unit received from the image encoding device, the inter-prediction module 230 may perform inter-prediction on the current prediction unit based on information of at least one of a previous picture or a subsequent picture of the current picture including the current prediction unit. Alternatively, inter-prediction may be performed based on information of some pre-reconstructed regions in the current picture including the current prediction unit.

In order to perform inter-prediction, it may be determined for the coding unit which of a skip mode, a merge mode, an AMVP mode, and an inter block copy mode is used as the motion prediction method of the prediction unit included in the coding unit.

The intra-prediction module 235 may generate a prediction block based on pixel information in the current picture. When the prediction unit is a prediction unit subjected to intra-prediction, intra-prediction may be performed based on intra-prediction mode information of the prediction unit received from the image encoding device. The intra-prediction module 235 may include an adaptive intra smoothing (AIS) filter, a reference pixel interpolation module, a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the image encoding device. When the prediction mode of the current block is a mode where AIS filtering is not performed, the AIS filter may not be applied.

When the prediction mode of the prediction unit is a prediction mode in which intra-prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, the ALF.

Information on whether or not the deblocking filter is applied to the corresponding block or picture and information on which of a strong filter and a weak filter is applied when the deblocking filter is applied may be received from the image encoding device. The deblocking filter of the image decoding device may receive information on the deblocking filter from the image encoding device, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the image encoding device. The ALF information may be provided as being included in a particular parameter set.

The memory 245 may store the reconstructed picture or block for use as a reference picture or block, and may provide the reconstructed picture to an output module.

Figure 3:
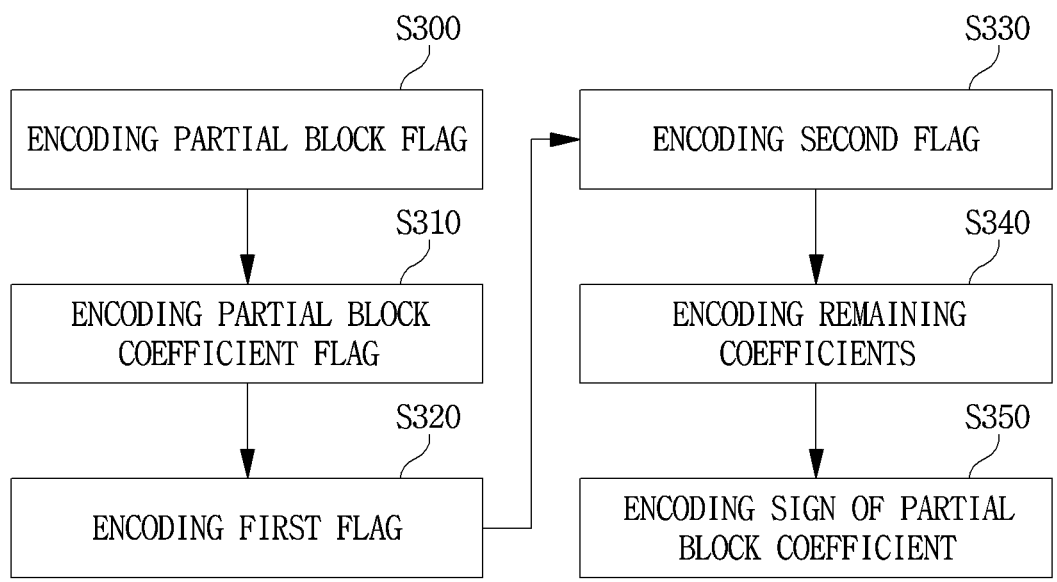
FIG. 3 is a diagram illustrating a method for encoding coefficients of a transform block as an embodiment to which the present invention is applied.

FIG. 3 is a diagram illustrating a method for encoding coefficients of a transform block as an embodiment to which the present invention is applied.

A coefficient of a transform block may be encoded in units of a predetermined block (hereinafter, referred to as a partial block) in an image encoding device. A transform block may include one or more partial blocks. A partial block may be a block of N×M size. Here, N and M are natural numbers, and N and M may be equal to or different from each other. That is, a partial block may be a square or a non-square block. A size/shape of a partial block may be fixed (e.g., 4×4) predefined in an image encoding device, or may be variably determined depending on a size/shape of a transform block. Alternatively, an image encoding device may determine an optimal size/shape of a partial block in consideration of an encoding efficiency, and encode the partial block. Information on a size/shape of an encoded partial block may be signaled in a level of at least one of a sequence, a picture, a slice or a block.

An order of encoding partial blocks included in a transform block may be determined according to a predetermined scan type (hereinafter, referred to as a first scan type) in an image encoding device. In addition, an order of encoding coefficients included in a partial block may be determined according to a predetermined scan type (hereinafter, referred to as a second scan type). The first scan type and the second scan type may be the same or different. For the first/second scan type, a diagonal scan, a vertical scan, or a horizontal scan and the like may be used. However, the present invention is not limited thereto, and one or more scan types having predetermined angles may be further added. The first/second scan type may be determined based on at least one of coding block related information (e.g., maximum/minimum size, partitioning technique, etc.), size/shape of transform block, size/shape of partial block, prediction mode, intra-prediction related information (e.g., a value of intra-prediction mode, directionality, angle, etc.) or inter-prediction related information.

An image encoding device may encode, in a transform block, position information of a coefficient (hereinafter, referred to as a non-zero coefficient) having non-zero value first appeared in the above-described encoding order. Encoding may be performed sequentially from a partial block including the non-zero coefficient. Hereinafter, referring to FIG. 3, a procedure of encoding coefficients of a partial block will be described.

A partial block flag for a current partial block may be encoded (S300). The partial block flag may be encoded in units of a partial block. The partial block flag may indicate whether there is at least one non-zero coefficient in the current partial block. For example, when the partial block flag is a first value, it may indicate that the current partial block includes at least one non-zero coefficient, and when the partial block flag is a second value, it may indicate that all coefficients of the current partial block are 0.

A partial block coefficient flag for a current partial block may be encoded (S310). The partial block coefficient flag may be encoded in units of a coefficient. The partial block coefficient flag may indicate whether a coefficient is a non-zero coefficient. For example, when the coefficient is a non-zero coefficient, the partial block coefficient flag may be encoded to a first value, and when the coefficient is zero, the partial block coefficient flag may be encoded to a second value. The partial block coefficient flag may be selectively encoded according to the partial block flag. For example, a current partial block may be encoded for each coefficient of a partial block only when there is at least one non-zero coefficient present in the current partial block (i.e., the partial block flag is a first value).

A flag (hereinafter, referred to as a first flag) indicating whether an absolute value of a coefficient is greater than 1 may be encoded (S320). The first flag may be selectively encoded according to a value of the partial block coefficient flag. For example, when the coefficient is a non-zero coefficient (i.e., the partial block coefficient flag is a first value), the first flag may be encoded by checking whether an absolute value of the coefficient is greater than 1. When the absolute value of the coefficient is greater than 1, the first flag is encoded to a first value, and when the absolute value of the coefficient is not greater than 1, the first flag may be encoded to a second value.

A flag (hereinafter, referred to as a second flag) indicating whether an absolute value of a coefficient is greater than 2 may be encoded (S330). The second flag may be selectively encoded according to a value of the first flag. For example, when the coefficient is greater than 1 (i.e., the first flag is a first value), the second flag may be encoded by checking whether an absolute value of the coefficient is greater than 2. When the absolute value of the coefficient is greater than 2, the second flag is encoded to a first value, and when the absolute value of the coefficient is not greater than 2, the second flag may be encoded to a second value.

The number of at least one of the first flag or the second flag may be at least one to at most N*M. Alternatively, at least one of the first flag or the second flag may be a fixed number (e.g., one, two, or more) predefined in an image encoding device. The number of the first/second flag may be different depending on a bit depth of an input image, a dynamic range of an original pixel value in a certain region of an image, a block size/depth, a partitioning technique (e.g., quad tree, binary tree), a transforming technique (e.g., DCT, DST), whether to skip transform, quantization parameters, prediction mode (e.g., intra/inter mode), and so on. In addition to the first/second flag, an n-th flag indicating whether an absolute value of a coefficient is greater than n may be additionally encoded. Here, n may mean a natural number greater than two. The number of the n-th flag may be one, two, or more, and may be determined in the same/similar manner as the first/second flag described above.

Remaining coefficients that are not encoded based on the first/second flag may be encoded in a current partial block (S340). Here, the encoding may be a procedure of encoding the coefficient value itself. The remaining coefficients may be equal to or greater than two.

A sign for a coefficient of a partial block may be encoded (S350). The sign may be encoded in a flag format in units of a coefficient. The sign may be selectively encoded according to a value of the partial block coefficient flag described above. For example, the sign may be encoded only when the coefficient is a non-zero coefficient (i.e., the partial block coefficient flag is a first value).

In addition, above-described encoding coefficients of a partial block may further include a procedure of specifying a range of coefficient values belonging to the partial block. Through the above procedure, it may be confirmed whether or not at least one non-zero coefficient exists in a partial block. The above procedure may be implemented through at least one of (A) encoding a maximum value, (B) encoding a first threshold value flag or (C) encoding a second threshold value flag which will be described below. The above procedure may be implemented by being included in any one of the above-described steps S300 to S350, or may be implemented in a form that is substituted for at least one of steps S300 to S350. Hereinafter, the procedure of specifying a range of coefficient values belonging to a partial block will be described in detail with reference to FIG. 4 to FIG. 6.

Figure 4:
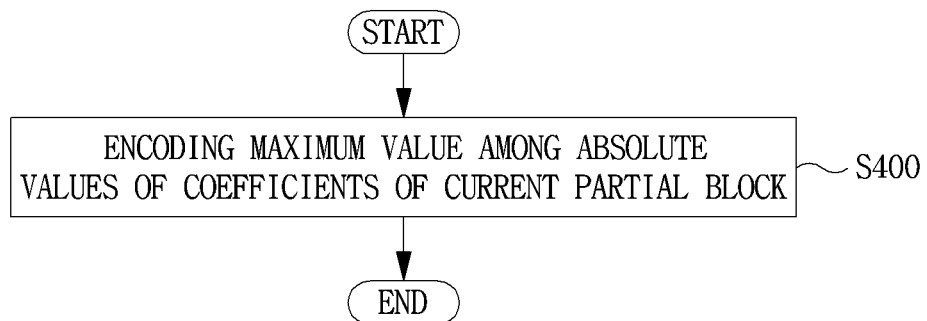
FIG. 4 is a diagram illustrating a method of encoding a maximum value of a coefficient of a partial block as an embodiment to which the present invention is applied.

FIG. 4 is a diagram illustrating a method of encoding a maximum value of a coefficient of a partial block as an embodiment to which the present invention is applied.

Referring to FIG. 4, a maximum value among an absolute values of coefficients of a current partial block may be encoded (S400). Through the maximum value, a range of coefficient values belonging to the current partial block may be inferred. For example, when the maximum value is m, coefficients of the current partial block may fall within the range of 0 to m. The maximum value may be selectively encoded according to a value of the partial block flag described above. For example, the maximum value may be encoded only when a current partial block includes at least one non-zero coefficient (i.e., the partial block flag is a first value). When coefficients of the current partial block are all 0 (i.e., the partial block flag is a second value), the maximum value may be derived as 0.

In addition, through the maximum value, it may be determined whether or not at least one non-zero coefficient is included in a current partial block. For example, when the maximum value is greater than 0, the current partial block includes at least one non-zero coefficient, and when the maximum value is 0, all coefficients of the current partial block may be 0. Therefore, encoding the maximum value may be performed in place of the encoding of the partial block flag of S300.

Figure 5:
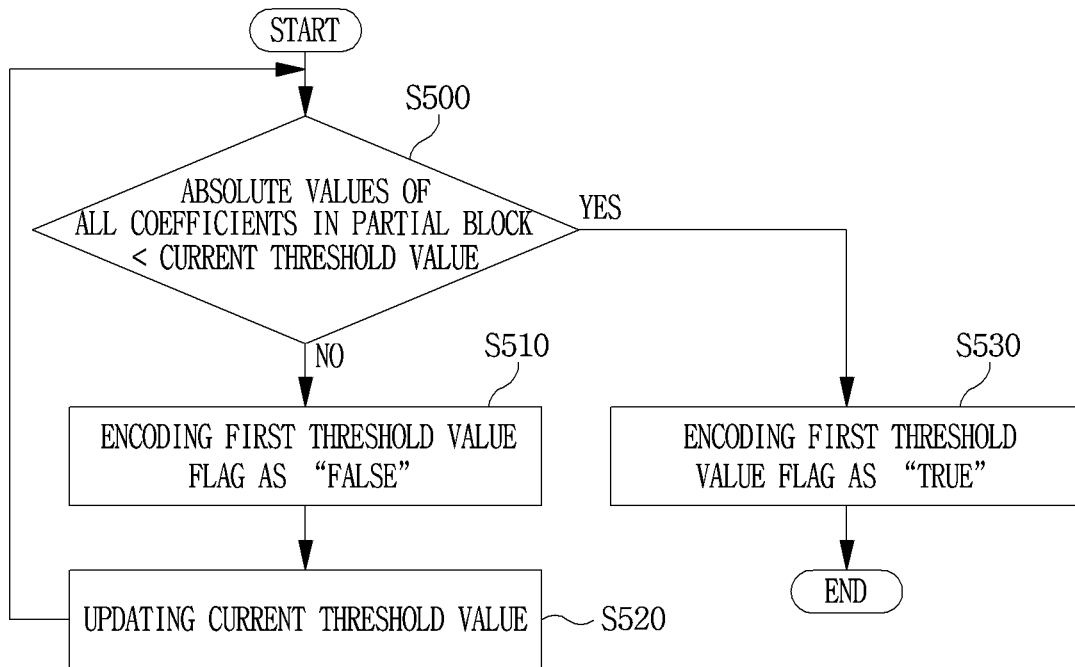
FIG. 5 is a diagram illustrating a method of encoding a first threshold value flag for a partial block as an embodiment to which the present invention is applied.

FIG. 5 is a diagram illustrating a method of encoding a first threshold value flag for a partial block as an embodiment to which the present invention is applied.

A first threshold value flag of the present invention may indicate whether or not all coefficients of a partial block are smaller than a predetermined threshold value. The number of threshold values may be N (N>=1), where a range of threshold values may be represented by $\{T_0, T_1, T_2, \ldots, T_{N-1}\}$. Here, the 0th threshold value $T_0$ denotes a minimum value, and the (N−1)-th threshold value $T_{N-1}$ denotes a maximum value, and $\{T_0, T_1, T_2, \ldots, T_{N-1}\}$ may be those in which the threshold values are arranged in ascending order. The number of the threshold values may be predetermined in an image encoding device. The image encoding device may determine an optimal number of threshold values in consideration of encoding efficiency and encode the number.

The threshold value may be obtained by setting the minimum value to 1 and increasing the minimum value by n (n>=1). The threshold value may be predetermined in an image encoding device. The image encoding device may determine an optimal threshold value in consideration of the encoding efficiency and encode the threshold value.

The range of the threshold value may be determined differently depending on a quantization parameter (QP). The QP may be set at a level of at least one of a sequence, a picture, a slice, or a transform block.

For example, when the QP is greater than a predetermined QP threshold, it may be expected that the distribution of zero coefficients in a transform block will be higher. In this case, the range of the threshold value may be determined as {3}, or the encoding procedure of the first/second threshold value flag may be omitted, and coefficients of a partial block may be encoded through steps S300 to S350 described above.

When the QP is smaller than a predetermined QP threshold, it may be expected that the distribution of non-zero coefficients in a transform block will be higher. In this case, the range of the threshold value may be determined as {3, 5} or {5, 3}.

That is, the range of threshold values when QP is small may have the number and/or size (e.g., maximum value) of the threshold values different from the threshold value range when QP is large. The number of QP threshold values may be one, two, or more. The QP threshold value may be predetermined in an image encoding device. For example, the QP threshold value may correspond to a median value of a range of QPs available in the image encoding device. Alternatively, the image encoding device may determine an optimal QP threshold value considering encoding efficiency, and encode the QP threshold value.

Alternatively, a range of threshold values may be determined differently depending on the size/shape of a block. Here, a block may mean a coding block, a prediction block, a transform block, or a partial block. The size may be represented by at least one of a width, a height, a sum of a width and a height, or the number of coefficient.

For example, when a size of a block is smaller than a predetermined threshold size, a range of threshold values may be determined as {3}, or the encoding procedure of the first/second threshold value flag may be omitted, and coefficients of a partial block may be encoded through steps S300 to S350 described above. When a size of a block is larger than a predetermined threshold size, a range of threshold values may be determined as {3, 5} or {5, 3}.

That is, the range of threshold values when a block size is small may have the number and/or size (e.g., maximum value) of the threshold values different from the threshold value range when a block size is large. The number of threshold size may be one, two, or more. The threshold size may be predetermined in an image encoding device. For example, the threshold size may be represented by a×b, wherein a and b are 2, 4, 8, 16, 32, 64 or more, and a and b may be equal to or different from each other. Alternatively, the image encoding device may determine an optimal threshold size considering encoding efficiency, and encode the threshold size.

Alternatively, the range of threshold values may be determined differently depending on a range of pixel values. The range of pixel values may be represented by a maximum value and/or a minimum value of pixels belonging to a predetermined region. Here, the predetermined region may mean at least one of a sequence, a picture, a slice, or a block.

For example, when the difference between the maximum value and the minimum value of the range of pixel values is smaller than a predetermined threshold difference value, the range of threshold values is determined as {3}, or the encoding procedure of the first/second threshold value flag may be omitted, and coefficients of a partial block may be encoded through steps S300 to S350 described above. When the difference is larger than a predetermined threshold difference value, the range of threshold values may be determined as {3, 5} or {5, 3}.

That is, the range of threshold values when the difference is small may have the number and/or size (e.g., maximum value) of the threshold values different from a range of threshold values when the difference is large. The number of threshold difference values may be one, two, or more. The threshold difference value may be predetermined in an image encoding device. Alternatively, the image encoding device may determine an optimal threshold difference value considering encoding efficiency, and encode the threshold difference value.

Referring to FIG. 5, it may be determined whether absolute values of all coefficients in a current partial block is smaller than a current threshold value (S500).

When the absolute values of all coefficients are not smaller than the current threshold value, a first threshold value flag may be encoded as "false" (S510). In this case, the current threshold value (i-th threshold value) may be updated to the next threshold value ((i+1)-th threshold value) (S520), and the above described step S500 may be performed based on the updated current threshold value. Alternatively, when absolute values of all coefficients are not smaller than the current threshold value, the first threshold value flag encoding procedure of step S510 may be omitted, and the current threshold value may be updated to the next threshold value.

When the current threshold value reaches a maximum value of a threshold value or when the number of the threshold values is 1, the current threshold value may be updated by adding a predetermined constant to the current threshold value. The predetermined constant may be an integer greater than or equal to one. Here, the update may be repeatedly performed until the first threshold value flag is encoded as "true". Based on the updated current threshold value, step S500 may be performed. Alternatively, when the current threshold value reaches the maximum value of the threshold value or when the number of threshold values is 1, the updating procedure may be terminated.

When absolute values of all coefficients are smaller than a current threshold value, the first threshold value flag may be encoded as "true" (S530).

As described above, when the first threshold value flag for the i-th threshold value is "true", this may indicate that absolute values of all coefficients in a partial block are smaller than the i-th threshold value. When the first threshold value flag for the i-th threshold is "false", this may indicate that absolute values of all coefficients in the partial block is greater than or equal to the i-th threshold. Based on the first threshold flag that is "true", a range of coefficient values belonging to the partial block may be specified. That is, when the first threshold value flag for the i-th threshold value is "true", the coefficient belonging to the partial block may fall within the range of 0 to (i-th threshold value−1).

According to the encoded first threshold value flag, at least one of steps S300 to S350 described above may be omitted.

For example, when a range of threshold values is {3, 5}, at least one of the first threshold value flag for the threshold value "3" or the first threshold value flag for the threshold value "5" may be encoded. When the first threshold value flag for the threshold value "3" is "true", absolute values of all coefficients in the partial block may fall within the range of 0 to 2. In this case, coefficients of the partial block may be encoded by performing the remaining steps except at least one of the above-described steps S330 or S340, or the coefficients of the partial block may be encoded by performing the remaining steps except at least one of S300, S330 or S340.

When the first threshold value flag for the threshold "3" is "false", the first threshold value flag for the threshold "5" may be encoded. When the first threshold value flag for the threshold "5" is "false", at least one of absolute values of coefficients in a partial block may be greater than or equal to 5. In this case, coefficients of the partial block may be encoded by performing the above-described steps S300 to S350 in the same manner, or coefficients of the partial block may be encoded by performing the remaining steps except step S300.

When the first threshold value flag for the threshold "5" is "true", absolute values of all coefficients in the partial block may fall within the range of 0 to 4. In this case, coefficients of the partial block may be encoded by performing the above-described steps S300 to S350 in the same manner, or coefficients of the partial block may be encoded by performing the remaining steps except step S300.

In addition, a first threshold value flag of a current partial block may be derived based on a first threshold flag of another partial block. In this case, the encoding procedure of the first threshold value flag may be omitted, and this will be described with reference to FIG. 11.

Figure 6:
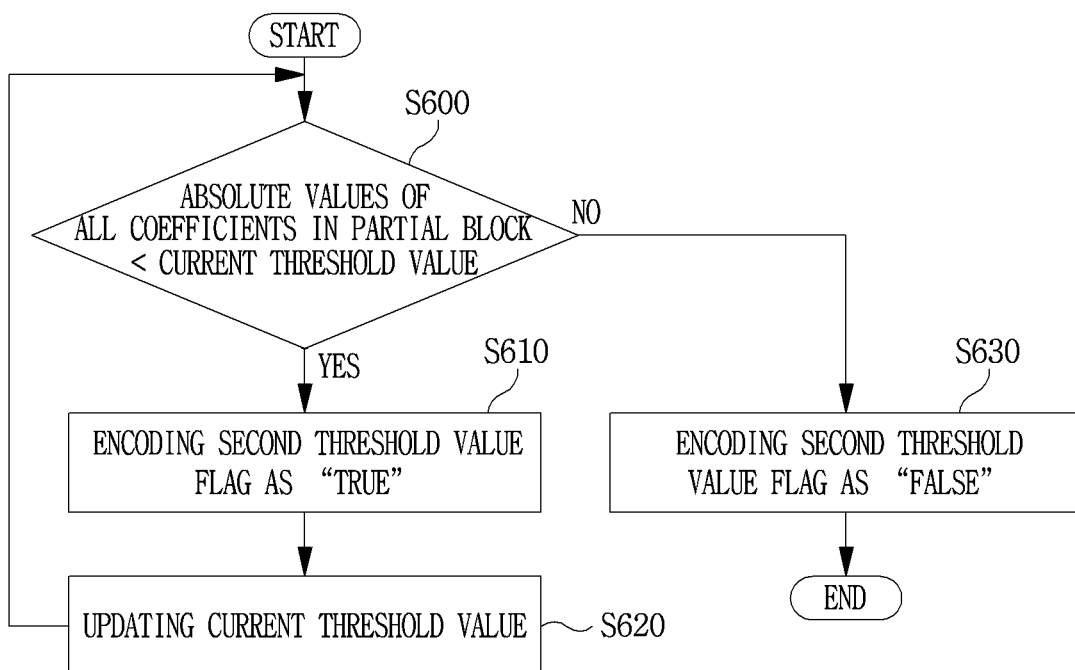
FIG. 6 is a diagram illustrating a method of encoding a second threshold value flag for a partial block as an embodiment to which the present invention is applied.

FIG. 6 is a diagram illustrating a method of encoding a second threshold value flag for a partial block as an embodiment to which the present invention is applied.

A second threshold flag of the present invention may indicate whether or not all coefficients of a partial block are smaller than a predetermined threshold value. The number of threshold values may be N (N>=1), where a range of threshold values may be represented by $\{T_0, T_1, T_2, \ldots, T_{N-1}\}$. Here, To, which is the 0th threshold value, is a maximum value, and $T_{N-1}$, which is the (N−1)-th threshold value, is a minimum value, and $\{T_0, T_1, T_2, \ldots, T_{N-1}\}$ may be those in which the threshold values are arranged in descending order. The number of the threshold values may be predetermined in an image encoding device. The image encoding device may determine an optimal number of threshold values considering encoding efficiency, and encode the number.

The threshold value may be obtained by setting a maximum value to m and decreasing the minimum value by n (n>=1). The m may be predetermined in an image encoding device. Alternatively, the image encoding device may determine an optimal maximum value m considering encoding efficiency, and encode the maximum value. The threshold value may be predetermined in the image encoding device. The image encoding device may determine the optimal threshold value considering encoding efficiency and encode the threshold value.

A range of threshold values may be determined differently depending on at least one of a quantization parameter, a size/shape of a block, or a range of pixel values, as described in the embodiment of FIG. 5.

Referring to FIG. 6, it may be determined whether absolute values of all coefficients in a current partial block is smaller than a current threshold value (S600).

When absolute values of all coefficients are smaller than the current threshold value, the second threshold value flag may be encoded as "true" (S610). In this case, the current threshold value (i-th threshold value) may be updated to the next threshold value ((i+1)-th threshold value) (S620), and the above described step S600 may be performed based on the updated current threshold value. Alternatively, when the absolute values of all coefficients are smaller than the current threshold value, the second threshold value flag encoding process in step S610 may be omitted, and the current threshold value may be updated to the next threshold value.

When the current threshold value reaches the minimum value of the threshold value or when the number of threshold values is 1, the current threshold value may be updated by subtracting a predetermined constant from the current threshold value. The predetermined constant may be an integer greater than or equal to 1. Here, the update may be repeatedly performed until the second threshold value flag is encoded as "false". Analogously, based on the updated current threshold value, step S600 described above may be performed. Alternatively, when the current threshold value reaches the minimum value of the threshold value or when the number of threshold values is 1, the updating procedure may be terminated.

When absolute values of all coefficients are not smaller than the current threshold value, the second threshold value flag may be encoded as "false" (S630).

As described above, when the second threshold value flag for the i-th threshold value is "true", this may indicate that absolute values of all coefficients in the partial block is smaller than the i-th threshold value. When the second threshold value flag for the i-th threshold value is "false", this may indicate that at least one of the absolute values of all coefficients in the partial block is greater than or equal to the i-th threshold value.

According to the encoded second threshold value flag, at least one of steps S300 to S350 described above may be omitted.

For example, when a range of threshold values is {5, 3}, at least one of the second threshold value flag for the threshold value "5" or the second threshold value flag for the threshold value "3" may be encoded. When the second threshold value flag for the threshold value "5" is "false", at least one of the absolute values of all coefficients in the partial block may be greater than or equal to 5. In this case, coefficients of the partial block may be encoded by performing the above-described steps S310 to S350 in the same manner, or coefficients of the partial block may be encoded by performing the remaining steps except step S300.

When the second threshold value flag for the threshold value "5" is "true", the second threshold value flag for the threshold value "3" may be encoded. When the second threshold flag for the threshold value "3" is "true", the absolute values of coefficients in the partial block may fall within the range of 0 to 2. In this case, coefficient of the partial block may be encoded by performing the remaining steps except at least one of the above-described steps S330 and S340, or coefficients of the partial block may be encoded by performing the remaining steps except at least one of S300, S330 or S340.

When the second threshold value flag for the threshold value "3" is "false", at least one of absolute values of all coefficients in the partial block may be equal to or greater than 3. In this case, coefficients of the partial block may be encoded by performing the above-described steps S300 to S350 in the same manner, or coefficients of the partial block may be encoded by performing the remaining steps except step S300.

In addition, the second threshold value flag of the current partial block may be derived based on the second threshold value flag of another partial block. In this case, the second threshold value flag encoding procedure may be omitted, and this will be described with reference to FIG. 11.

Figure 7:
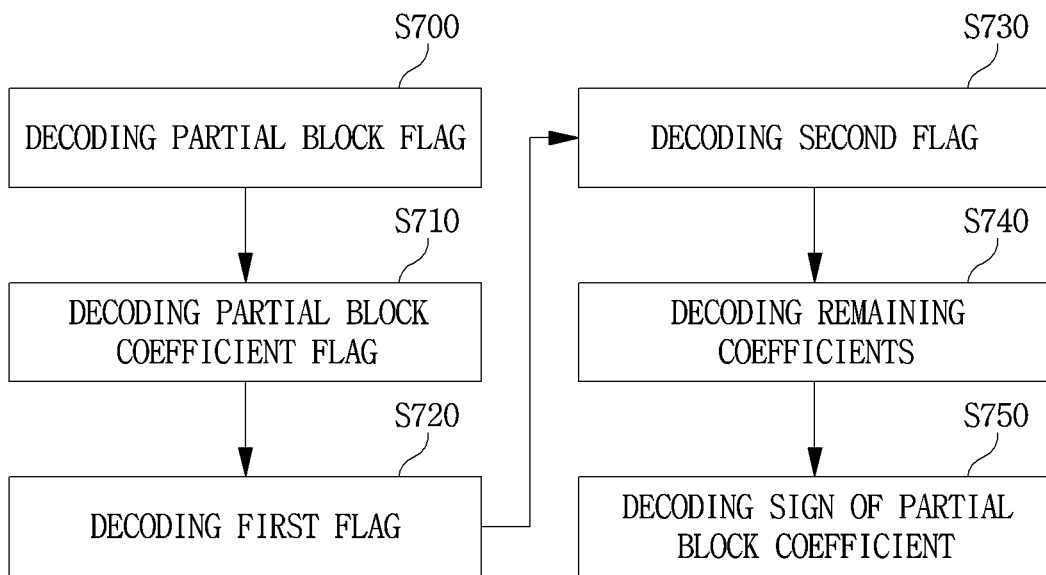
FIG. 7 is a diagram illustrating a method of decoding coefficients of a transform block as an embodiment to which the present invention is applied.

FIG. 7 is a diagram illustrating a method of decoding coefficients of a transform block as an embodiment to which the present invention is applied.

Coefficients of a transform block may be decoded in units of a predetermined block (hereinafter, referred to as a partial block) in an image decoding device. A transform block may include one or more partial blocks. A partial block may be a block of N×M size. Here, N and M are natural numbers, and N and M may be equal to or different from each other. That is, a partial block may be a square or a non-square block. A size/shape of a partial block may be fixed (e.g., 4×4) predefined in an image decoding device, may be variably determined depending on a size/shape of a transform block, or may be variably determined based on signaled information on a size/shape of a partial block. Information on a size/shape of a partial block may be signaled in a level of at least one of a sequence, a picture, a slice or a block.

An order of decoding partial blocks belonging to a transform block may be determined according to a predetermined scan type (hereinafter, referred to as a first scan type) in an image decoding device. In addition, an order of decoding coefficients belonging to a partial block may be determined according to a predetermined scan type (hereinafter, referred to as a second scan type). The first scan type and the second scan type may be the same or different. For the first/second scan type, a diagonal scan, a vertical scan, a horizontal scan and the like may be used. However, the present invention is not limited thereto, and one or more scan types having predetermined angles may be further added. The first/second scan type may be determined based on at least one of coding block related information (e.g., maximum/minimum size, partitioning technique, etc.), size/shape of transform block, size/shape of partial block, prediction mode, intra-prediction related information (e.g., a value of intra-prediction mode, directionality, angle, etc.) or inter-prediction related information.

An image decoding device may decode, in a transform block, position information of a coefficient (hereinafter, referred to as a non-zero coefficient) having non-zero value first appeared in the above-described decoding order. Decoding may be performed sequentially from a partial block according to the position information. Hereinafter, a procedure of decoding coefficients of a partial block will be described with reference to FIG. 3.

A partial block flag for a current partial block may be decoded (S700). The partial block flag may be decoded in units of a partial block. The partial block flag may indicate whether there is at least one non-zero coefficient in the current partial block. For example, when the partial block flag is a first value, it may indicate that the current partial block includes at least one non-zero coefficient, and when the partial block flag is a second value, it may indicate that all coefficients of the current partial block are 0.

A partial block coefficient flag for a current partial block may be decoded (S710). The partial block coefficient flag may be decoded in units of a coefficient. The partial block coefficient flag may indicate whether the coefficient is a non-zero coefficient. For example, when the partial block coefficient flag is a first value, it may indicate that the coefficient is a non-zero coefficient, and when the partial block coefficient flag is a second value, it may indicate that the coefficient is zero. The partial block coefficient flag may be selectively decoded according to the partial block flag. For example, a current partial block may be decoded for each coefficient of a partial block only when there is at least one non-zero coefficient present in the current partial block (i.e., the partial block flag is a first value).

A flag (hereinafter, referred to as a first flag) indicating whether an absolute value of a coefficient is greater than 1 may be decoded (S720). The first flag may be selectively decoded according to a value of the partial block coefficient flag. For example, when the coefficient is a non-zero coefficient (i.e., the partial block coefficient flag is a first value), the first flag may be decoded to check whether the absolute value of the coefficient is greater than 1. When the first flag is a first value, the absolute value of the coefficient is greater than 1, and when the first flag is a second value, the absolute value of the coefficient may be 1.

A flag (hereinafter, referred to as a second flag) indicating whether an absolute value of a coefficient is greater than 2 may be decoded (S730). The second flag may be selectively decoded according to a value of the first flag. For example, when the coefficient is greater than 1 (i.e., the first flag is a first value), the second flag may be decoded to check whether the absolute value of the coefficient is greater than 2. When the second flag is a first value, the absolute value of the coefficient is greater than 2, and when the second flag is a second value, the absolute value of the coefficient may be 2.

The number of at least one of the first flag or the second flag may be at least one to at most N*M. Alternatively, at least one of the first flag or the second flag may be a fixed number (e.g., one, two, or more) predefined in an image decoding device. The number of the first/second flag may be different depending on a bit depth of an input image, a dynamic range of an original pixel value in a certain region of an image, a block size/depth, a partitioning technique (e.g., quad tree, binary tree), a transforming technique (e.g., DCT, DST), whether to skip transform, quantization parameters, prediction mode (e.g., intra/inter mode), and so on. In addition to the first/second flag, an n-th flag indicating whether an absolute value of a coefficient is greater than n may be additionally decoded. Here, n may mean a natural number greater than two. The number of the n-th flag may be one, two, or more, and may be determined in the same/similar manner as the first/second flag described above.

Remaining coefficients that are not decoded based on the first/second flag may be decoded in a current partial block (S740). Here, the decoding may be a procedure of decoding the coefficient value itself. The remaining coefficients may be equal to or greater than two.

A sign for a coefficient of a partial block may be decoded (S750). The sign may be decoded in a flag format in units of a coefficient. The sign may be selectively decoded according to a value of the partial block coefficient flag described above. For example, the sign may be decoded only when the coefficient is a non-zero coefficient (i.e., the partial block coefficient flag is a first value).

In addition, above-described decoding coefficients of a partial block may further include a procedure of specifying a range of coefficient values belonging to the partial block. Through the above procedure, it may be confirmed whether or not at least one non-zero coefficient exists in a partial block. The above procedure may be implemented through at least one of (A) decoding a maximum value, (B) decoding a first threshold value flag or (C) decoding a second threshold value flag which will be described below. The above procedure may be implemented by being included in any one of the above-described steps S700 to S750, or may be implemented in a form that is substituted for at least one of steps S700 to S370. Hereinafter, the procedure of specifying a range of coefficient values belonging to a partial block will be described in detail with reference to FIG. 8 to FIG. 10.

Figure 8:
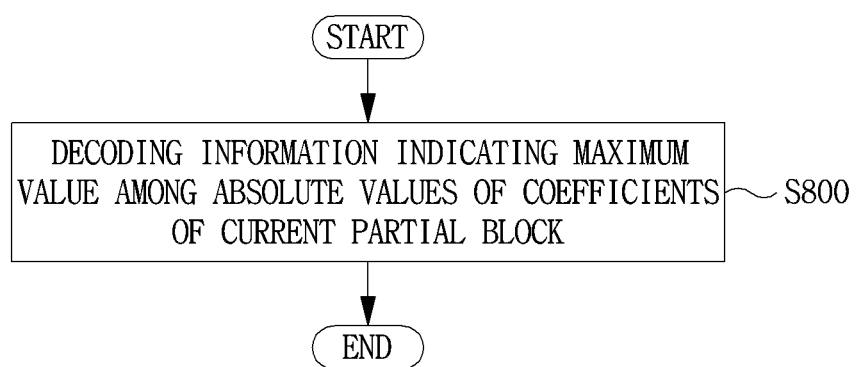
FIG. 8 is a diagram illustrating a method of decoding a maximum value of a coefficient of a partial block as an embodiment to which the present invention is applied.

FIG. 8 is a diagram illustrating a method of decoding a maximum value of a coefficient of a partial block as an embodiment to which the present invention is applied.

Referring to FIG. 8, information indicating a maximum value among absolute values of coefficients of a current partial block may be decoded (S800). A range of coefficient values belonging to the current partial block may be inferred through the maximum value according to the information. For example, when the maximum value is m, coefficients of the current partial block may fall within the range of 0 to m. The information indicating the maximum value may be selectively decoded according to a value of the partial block flag described above. For example, a current partial block may be decoded only when the current partial block includes at least one non-zero coefficient (i.e., the partial block flag is a first value). When coefficients of the current partial block are all 0 (i.e., the partial block flag is the second value), the information indicating the maximum value may be derived as zero.

Also, through the maximum value according to the information, it may be determined whether or not at least one non-zero coefficient is included in a current partial block. For example, when the maximum value is greater than 0, the current partial block includes at least one non-zero coefficient, and when the maximum value is 0, all coefficients of the current partial block may be zero. Therefore, the decoding the maximum value may be performed in place of the decoding of the partial block flag of S700.

Figure 9:
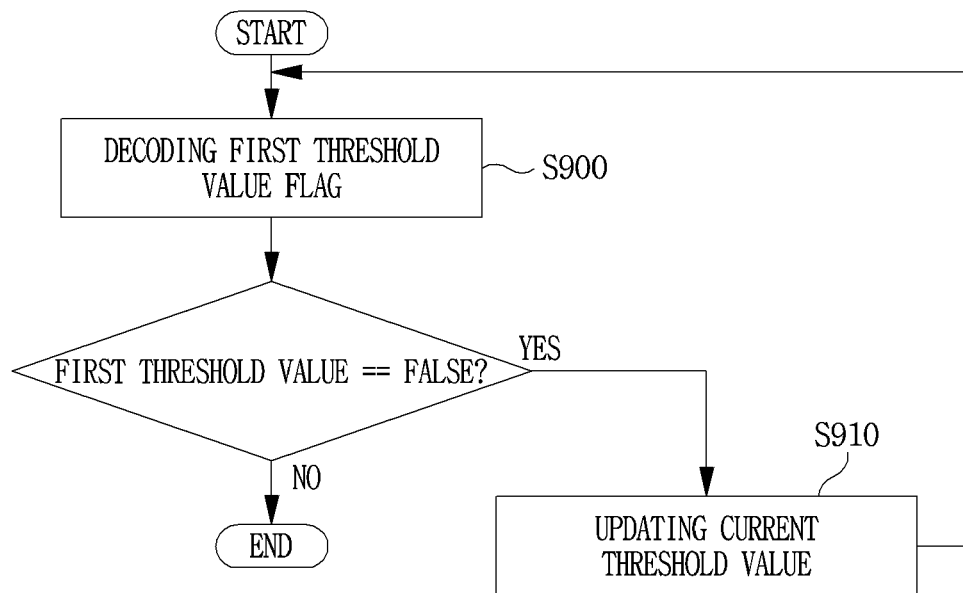
FIG. 9 is a diagram illustrating a method of decoding a first threshold value flag for a partial block as an embodiment to which the present invention is applied.

FIG. 9 is a diagram illustrating a method of decoding a first threshold value flag for a partial block as an embodiment to which the present invention is applied.

A first threshold flag of the present invention may indicate whether or not all coefficients of a partial block are smaller than a predetermined threshold value. The number of threshold values may be N (N>=1), where a range of threshold values may be represented by $\{T_0, T_1, T_2, \ldots, T_{N-1}\}$. Here, the 0th threshold value $T_0$ may denote a minimum value, and the (N−1)-th threshold value $T_{N-1}$ may denotes a maximum value, and $\{T_0, T_1, T_2, \ldots, T_{N-1}\}$ may be those in which the threshold values are arranged in ascending order. The number of threshold values may be predetermined in an image decoding device or may be determined based on signaled information on the number of threshold values.

The threshold value may be obtained by setting a minimum value to 1 and increasing the minimum value by n (n>=1). The threshold value may be set in an image decoding device or may be determined based on signaled information on a threshold value.

A range of threshold values may be determined differently depending on a quantization parameter (QP). The QP may be set at a level of at least one of a sequence, a picture, a slice, or a transform block.

For example, when the QP is larger than a predetermined QP threshold value, a range of threshold values may be determined as {3}, or the first/second threshold value flag decoding procedure may be omitted, and through the above-described steps of S700 to S750 coefficients of a partial block may be decoded.

In addition, when the QP is smaller than a predetermined QP threshold, a range of threshold values may be determined as {3, 5} or {5, 3}.

That is, a range of threshold values when the QP is small may have the number and/or size (e.g., maximum value) of threshold values different from a range of threshold values when the QP is large. The number of QP threshold values may be one, two, or more. The QP threshold value may be set in an image decoding device. For example, the QP threshold value may correspond to a median value of a range of QPs available in an image decoding device. Alternatively, the QP threshold value may be determined based on information on the QP threshold value signaled by an image encoding device.

Alternatively, a range of threshold values may be determined differently depending on a size/shape of a block. Here, a block may mean a coding block, a prediction block, a transform block, or a partial block. The size may be represented by at least one of a width, a height, a sum of a width and a height, or the number of coefficients.

For example, when a block size is smaller than a predetermined threshold size, a range of threshold values may be determined as {3}, or the first/second threshold value flag decoding procedure may be omitted, and coefficients of a partial block may be decoded through steps S700 to S750 described above. In addition, when a block size is larger than a predetermined threshold size, a range of threshold values may be determined as {3, 5} or {5, 3}.

That is, a range of threshold values when a block size is small may have the number and/or size (e.g., maximum value) of threshold values different from a range of threshold values when a block size is large. The number of threshold size may be one, two, or more. The threshold size may be set in an image decoding device. For example, the threshold size may be represented by a×b, where a and b are 2, 4, 8, 16, 32, 64 or more, and a and b may be the same or different. Alternatively, the threshold size may be determined based on information on a threshold size signaled by an image encoding device.

Alternatively, a range of threshold values may be determined differently depending on a range of pixel values. The range of pixel values may be represented by a maximum value and/or a minimum value of pixels belonging to a predetermined region. Here, the predetermined region may mean at least one of a sequence, a picture, a slice, or a block.

For example, when a difference between a maximum value and a minimum value of a range of pixel values is smaller than a predetermined threshold difference value, a range of threshold values may be determined as {3}, or the first/second threshold value flag decoding procedure may be omitted, and coefficients of a partial block may be decoded through steps S700 to S750 described above. In addition, when the difference is larger than a predetermined threshold difference value, the range of threshold values may be determined as {3, 5} or {5, 3}.

That is, a range of threshold values when the difference is small may have the number and/or size (e.g., maximum value) of threshold values different from a range of threshold values when the difference is large. The number of threshold difference values may be one, two, or more. The threshold difference value may be set in an image decoding device or may be determined based on information on a threshold difference value signaled by an image encoding device.

Referring to FIG. 9, a first threshold value flag for a current threshold value may be decoded (S900).

The first threshold value flag may indicate whether absolute values of all coefficients of a partial block are smaller than a current threshold value. For example, when the first threshold value flag is "false", it may indicate that absolute values of all coefficients of a partial block are greater than or equal to a current threshold. In addition, when the first threshold value flag is "true", it may indicate that absolute values of all coefficients of a partial block are smaller than a current threshold value.

When the first threshold value flag is "false", the current threshold value (i-th threshold value) may be updated to the next threshold value ((i+1-th threshold value) (S910), based on the updated current threshold value, step S900 described above may be performed.

When the current threshold value reaches a maximum value of threshold values or when the number of threshold values is 1, the current threshold value may be updated by adding a predetermined constant to the current threshold value. The predetermined constant may be an integer greater than or equal to one. Here, the update may be repeatedly performed until the first threshold value that is "true" is decoded. Alternatively, when the current threshold value reaches a maximum value of threshold values or when the number of threshold values is 1, the updating procedure may be terminated.

As shown in FIG. 9, when the first threshold value flag is "true", decoding of a first threshold value flag may not be performed any more.

As described above, when a first threshold value flag for the i-th threshold value is "true", it may indicate that absolute values of all coefficients in a partial block are smaller than the i-th threshold value. In addition, when a first threshold flag for the i-th threshold value is "false", it may indicate that absolute values of all coefficients in a partial block are greater than or equal to the i-th threshold value. Based on the first threshold value flag that is "true", a range of coefficient values belonging to a partial block may be specified. That is, when a first threshold value flag for the i-th threshold value is "true", a coefficient belonging to a partial block may fall within a range of 0 to (i-th threshold value−1).

According to the decoded first threshold value flag, at least one of steps S700 to S750 described above may be omitted.

For example, when a range of threshold values is {3, 5}, at least one of a first threshold value flag for the threshold value "3" or a first threshold value flag for the threshold value "5" may be decoded. When the first threshold value flag for the threshold value "3" is "true", absolute values of all coefficients in a partial block may fall within the range of 0 to 2. In this case, coefficients of a partial block may be decoded by performing the remaining steps except at least one of the steps S730 or S740 described above, or coefficients of a partial block may be decoded by performing the remaining steps except at least one of the steps S700, S730 or S740 described above.

When the first threshold value flag for the threshold value "3" is "false", the first threshold value flag for the threshold value "5" may be decoded. When the first threshold value flag for the threshold value "5" is "false", at least one of absolute values of coefficients in a partial block may be greater than or equal to 5. In this case, coefficients of a partial block may be decoded by performing the above-described steps S700 to S750 in the same manner, or coefficients of a partial block may be decoded by performing the remaining steps except step S700.

In addition, when the first threshold value flag for the threshold value "5" is "true", absolute values of all coefficients in a partial block may fall within the range of 0 to 4. In this case, coefficients of a partial block may be decoded by performing the above-described steps S700 to S750 in the same manner, or coefficients of a partial block may be decoded by performing the remaining steps except step S700.

In addition, a first threshold value flag of a current partial block may be derived based on a first threshold value flag of another partial block. In this case, decoding procedure for a first threshold value flag may be omitted, and this will be described with reference to FIG. 11.

Figure 10:
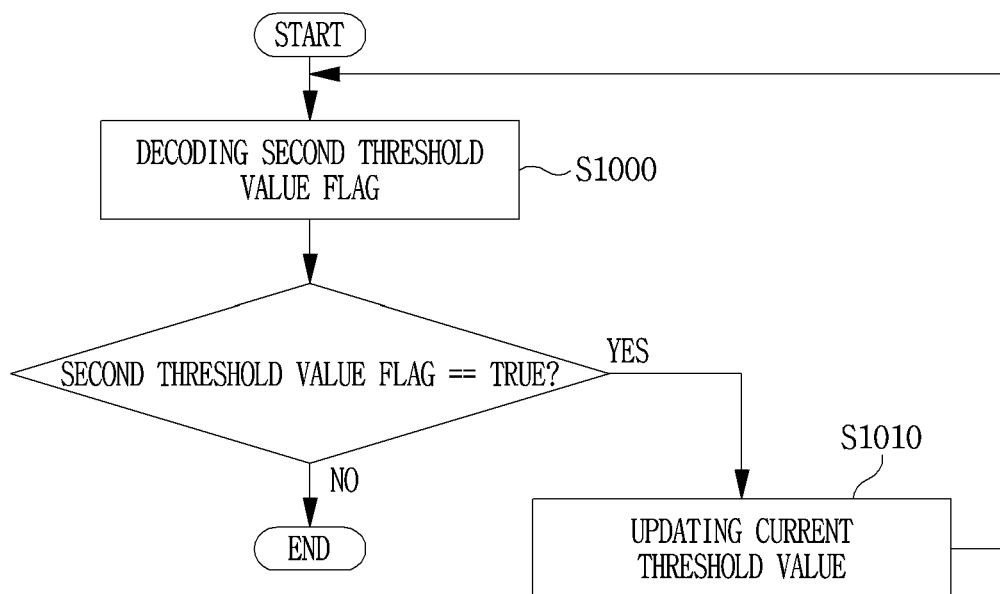
FIG. 10 is a diagram illustrating a method of decoding a second threshold value flag for a partial block as an embodiment to which the present invention is applied.

FIG. 10 is a diagram illustrating a method of decoding a second threshold value flag for a partial block as an embodiment to which the present invention is applied.

A second threshold flag of the present invention may indicate whether or not all coefficients of a partial block are smaller than a predetermined threshold value. The number of threshold values may be N (N>=1), where a range of threshold values may be represented by $\{T_0, T_1, T_2, \ldots, T_{N-1}\}$. Here, the 0th threshold value $T_0$ may denote a maximum value, and the (N−1)-th threshold value $T_{N-1}$ may denotes a minimum value, and $\{T_0, T_1, T_2, \ldots, T_{N-1}\}$ may be those in which the threshold values are arranged in descending order. The number of threshold values may be predetermined in an image decoding device or may be determined based on information on the number of threshold values signaled by an image encoding device.

The threshold value may be obtained by setting a maximum value to m and decreasing the minimum value by n (n>=1). The m may be predetermined in the image decoding apparatus or may be determined based on information on a maximum value (m) signaled by an image encoding device. The threshold value may be predetermined in an image decoding device or may be determined based on information on a threshold value signaled by an image encoding device.

A range of threshold values may be determined differently based on at least one of a quantization parameter, a size/shape of a block, or a range of pixel values, as described in the embodiment of FIG. 9.

Referring to FIG. 10, the second threshold value flag related to a current threshold value may be decoded (S1000).

The second threshold value flag may indicate whether absolute values of all coefficients of a partial block are smaller than a current threshold value. For example, when the second threshold flag is "false", it may indicate that absolute values of all coefficients of a partial block are greater than or equal to a current threshold value. In addition, when the second threshold flag is "true", it may indicate that absolute values of all coefficients of a partial block are smaller than a current threshold value.

When the second threshold value flag is "true", a current threshold value (i-th threshold value) is updated to the next threshold value ((i+1)-th threshold value) (S1010), and the above-described step S1000 may be performed based on the updated current threshold value.

In addition, when the second threshold value flag is "false", the decoding for the second threshold value flag may not be performed any more.

When the current threshold value reaches a minimum value of threshold values or when the number of threshold values is 1, the current threshold value may be updated by subtracting a predetermined constant from the current threshold value. The predetermined constant may be an integer greater than or equal to 1. Here, the update may be repeatedly performed until a second threshold value flag that is "false" is decoded. Alternatively, when the current threshold value reaches a minimum value of threshold values or when the number of threshold values is 1, the updating procedure may be terminated.

As described above, when a second threshold value flag for the i-th threshold value is "true", this may indicate that absolute values of all coefficients in a partial block are smaller than the i-th threshold value. In addition, when a second threshold flag for the i-th threshold is "false", this may indicate that at least one of absolute values of all coefficients in a partial block is greater than or equal to the i-th threshold.

According to the decoded second threshold value flag, at least one of steps S700 to S750 described above may be omitted.

For example, when a range of threshold values is {5, 3}, at least one of a second threshold value flag for the threshold value "5" or a second threshold value flag for the threshold value "3" may be decoded. When the second threshold flag for the threshold value "5" is "false", at least one of absolute values of all coefficients in a partial block may be greater than or equal to 5. In this case, coefficient of a partial block may be decoded by performing steps S710 to S750 described above, or coefficients of a partial block may be decoded by performing the remaining steps except step S700.

When the second threshold flag for the threshold value "5" is "true", the second threshold value flag for the threshold value "3" may be decoded. When the second threshold flag for the threshold value "3" is "true", absolute values of coefficients in a partial block may fall within the range of 0 to 2. In this case, coefficients of a partial block may be decoded by performing the remaining steps except at least one of the steps S730 or S740 described above, or coefficients of a partial block may be decoded by performing the remaining steps except at least one of the steps S700, S730 or S740.

In addition, when the second threshold value flag for the threshold value "3" is "false", at least one of absolute values of all coefficients in a partial block may be equal to or greater than 3. In this case, coefficients of a partial block may be decoded by performing the above-described steps S700 to S750 in the same manner, or coefficients of a partial block may be encoded by performing the remaining steps except step S700.

In addition, the second threshold flag of a current partial block may be derived based on the second threshold flag of another partial block. In this case, the second threshold flag decoding procedure may be omitted, and this will be described with reference to FIG. 11.

Figure 11:
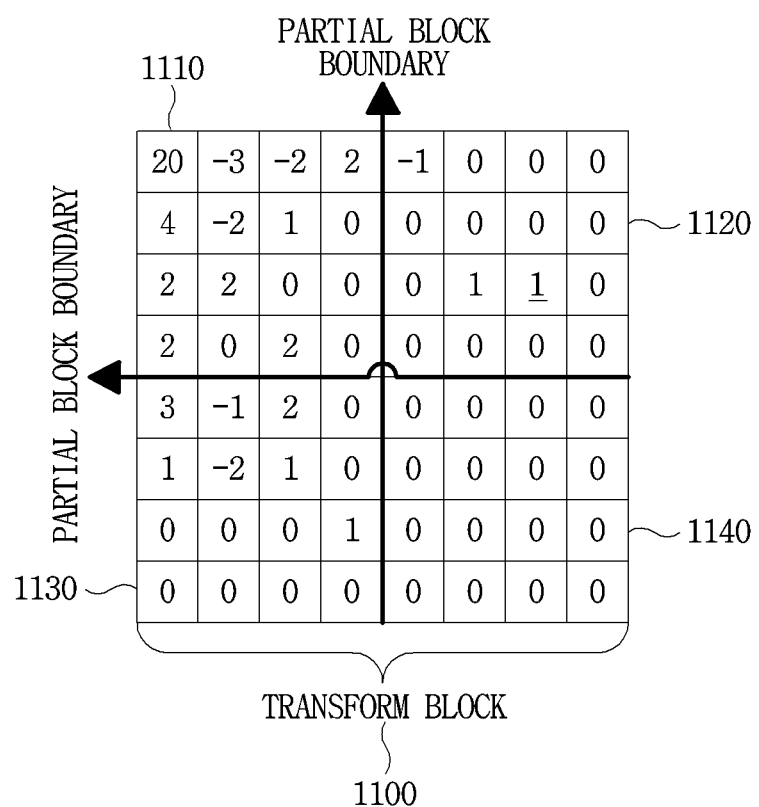
FIG. 11 is a diagram illustrating a method of deriving a first/second threshold value flag for a current partial block as an embodiment to which the present invention is applied.

FIG. 11 is a diagram illustrating a method of deriving a first/second threshold value flag for a current partial block as an embodiment to which the present invention is applied.

In this embodiment, it is assumed that a transform block 1100 is 8×8, a partial block is 4×4, a block including a non-zero coefficient that is first appeared is 1120, and partial blocks of the transform block are encoded/decoded in an order of 1140, 1120, 1130, 1110 depending on scan type.

In a current partial block, a first threshold value flag for a particular threshold value may be derived based on a first threshold value flag of a previous partial block. For example, based on a first threshold value flag that is "false" in a previous partial block, a first threshold value flag of a current partial block may be derived as "false". Here, it is assumed that {3, 5, 7} is used as a range of threshold values.

Specifically, since the partial block 1140 which is a first place in the encoding/decoding order has earlier encoding/decoding order than a position of the partial block 1120 to which a non-zero coefficient that is first appeared belongs, a first threshold value flag may not be encoded/decoded. In the partial block 1120 which is a second place in the encoding/decoding order, since the first threshold value flag for the threshold value "3" is "true", only the first threshold flag for the threshold value "3" may be encoded/decoded. In the partial block 1130 which is a third place in the encoding/decoding order, since the first threshold value flag for the threshold value "3" is "false" and the first threshold value flag for the threshold value "5" is "true", the first threshold flags for the threshold value "3" and "5" may be respectively encoded/decoded. In the partial block 1110 which is a last place in the encoding/decoding order, the first threshold value flag for the threshold value "3" is "false" and the first threshold value flag for the threshold value "5" is "false". Here, since the first threshold flag for the threshold value "3" in the previous partial block 1130 is "false", it may be expected that the current partial block 1110 has at least one coefficient that has absolute value equal to or greater than 3, the first threshold value flag for the threshold value "3" may be derived as "false".

In a current partial block, a first threshold value flag for a particular threshold value may be derived based on a first threshold value flag of a previous partial block. For example, based on a first threshold value flag that is "false" in a previous partial block, the first threshold value flag of the current partial block may be derived "false".

In the present embodiment, for convenience of explanation, a transform block 1100 is 8×8, a partial block is 4×4, the range of threshold values is {3, 5, 7}, and a block including the non-zero coefficient that is first appeared is 1120, and partial blocks of the transform block are encoded/decoded in an order of 1140, 1120, 1130, 1110 depending on scan type.

Likewise, in a current partial block, a second threshold value flag for a specific threshold value may be derived based on a second threshold value flag of a previous partial block. For example, based on a first threshold flag that is "false" in a previous partial block, a first threshold flag of a current partial block may be derived as "false". Here, it is assumed that {7, 5, 3} is used as a range of the threshold values.

Specifically, since the partial block 1140 which is a first place in the encoding/decoding order has earlier encoding/decoding order than a position of the partial block 1120 to which a non-zero coefficient that is first appeared belongs, a second threshold value flag may not be encoded/decoded. In the partial block 1120 which is a second place in the encoding/decoding order, since the second threshold value flag for the threshold value "7" is "true", the second threshold value flag for the threshold value "5" is "true", and the second threshold value flag for the threshold value "3" is "true", the second threshold flags for the threshold value "7", "5" and "3" may be respectively encoded/decoded. In the partial block 1130 which is a third place in the encoding/decoding order, since the second threshold value flag for the threshold value "7" and "5" is respectively "true", and the second threshold value flag for the threshold value "3" is "false". In the partial block 1110 which is a last place in the encoding/decoding order, the second threshold value flag for the threshold value "3" is "false". Here, using that the second threshold value flag for the threshold value "3" is "false" in the previous partial block 1130, in the current partial block 1110, the second threshold value flag for the threshold value "3" may not be encoded/decoded and may be derived as "false".

Figure 12:
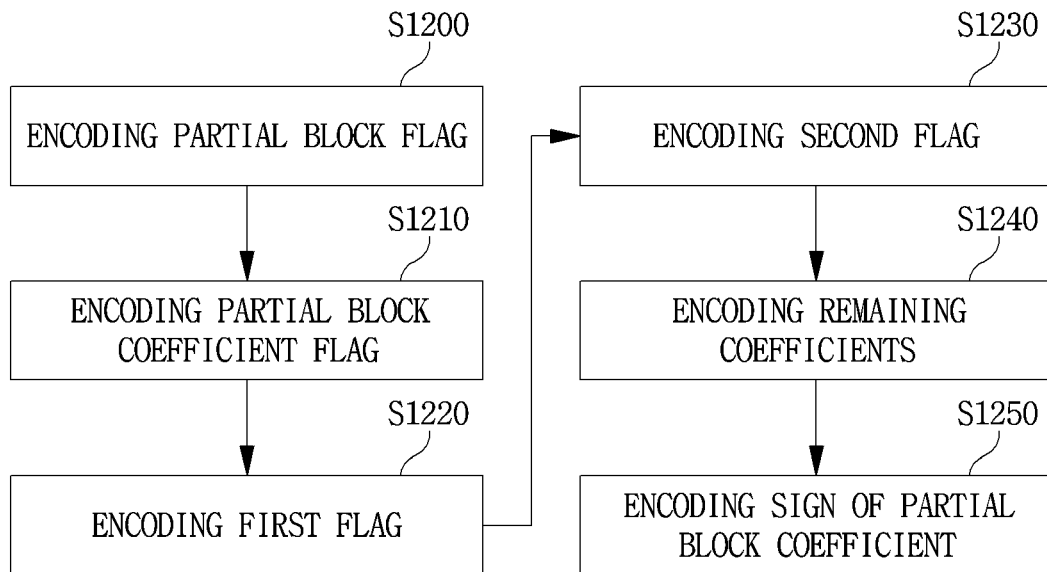
FIG. 12 is a diagram illustrating a method of encoding coefficients of a transform block as an embodiment to which the present invention is applied.

FIG. 12 is a diagram illustrating a method of encoding coefficients of a transform block as an embodiment to which the present invention is applied.

In an image encoding device, coefficients of a transform block may be encoded in units of a predetermined block unit (hereinafter, referred to as a partial block). A transform block may include one or more partial blocks. The partial block may be a block of N×M size. Here, N and M are natural numbers, and N and M may be the same or different from each other. That is, a partial block may be a square or a non-square block. A size/shape of a partial block may be fixed (e.g., 4×4) predefined in an image encoding device, or may be variably determined according to a size/shape of a transform block. Alternatively, an image encoding device may determine an optimal size/shape of a partial block in consideration of an encoding efficiency, and encode the partial block. Information on a size/shape of an encoded partial block may be signaled in a level of at least one of a sequence, a picture, a slice or a block.

An order of encoding partial blocks included in a transform block may be determined according to a predetermined scan type (hereinafter, referred to as a first scan type) in an image encoding device. In addition, an order of encoding coefficients included in a partial block may be determined according to a predetermined scan type (hereinafter, referred to as a second scan type). The first scan type and the second scan type may be the same or different. For the first/second scan type, a diagonal scan, a vertical scan, or a horizontal scan and the like may be used. However, the present invention is not limited thereto, and one or more scan types having predetermined angles may be further added. The first/second scan type may be determined based on at least one of coding block related information (e.g., maximum/minimum size, partitioning technique, etc.), size/shape of transform block, size/shape of partial block, prediction mode, intra-prediction related information (e.g., a value of intra-prediction mode, directionality, angle, etc.) or inter-prediction related information.

An image encoding device may encode, in a transform block, position information of a coefficient (hereinafter, referred to as a non-zero coefficient) having non-zero value first appeared in the above-described encoding order. Encoding may be performed sequentially from a partial block including the non-zero coefficient. Hereinafter, referring to FIG. 12, a procedure of encoding coefficients of a partial block will be described.

A partial block flag for a current partial block may be encoded (S1200). The partial block flag may be encoded in units of a partial block. The partial block flag may indicate whether there is at least one non-zero coefficient in the current partial block. For example, when the partial block flag is a first value, it may indicate that the current partial block includes at least one non-zero coefficient, and when the partial block flag is a second value, it may indicate that all coefficients of the current partial block are 0.

A partial block coefficient flag for a current partial block may be encoded (S1210). The partial block coefficient flag may be encoded in units of a coefficient. The partial block coefficient flag may indicate whether a coefficient is a non-zero coefficient. For example, when the coefficient is a non-zero coefficient, the partial block coefficient flag may be encoded to a first value, and when the coefficient is zero, the partial block coefficient flag may be encoded to a second value. The partial block coefficient flag may be selectively encoded according to the partial block flag. For example, a current partial block may be encoded for each coefficient of a partial block only when there is at least one non-zero coefficient present in the current partial block (i.e., the partial block flag is a first value).

A flag (hereinafter, referred to as a first flag) indicating whether an absolute value of a coefficient is greater than 1 may be encoded (S1220). The first flag may be selectively encoded according to a value of the partial block coefficient flag. For example, when the coefficient is a non-zero coefficient (i.e., the partial block coefficient flag is a first value), the first flag may be encoded by checking whether an absolute value of the coefficient is greater than 1. When the absolute value of the coefficient is greater than 1, the first flag is encoded to a first value, and when the absolute value of the coefficient is not greater than 1, the first flag may be encoded to a second value.

A flag (hereinafter, referred to as a second flag) indicating whether an absolute value of a coefficient is greater than 2 may be encoded (S1230). The second flag may be selectively encoded according to a value of the first flag. For example, when the coefficient is greater than 1 (i.e., the first flag is a first value), the second flag may be encoded by checking whether an absolute value of the coefficient is greater than 2. When the absolute value of the coefficient is greater than 2, the second flag is encoded to a first value, and when the absolute value of the coefficient is not greater than 2, the second flag may be encoded to a second value.

The number of at least one of the first flag or the second flag may be at least one to at most N*M. Alternatively, at least one of the first flag or the second flag may be a fixed number (e.g., one, two, or more) predefined in an image encoding device. The number of the first/second flag may be different depending on a block size/depth, a partitioning technique (e.g., quad tree, binary tree), a transforming technique (e.g., DCT, DST), whether to skip transform, quantization parameters, prediction mode (e.g., intra/inter mode), and so on. In addition to the first/second flag, an n-th flag indicating whether an absolute value of a coefficient is greater than n may be additionally encoded. Here, n may mean a natural number greater than two. The number of the n-th flag may be one, two, or more, and may be determined in the same/similar manner as the first/second flag described above.

Remaining coefficients that are not encoded based on the first/second flag may be encoded in a current partial block (S1240). Here, the encoding may be a procedure of encoding the coefficient value itself. The remaining coefficients may be equal to or greater than two. The remaining coefficient may be encoded based on at least one of a partial block coefficient flag, a first flag or a second flag for the remaining coefficient. For example, the remaining coefficient may be encoded to a value obtained by subtracting (partial block coefficient flag+first flag+second flag) from an absolute value of the remaining coefficient.

A sign for a coefficient of a partial block may be encoded (S1250). The sign may be encoded in a flag format in units of a coefficient. The sign may be selectively encoded according to a value of the partial block coefficient flag described above. For example, the sign may be encoded only when the coefficient is a non-zero coefficient (i.e., the partial block coefficient flag is a first value).

As described above, each of absolute values of coefficients of the partial block may be encoded through at least one of encoding a partial block coefficient flag, encoding a first flag, encoding a second flag, or encoding a remaining coefficient.

In addition, above-described encoding coefficients of a partial block may further include a procedure of specifying a range of coefficient values belonging to the partial block. Through the above procedure, it may be confirmed whether or not at least one non-zero coefficient exists in a partial block. The above procedure may be implemented through encoding a first threshold value flag which will be described below. The above procedure may be implemented by being included in any one of the above-described steps S1200 to S1250, or may be implemented in a form that is substituted for at least one of steps S1200 to S1250. Hereinafter, the procedure of specifying a range of coefficient values belonging to a partial block will be described in detail with reference to FIG. 13.

Figure 13:
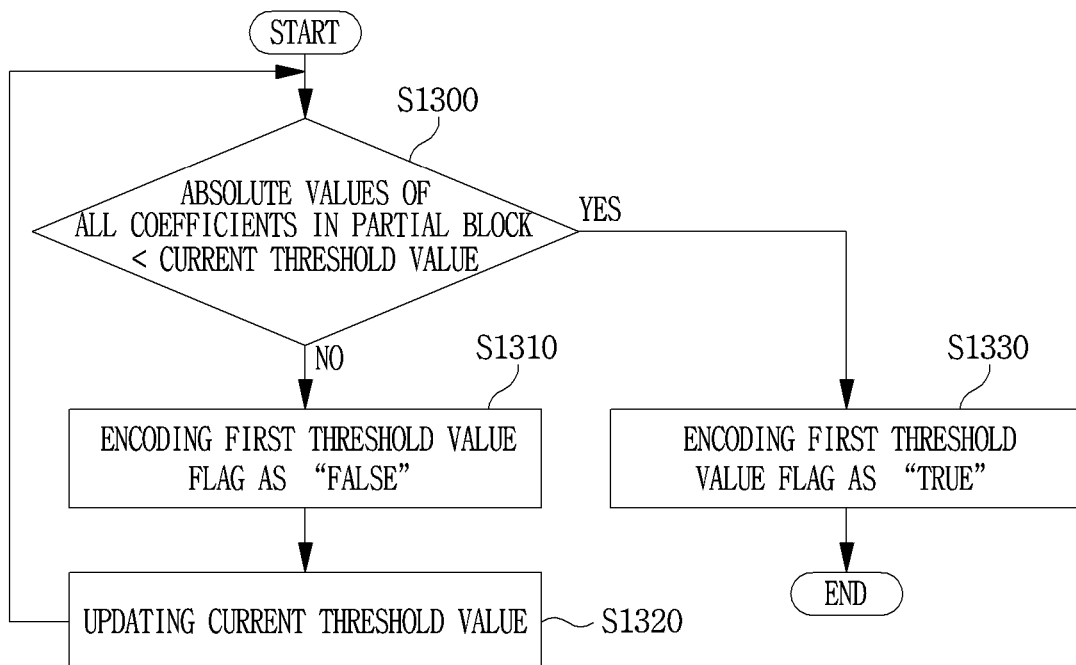
FIG. 13 is a diagram illustrating a method of encoding a first threshold value flag for a partial block as an embodiment to which the present invention is applied.

FIG. 13 is a diagram illustrating a method of encoding a first threshold value flag for a partial block as an embodiment to which the present invention is applied.

A first threshold value flag of the present invention may indicate whether or not all coefficients of a partial block are smaller than a predetermined threshold value. The number of threshold values may be N (N>=1), where a range of threshold values may be represented by $\{T_0, T_1, T_2, \ldots, T_{N-1}\}$. Here, the 0th threshold value $T_0$ denotes a minimum value, and the (N−1)-th threshold value $T_{N-1}$ denotes a maximum value, and $\{T_0, T_1, T_2, \ldots, T_{N-1}\}$ may be those in which the threshold values are arranged in ascending order. The number of the threshold values may be predetermined in an image encoding device. The image encoding device may determine an optimal number of threshold values in consideration of encoding The threshold value may be obtained by setting the minimum value to 1 and increasing the minimum value by n (n>=1). The threshold value may be predetermined in an image encoding device. The image encoding device may determine an optimal threshold value in consideration of the encoding efficiency and encode the threshold value.

The range of the threshold value may be determined differently depending on a quantization parameter (QP). The QP may be set at a level of at least one of a sequence, a picture, a slice, or a transform block.

For example, when the QP is greater than a predetermined QP threshold, it may be expected that the distribution of zero coefficients in a transform block will be higher. In this case, the range of the threshold value may be determined as {3}, or the encoding procedure of the first threshold value flag may be omitted, and coefficients of a partial block may be encoded through steps S1200 to S1250 described above.

When the QP is smaller than a predetermined QP threshold, it may be expected that the distribution of non-zero coefficients in a transform block will be higher. In this case, the range of the threshold value may be determined as {3, 5} or {5, 3}.

That is, the range of threshold values when QP is small may have the number and/or size (e.g., maximum value) of the threshold values different from the threshold value range when QP is large. The number of QP threshold values may be one, two, or more. The QP threshold value may be predetermined in an image encoding device. For example, the QP threshold value may correspond to a median value of a range of QPs available in the image encoding device. Alternatively, the image encoding device may determine an optimal QP threshold value considering encoding efficiency, and encode the QP threshold value.

Alternatively, a range of threshold values may be determined differently depending on the size/shape of a block. Here, a block may mean a coding block, a prediction block, a transform block, or a partial block. The size may be represented by at least one of a width, a height, a sum of a width and a height, or the number of coefficient.

For example, when a size of a block is smaller than a predetermined threshold size, a range of threshold values may be determined as {3}, or the encoding procedure of the first threshold value flag may be omitted, and coefficients of a partial block may be encoded through steps S1200 to S1250 described above. When a size of a block is larger than a predetermined threshold size, a range of threshold values may be determined as {3, 5} or {5, 3}.

That is, the range of threshold values when a block size is small may have the number and/or size (e.g., maximum value) of the threshold values different from the threshold value range when a block size is large. The number of threshold size may be one, two, or more. The threshold size may be predetermined in an image encoding device. For example, the threshold size may be represented by a×b, wherein a and b are 2, 4, 8, 16, 32, 64 or more, and a and b may be equal to or different from each other. Alternatively, the image encoding device may determine an optimal threshold size considering encoding efficiency, and encode the threshold size.

Alternatively, the range of threshold values may be determined differently depending on a range of pixel values. The range of pixel values may be represented by a maximum value and/or a minimum value of pixels belonging to a predetermined region. Here, the predetermined region may mean at least one of a sequence, a picture, a slice, or a block.

For example, when the difference between the maximum value and the minimum value of the range of pixel values is smaller than a predetermined threshold difference value, the range of threshold values is determined as {3}, or the encoding procedure of the first threshold value flag may be omitted, and coefficients of a partial block may be encoded through steps S1200 to S1250 described above. When the difference is larger than a predetermined threshold difference value, the range of threshold values may be determined as {3, 5} or {5, 3}.

That is, the range of threshold values when the difference is small may have the number and/or size (e.g., maximum value) of the threshold values different from a range of threshold values when the difference is large. The number of threshold difference values may be one, two, or more. The threshold difference value may be predetermined in an image encoding device. Alternatively, the image encoding device may determine an optimal threshold difference value considering encoding efficiency, and encode the threshold difference value.

Referring to FIG. 13, it may be determined whether absolute values of all coefficients in a current partial block is smaller than a current threshold value (S1300).

When the absolute values of all coefficients are not smaller than the current threshold value, a first threshold value flag may be encoded as "false" (S1310). In this case, the current threshold value (i-th threshold value) may be updated to the next threshold value ((i+1)-th threshold value) (S1320), and the above described step S500 may be performed based on the updated current threshold value. Alternatively, when absolute values of all coefficients are not smaller than the current threshold value, the first threshold value flag encoding procedure of step S1310 may be omitted, and the current threshold value may be updated to the next threshold value.

When the current threshold value reaches a maximum value of a threshold value or when the number of the threshold values is 1, the current threshold value may be updated by adding a predetermined constant to the current threshold value. The predetermined constant may be an integer greater than or equal to one. Here, the update may be repeatedly performed until the first threshold value flag is encoded as "true". Based on the updated current threshold value, step S1300 may be performed. Alternatively, when the current threshold value reaches the maximum value of the threshold value or when the number of threshold values is 1, the updating procedure may be terminated.

When absolute values of all coefficients are smaller than a current threshold value, the first threshold value flag may be encoded as "true" (S1330).

As described above, when the first threshold value flag for the i-th threshold value is "true", this may indicate that absolute values of all coefficients in a partial block are smaller than the i-th threshold value. When the first threshold value flag for the i-th threshold is "false", this may indicate that absolute values of all coefficients in the partial block is greater than or equal to the i-th threshold. Based on the first threshold flag that is "true", a range of coefficient values belonging to the partial block may be specified. That is, when the first threshold value flag for the i-th threshold value is "true", the coefficient belonging to the partial block may fall within the range of 0 to (i-th threshold value−1).

According to the encoded first threshold value flag, at least one of steps S1200 to S1250 described above may be omitted.

For example, when a range of threshold values is {3, 5}, at least one of the first threshold value flag for the threshold value "3" or the first threshold value flag for the threshold value "5" may be encoded. When the first threshold value flag for the threshold value "3" is "true", absolute values of all coefficients in the partial block may fall within the range of 0 to 2. In this case, coefficients of the partial block may be encoded by performing the remaining steps except at least one of the above-described steps S1230 or S1240, or the coefficients of the partial block may be encoded by performing the remaining steps except at least one of S1200, S1230 or S1240.

When the first threshold value flag for the threshold "3" is "false", the first threshold value flag for the threshold "5" may be encoded. When the first threshold value flag for the threshold "5" is "false", at least one of absolute values of coefficients in a partial block may be greater than or equal to 5. In this case, coefficients of the partial block may be encoded by performing the above-described steps S1200 to S1250 in the same manner, or coefficients of the partial block may be encoded by performing the remaining steps except step S1200.

When the first threshold value flag for the threshold "5" is "true", absolute values of all coefficients in the partial block may fall within the range of 0 to 4. In this case, coefficients of the partial block may be encoded by performing the above-described steps S1200 to S1250 in the same manner, or coefficients of the partial block may be encoded by performing the remaining steps except step S1200.

In addition, a first threshold value flag of a current partial block may be derived based on a first threshold flag of another partial block. In this case, the encoding procedure of the first threshold value flag may be omitted, and this will be described with reference to FIG. 16.

Figure 14:
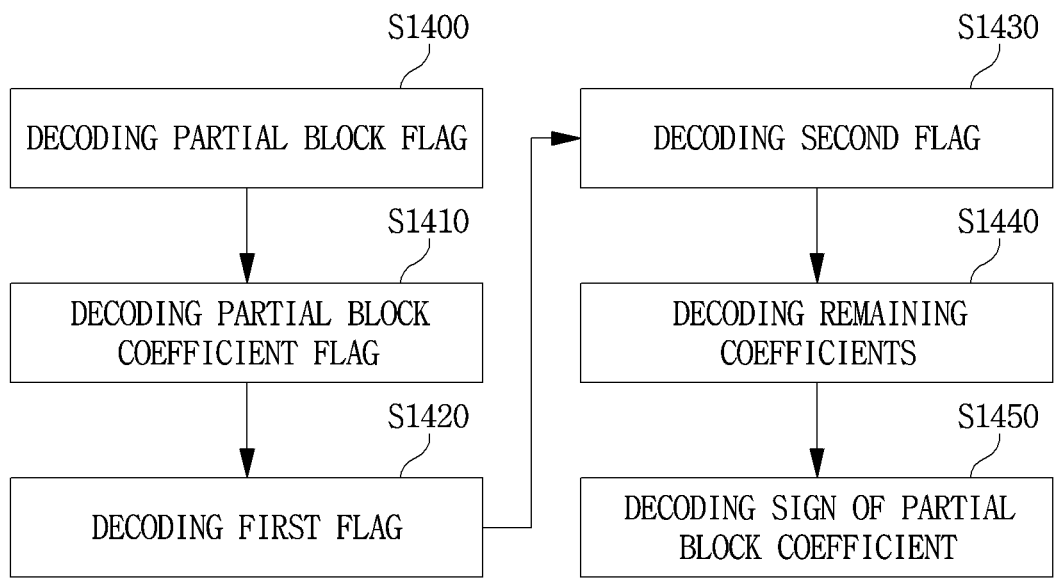
FIG. 14 is a diagram illustrating a method of decoding coefficients of a transform block as an embodiment to which the present invention is applied.

FIG. 14 is a diagram illustrating a method of decoding coefficients of a transform block as an embodiment to which the present invention is applied.

Coefficients of a transform block may be decoded in units of a predetermined block (hereinafter, referred to as a partial block) in an image decoding device. A transform block may include one or more partial blocks. A partial block may be a block of N×M size. Here, N and M are natural numbers, and N and M may be equal to or different from each other. That is, a partial block may be a square or a non-square block. A size/shape of a partial block may be fixed (e.g., 4×4) predefined in an image decoding device, may be variably determined depending on a size/shape of a transform block, or may be variably determined based on signaled information on a size/shape of a partial block. Information on a size/shape of a partial block may be signaled in a level of at least one of a sequence, a picture, a slice or a block.

An order of decoding partial blocks belonging to a transform block may be determined according to a predetermined scan type (hereinafter, referred to as a first scan type) in an image decoding device. In addition, an order of decoding coefficients belonging to a partial block may be determined according to a predetermined scan type (hereinafter, referred to as a second scan type). The first scan type and the second scan type may be the same or different. For the first/second scan type, a diagonal scan, a vertical scan, a horizontal scan and the like may be used. However, the present invention is not limited thereto, and one or more scan types having predetermined angles may be further added. The first/second scan type may be determined based on at least one of coding block related information (e.g., maximum/minimum size, partitioning technique, etc.), size/shape of transform block, size/shape of partial block, prediction mode, intra-prediction related information (e.g., a value of intra-prediction mode, directionality, angle, etc.) or inter-prediction related information.

An image decoding device may decode, in a transform block, position information of a coefficient (hereinafter, referred to as a non-zero coefficient) having non-zero value first appeared in the above-described decoding order. Decoding may be performed sequentially from a partial block according to the position information. Hereinafter, a procedure of decoding coefficients of a partial block will be described with reference to FIG. 14.

A partial block flag for a current partial block may be decoded (S1400). The partial block flag may be decoded in units of a partial block. The partial block flag may indicate whether there is at least one non-zero coefficient in the current partial block. For example, when the partial block flag is a first value, it may indicate that the current partial block includes at least one non-zero coefficient, and when the partial block flag is a second value, it may indicate that all coefficients of the current partial block are 0.

A partial block coefficient flag for a current partial block may be decoded (S1410). The partial block coefficient flag may be decoded in units of a coefficient. The partial block coefficient flag may indicate whether the coefficient is a non-zero coefficient. For example, when the partial block coefficient flag is a first value, it may indicate that the coefficient is a non-zero coefficient, and when the partial block coefficient flag is a second value, it may indicate that the coefficient is zero. The partial block coefficient flag may be selectively decoded according to the partial block flag. For example, a current partial block may be decoded for each coefficient of a partial block only when there is at least one non-zero coefficient present in the current partial block (i.e., the partial block flag is a first value).

A flag (hereinafter, referred to as a first flag) indicating whether an absolute value of a coefficient is greater than 1 may be decoded (S1420). The first flag may be selectively decoded according to a value of the partial block coefficient flag. For example, when the coefficient is a non-zero coefficient (i.e., the partial block coefficient flag is a first value), the first flag may be decoded to check whether the absolute value of the coefficient is greater than 1. When the first flag is a first value, the absolute value of the coefficient is greater than 1, and when the first flag is a second value, the absolute value of the coefficient may be 1.

A flag (hereinafter, referred to as a second flag) indicating whether an absolute value of a coefficient is greater than 2 may be decoded (S1430). The second flag may be selectively decoded according to a value of the first flag. For example, when the coefficient is greater than 1 (i.e., the first flag is a first value), the second flag may be decoded to check whether the absolute value of the coefficient is greater than 2. When the second flag is a first value, the absolute value of the coefficient is greater than 2, and when the second flag is a second value, the absolute value of the coefficient may be 2.

The number of at least one of the first flag or the second flag may be at least one to at most N*M. Alternatively, at least one of the first flag or the second flag may be a fixed number (e.g., one, two, or more) predefined in an image decoding device. The number of the first/second flag may be different depending on a block size/depth, a partitioning technique (e.g., quad tree, binary tree), a transforming technique (e.g., DCT, DST), whether to skip transform, quantization parameters, prediction mode (e.g., intra/inter mode), and so on. In addition to the first/second flag, an n-th flag indicating whether an absolute value of a coefficient is greater than n may be additionally decoded. Here, n may mean a natural number greater than two. The number of the n-th flag may be one, two, or more, and may be determined in the same/similar manner as the first/second flag described above.

Remaining coefficients that are not decoded based on the first/second flag may be decoded in a current partial block (S1440). Here, the decoding may be a procedure of decoding the coefficient value itself. The remaining coefficients may be equal to or greater than two. The remaining coefficient may be encoded based on at least one of a partial block coefficient flag, a first flag or a second flag for the remaining coefficient. For example, the remaining coefficient may be encoded to a value obtained by subtracting (partial block coefficient flag+first flag+second flag) from an absolute value of the remaining coefficient.

A sign for a coefficient of a partial block may be decoded (S1450). The sign may be decoded in a flag format in units of a coefficient. The sign may be selectively decoded according to a value of the partial block coefficient flag described above. For example, the sign may be decoded only when the coefficient is a non-zero coefficient (i.e., the partial block coefficient flag is a first value).

In addition, above-described decoding coefficients of a partial block may further include a procedure of specifying a range of coefficient values belonging to the partial block. Through the above procedure, it may be confirmed whether or not at least one non-zero coefficient exists in a partial block. The above procedure may be implemented through decoding a first threshold value flag which will be described below. The above procedure may be implemented by being included in any one of the above-described steps S1400 to S1450, or may be implemented in a form that is substituted for at least one of steps S1400 to S1450. Hereinafter, the procedure of specifying a range of coefficient values belonging to a partial block will be described in detail with reference to FIG. 15.

Figure 15:
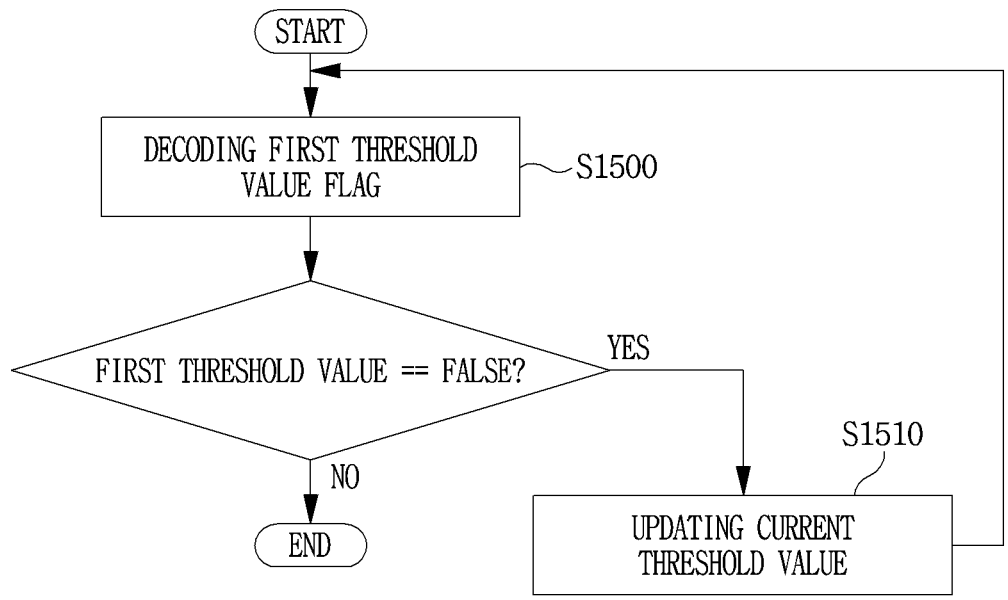
FIG. 15 is a diagram illustrating a method of decoding a first threshold value flag for a partial block as an embodiment to which the present invention is applied.

FIG. 15 is a diagram illustrating a method of decoding a first threshold value flag for a partial block as an embodiment to which the present invention is applied.

A first threshold flag of the present invention may indicate whether or not all coefficients of a partial block are smaller than a predetermined threshold value. The number of threshold values may be N (N>=1), where a range of threshold values may be represented by $\{T_0, T_1, T_2, \ldots, T_{N-1}\}$. Here, the 0th threshold value $T_0$ may denote a minimum value, and the (N−1)-th threshold value $T_{N-1}$ may denotes a maximum value, and $\{T_0, T_1, T_2, \ldots, T_{N-1}\}$ may be those in which the threshold values are arranged in ascending order. The number of threshold values may be predetermined in an image decoding device or may be determined based on signaled information on the number of threshold values.

The threshold value may be obtained by setting a minimum value to 1 and increasing the minimum value by n (n>=1). The threshold value may be set in an image decoding device or may be determined based on signaled information on a threshold value.

A range of threshold values may be determined differently depending on a quantization parameter (QP). The QP may be set at a level of at least one of a sequence, a picture, a slice, or a transform block.

For example, when the QP is larger than a predetermined QP threshold value, a range of threshold values may be determined as {3}, or the first threshold value flag decoding procedure may be omitted, and through the above-described steps of S1400 to S1450 coefficients of a partial block may be decoded.

In addition, when the QP is smaller than a predetermined QP threshold, a range of threshold values may be determined as {3, 5} or {5, 3}.

That is, a range of threshold values when the QP is small may have the number and/or size (e.g., maximum value) of threshold values different from a range of threshold values when the QP is large. The number of QP threshold values may be one, two, or more. The QP threshold value may be set in an image decoding device. For example, the QP threshold value may correspond to a median value of a range of QPs available in an image decoding device. Alternatively, the QP threshold value may be determined based on information on the QP threshold value signaled by an image encoding device.

Alternatively, a range of threshold values may be determined differently depending on a size/shape of a block. Here, a block may mean a coding block, a prediction block, a transform block, or a partial block. The size may be represented by at least one of a width, a height, a sum of a width and a height, or the number of coefficients.

For example, when a block size is smaller than a predetermined threshold size, a range of threshold values may be determined as {3}, or the first threshold value flag decoding procedure may be omitted, and coefficients of a partial block may be decoded through steps S1400 to S1450 described above. In addition, when a block size is larger than a predetermined threshold size, a range of threshold values may be determined as {3, 5} or {5, 3}.

That is, a range of threshold values when a block size is small may have the number and/or size (e.g., maximum value) of threshold values different from a range of threshold values when a block size is large. The number of threshold size may be one, two, or more. The threshold size may be set in an image decoding device. For example, the threshold size may be represented by a×b, where a and b are 2, 4, 8, 16, 32, 64 or more, and a and b may be the same or different. Alternatively, the threshold size may be determined based on information on a threshold size signaled by an image encoding device.

Alternatively, a range of threshold values may be determined differently depending on a range of pixel values. The range of pixel values may be represented by a maximum value and/or a minimum value of pixels belonging to a predetermined region. Here, the predetermined region may mean at least one of a sequence, a picture, a slice, or a block.

For example, when a difference between a maximum value and a minimum value of a range of pixel values is smaller than a predetermined threshold difference value, a range of threshold values may be determined as {3}, or the first threshold value flag decoding procedure may be omitted, and coefficients of a partial block may be decoded through steps S1400 to S1450 described above. In addition, when the difference is larger than a predetermined threshold difference value, the range of threshold values may be determined as {3, 5} or {5, 3}.

That is, a range of threshold values when the difference is small may have the number and/or size (e.g., maximum value) of threshold values different from a range of threshold values when the difference is large. The number of threshold difference values may be one, two, or more. The threshold difference value may be set in an image decoding device or may be determined based on information on a threshold difference value signaled by an image encoding device.

Referring to FIG. 15, a first threshold value flag for a current threshold value may be decoded (S1500).

The first threshold value flag may indicate whether absolute values of all coefficients of a partial block are smaller than a current threshold value. For example, when the first threshold value flag is "false", it may indicate that absolute values of all coefficients of a partial block are greater than or equal to a current threshold. In addition, when the first threshold value flag is "true", it may indicate that absolute values of all coefficients of a partial block are smaller than a current threshold value.

When the first threshold value flag is "false", the current threshold value (i-th threshold value) may be updated to the next threshold value ((i+1-th threshold value) (S1510), based on the updated current threshold value, step S1500 described above may be performed.

When the current threshold value reaches a maximum value of threshold values or when the number of threshold values is 1, the current threshold value may be updated by adding a predetermined constant to the current threshold value. The predetermined constant may be an integer greater than or equal to one. Here, the update may be repeatedly performed until the first threshold value that is "true" is decoded. Alternatively, when the current threshold value reaches a maximum value of threshold values or when the number of threshold values is 1, the updating procedure may be terminated.

As shown in FIG. 15, when the first threshold value flag is "true", decoding of a first threshold value flag may not be performed any more.

As described above, when a first threshold value flag for the i-th threshold value is "true", it may indicate that absolute values of all coefficients in a partial block are smaller than the i-th threshold value. In addition, when a first threshold flag for the i-th threshold value is "false", it may indicate that absolute values of all coefficients in a partial block are greater than or equal to the i-th threshold value. Based on the first threshold value flag that is "true", a range of coefficient values belonging to a partial block may be specified. That is, when a first threshold value flag for the i-th threshold value is "true", a coefficient belonging to a partial block may fall within a range of 0 to (i-th threshold value−1).

According to the decoded first threshold value flag, at least one of steps S1400 to S1450 described above may be omitted.

For example, when a range of threshold values is {3, 5}, at least one of a first threshold value flag for the threshold value "3" or a first threshold value flag for the threshold value "5" may be decoded. When the first threshold value flag for the threshold value "3" is "true", absolute values of all coefficients in a partial block may fall within the range of 0 to 2. In this case, coefficients of a partial block may be decoded by performing the remaining steps except at least one of the steps S1430 or S1440 described above, or coefficients of a partial block may be decoded by performing the remaining steps except at least one of the steps S1400, S1430 or S1440 described above.

When the first threshold value flag for the threshold value "3" is "false", the first threshold value flag for the threshold value "5" may be decoded. When the first threshold value flag for the threshold value "5" is "false", at least one of absolute values of coefficients in a partial block may be greater than or equal to 5. In this case, coefficients of a partial block may be decoded by performing the above-described steps S1400 to S1450 in the same manner, or coefficients of a partial block may be decoded by performing the remaining steps except step S1400.

In addition, when the first threshold value flag for the threshold value "5" is "true", absolute values of all coefficients in a partial block may fall within the range of 0 to 4. In this case, coefficients of a partial block may be decoded by performing the above-described steps S1400 to S1450 in the same manner, or coefficients of a partial block may be decoded by performing the remaining steps except step S1400.

In addition, a first threshold value flag of a current partial block may be derived based on a first threshold value flag of another partial block. In this case, decoding procedure for a first threshold value flag may be omitted, and this will be described with reference to FIG. 16.

Figure 16:
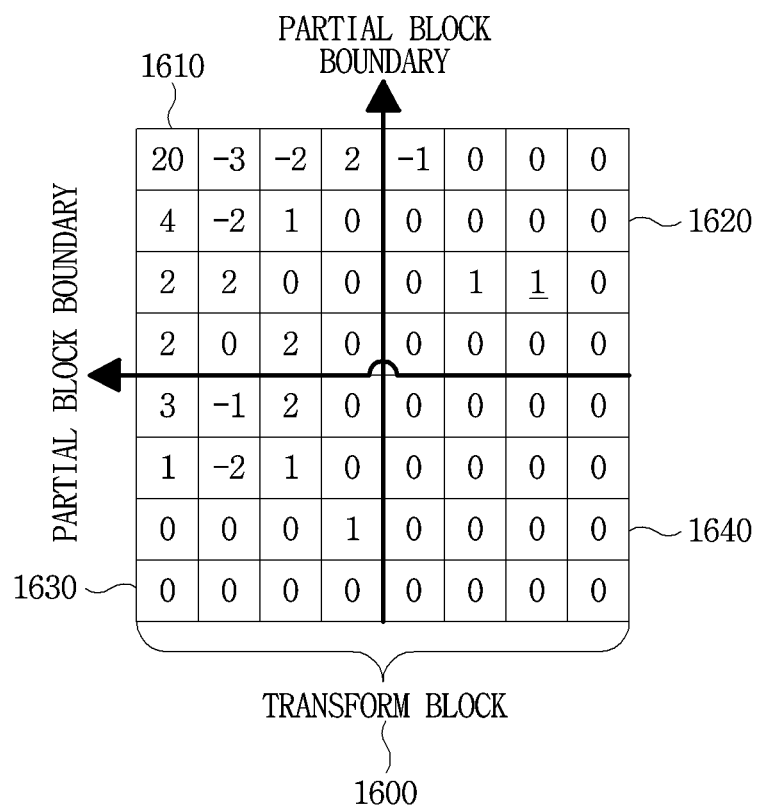
FIG. 16 is a diagram illustrating a method of deriving a first threshold value flag for a current partial block as an embodiment to which the present invention is applied.

FIG. 16 is a diagram illustrating a method of deriving a first threshold value flag for a current partial block as an embodiment to which the present invention is applied.

In this embodiment, it is assumed that a transform block 1600 is 8×8, a partial block is 4×4, a block including a non-zero coefficient that is first appeared is 1620, and partial blocks of the transform block are encoded/decoded in an order of 1640, 1620, 1630, 1610 depending on scan type.

In a current partial block, a first threshold value flag for a particular threshold value may be derived based on a first threshold value flag of a previous partial block. For example, based on a first threshold value flag that is "false" in a previous partial block, a first threshold value flag of a current partial block may be derived as "false". Here, it is assumed that {3, 5, 7} is used as a range of threshold values.

Specifically, since the partial block 1640 which is a first place in the encoding/decoding order has earlier encoding/decoding order than a position of the partial block 1620 to which a non-zero coefficient that is first appeared belongs, a first threshold value flag may not be encoded/decoded. In the partial block 1620 which is a second place in the encoding/decoding order, since the first threshold value flag for the threshold value "3" is "true", only the first threshold flag for the threshold value "3" may be encoded/decoded. In the partial block 1630 which is a third place in the encoding/decoding order, since the first threshold value flag for the threshold value "3" is "false" and the first threshold value flag for the threshold value "5" is "true", the first threshold flags for the threshold value "3" and "5" may be respectively encoded/decoded. In the partial block 1610 which is a last place in the encoding/decoding order, the first threshold value flag for the threshold value "3" is "false" and the first threshold value flag for the threshold value "5" is "false". Here, since the first threshold flag for the threshold value "3" in the previous partial block 1630 is "false", it may be expected that the current partial block 1610 has at least one coefficient that has absolute value equal to or greater than 3, the first threshold value flag for the threshold value "3" may be derived as "false".

In a current partial block, a first threshold value flag for a particular threshold value may be derived based on a first threshold value flag of a previous partial block. For example, based on a first threshold value flag that is "false" in a previous partial block, the first threshold value flag of the current partial block may be derived "false".

Hereinafter, a method of determining a partial block of a transform block will be described in detail.

An image encoding device may determine a partial block having a predetermined size/shape constituting a transform block, and may encode information on the size/shape of the partial block. An image decoding device may determine a size/shape of a partial block based on the encoded information (first method). Alternatively, a size/shape of a partial block may be determined through a predetermined rule in an image encoding/decoding device (second method). Information indicating whether to determine a size/shape of a partial block through which one of the first and second methods may be signaled in at least one layer of a video, a sequence, a picture, a slice, or a block. The block may refer to a coding block, a prediction block or a transform block.

A size of a partial block in a transform block may be equal to or smaller than a size of the transform block. A shape of the transform block/partial block may be square or non-square. A shape of a transform block may be the same as or different from a shape of a partial block.

Information on a shape of a transform block may be encoded. Here, the information may include at least one of information on whether to use only a square, a non-square, or both a square and a non-square for a shape of a transform block. The information may be signaled in at least one layer of a video, a sequence, a picture, a slice, or a block. The block may refer to a coding block, a prediction block, or a transform block. Information on a size of a transform block may be encoded. Here, the information may include at least one of a minimum size, a maximum size, a partitioning depth or a maximum/minimum value for a partitioning depth. The information may be signaled in at least one layer of a video, a sequence, a picture, a slice, or a block.

Information on a shape of a partial block may be encoded. Here, the information may include at least one of information on whether to use only a square, a non-square, or both a square and a non-square for a shape of a partial block. The information may be signaled in at least one layer of a video, a sequence, a picture, a slice, or a block. The block may refer to a coding block, a prediction block, or a transform block. Information on a size of a partial block may be encoded. Here, the information may include at least one of a minimum size, a maximum size, a partitioning depth, and a maximum/minimum value for a partitioning depth. The information may be signaled in at least one layer of a video, a sequence, a picture, a slice, or a block.

Figure 17:
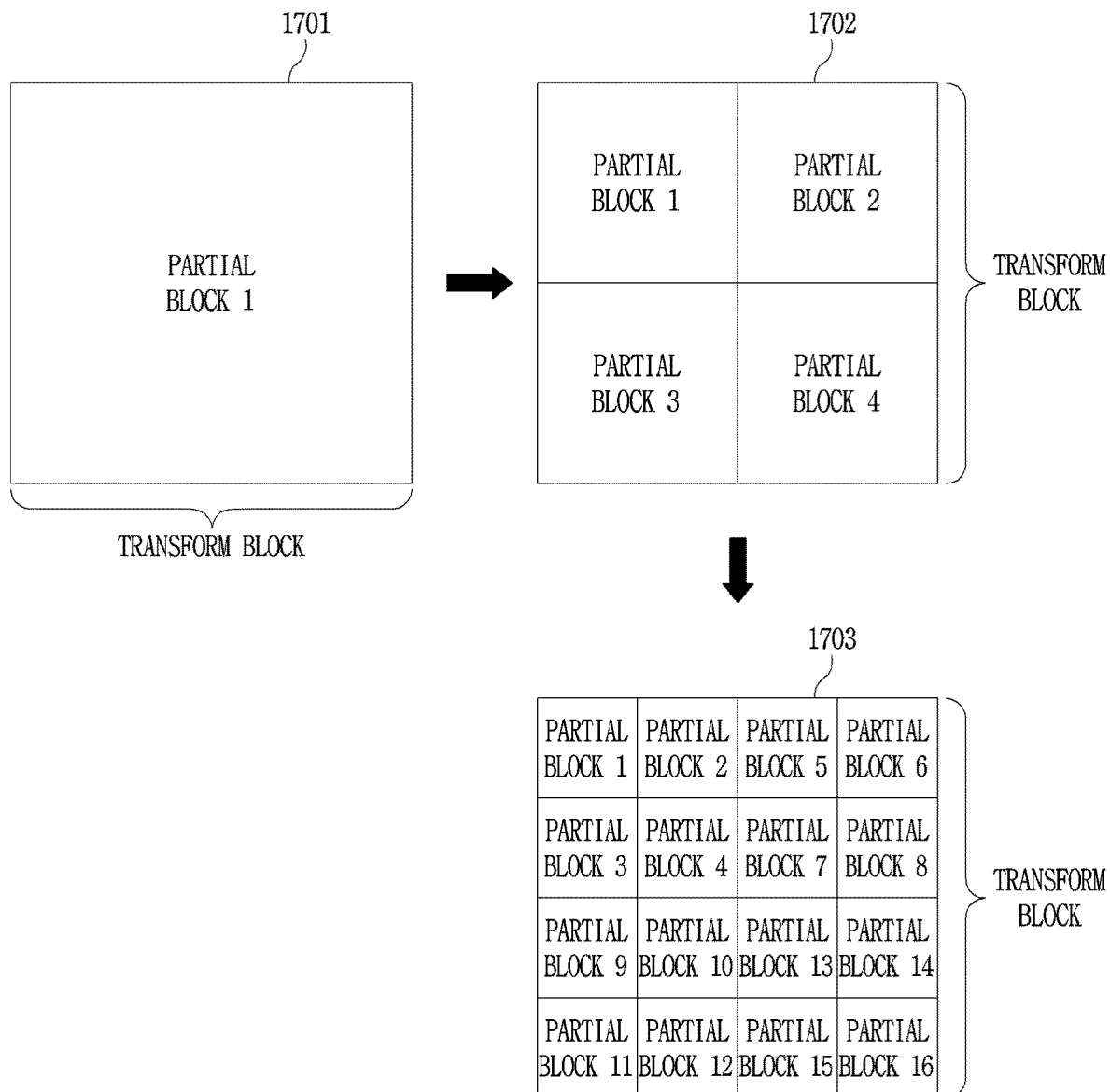
FIG. 17 is a diagram illustrating a method of determining a size/shape of a partial block based on partitioning index information as an embodiment to which the present invention is applied.

FIG. 17 is a diagram illustrating a method of determining a size/shape of a partial block based on partitioning index information as an embodiment to which the present invention is applied.

An image encoding device may determine which partitioning format of a partial block is the most optimal through RDO, from when all partial blocks of a transform block have maximum size until when all partial blocks have minimum size.

Referring to FIG. 17, a transform block 1701 is composed of one partial block 1, and an RD-cost value in this case may be calculated. The partial block 1 may be a partial block of a maximum size predefined in an image encoding device. A transform block 1702 is a case where the transform block 1701 is partitioned into four partial blocks 1-4, and an RD-cost value in this case may be calculated. A transform block 1703 is a case where each partial block of the transform block 1702 is again partitioned into four partial blocks, and an RD-cost value in this case may be calculated.

As described above, within a range of a partial block of a maximum size to a minimum size, RD-cost values may be calculated while partitioning a transform block into partial blocks of the same size. An optimal partitioning is determined based on the RD-cost values, and a partitioning index information indicating optimal partitioning may be encoded. An image decoding device may determine a size/shape of a partial block in a transform block based on the encoded partitioning index information.

For example, when a transform block 1701 is the optimum partitioning, an image encoding device may encode "0" as a partitioning index information, and when a transform block 1702 is the optimum partitioning, an image encoding device may encode "1" as a partitioning index information, when a transform block 1703 is the optimum partitioning, an image encoding device may encode "2" as a partitioning index information, respectively. An image decoding device may determine a size/shape of a partial block in a transform block based on the encoded partitioning index information.

Depending on a quantization parameter (QP) of a transform block, all or some of partial blocks in the transform block may be selectively encoded/decoded. For example, when the QP of the transform block is larger than a predetermined QP threshold value, only a partial region in the transform block may be encoded/decoded. In addition, when the QP of the transform block is smaller than a predetermined QP threshold value, all partial blocks in the transform block may be encoded/decoded.

Here, the partial region may be specified by at least one of a predetermined vertical line or a horizontal line. The vertical line may be located apart from a left boundary of a transform block by a distance a to the left direction, and the horizontal line may be located apart from a top boundary of a transform block by a distance b to the bottom direction. The a and b are natural numbers, and may be the same or different from each other. The a may fall within a range of 0 to a width of a transform block, and the b may fall within a range of 0 to a height of a transform block. The partial region may be a region located on a left side with respect to the vertical line and/or on an upper side with respect to the horizontal line. The position of the vertical/horizontal line may be predetermined in an image encoding/decoding device, or may be variably determined in consideration of a size/shape of a transform block. Alternatively, an image encoding device may encode information specifying a partial region (e.g., information for specifying a position of the vertical/horizontal line) and signal the information, and an image decoding device may specify a partial region based on the signaled information. A boundary of the specified partial region may or may not be in contact with a boundary of a partial block in a transform block.

For example, the partial region may be one partial block of a region where DC components are concentrated or N partial blocks (N≥1) further including an adjacent partial block. Alternatively, the partial region may be specified by a vertical line crossing 1/n point of a top boundary of a transform block and/or a horizontal line crossing 1/m point of a left boundary of a transform block. The n and m are natural numbers and may be the same or different from each other.

The number of QP threshold values may be one, two, or more. A QP threshold value may be predetermined in an image encoding device. For example, the QP threshold value may correspond to a median value of a range of QPs available in an image encoding/decoding device. Alternatively, an image encoding device may determine an optimal QP threshold value considering encoding efficiency, and may encode the QP threshold.

Alternatively, depending on a size of a transform block, all or some of partial blocks in the transform block may be selectively encoded/decoded. For example, when a size of a transform block is equal to or greater than a predetermined threshold size, only a partial region in the transform block may be encoded/decoded. In addition, when a size of a transform block is smaller than a predetermined threshold size, all partial blocks in a transform block may be encoded/decoded.

Here, the partial region may be specified by at least one of a predetermined vertical line or a horizontal line. The vertical line may be located apart from a left boundary of a transform block by a distance a to the left direction, and the horizontal line may be located apart from a top boundary of a transform block by a distance b to the bottom direction. The a and b are natural numbers, and may be the same or different from each other. The a may fall within a range of 0 to a width of a transform block, and the b may fall within a range of 0 to a height of a transform block. The partial region may be a region located on a left side with respect to the vertical line and/or on an upper side with respect to the horizontal line. The position of the vertical/horizontal line may be predetermined in an image encoding/decoding device, or may be variably determined in consideration of a size/shape of a transform block. Alternatively, an image encoding device may encode information specifying a partial region (e.g., information for specifying a position of the vertical/horizontal line) and signal the information, and an image decoding device may specify a partial region based on the signaled information. A boundary of the specified partial region may or may not be in contact with a boundary of a partial block in a transform block.

For example, the partial region may be one partial block of a region where DC components are concentrated or N partial blocks (N≥1) further including an adjacent partial block. Alternatively, the partial region may be specified by a vertical line crossing 1/n point of a top boundary of a transform block and/or a horizontal line crossing 1/m point of a left boundary of a transform block. The n and m are natural numbers and may be the same or different from each other.

The number of threshold sizes may be one, two, or more. The threshold size may be predetermined in an image encoding device. For example, the threshold size may be represented by c×d, where c and d are 2, 4, 8, 16, 32, 64 or more, and c and d may be the same or different. Alternatively, an image encoding device may determine an optimal threshold size in consideration of encoding efficiency, and encode the threshold size.

Hereinafter, a method for efficiently encoding/decoding the above-described partial block coefficient flag will be described with reference to FIG. 18 to FIG. 23.

In a frequency domain, DC component region in a transform block has a high probability that a partial block coefficient flag is determined as "1", and AC component region has a high probability that a partial block coefficient flag is determined as "0". In consideration of such statistical characteristics, a partial block coefficient flag may be encoded.

Figure 18:
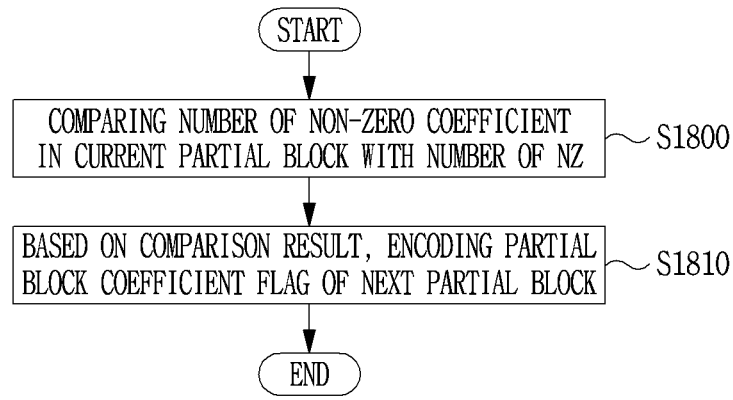
FIG. 18 is a diagram illustrating a method of encoding a partial block coefficient flag based on the number of non-zero coefficients in a partial block as an embodiment to which the present invention is applied.

FIG. 18 is a diagram illustrating a method of encoding a partial block coefficient flag based on the number of non-zero coefficients in a partial block as an embodiment to which the present invention is applied.

First, a partial block coefficient flag may be encoded with respect to a coefficient of a current partial block. That is, when the coefficient is a non-zero coefficient, the partial block coefficient flag may be encoded to a first value (e.g., "1") and when the coefficient is 0, the partial block coefficient flag may be encoded to a second value (e.g., "0"). The partial block coefficient flag may be encoded for each coefficient belonging to a current partial block, and the number of non-zero coefficients belonging to a current partial block may be determined through the above-described procedure. A partial block coefficient flag of a next partial block may be encoded based on the number of non-zero coefficients in a current partial block.

Referring to FIG. 18, the number of non-zero coefficients in a current partial block may be compared with a predetermined threshold value (hereinafter, referred to as the number of NZ) (S1800). Here, the number of NZ may be a fixed number pre-determined in an image encoding device, or may be variably determined based on a size of a transform block and/or a partial block. For example, when a partial block is N×N, the partial block includes (N*N) coefficients, where the number of NZ may be determined as a value of (N*N)/2.

Based on a comparison result of step S1800, a partial block coefficient flag for a coefficient of a next partial block may be encoded (S1810). Here, the next partial block may mean a partial block to be encoded next to a current partial block according to an encoding order (or an order according to a scan type).

For example, when the number of non-zero coefficients in the current partial block is larger than the number of NZ, a partial block coefficient flag of the next partial block may be encoded in a different meaning from a partial block coefficient flag of the current partial block. That is, in the next partial block, when a coefficient is a non-zero coefficient, a partial block coefficient flag for the coefficient may be encoded to a second value (e.g., "0"), and when the coefficient is 0, a partial block coefficient flag for the coefficient may be encoded to a first value (e.g., "1").

In addition, when the number of non-zero coefficients in the current partial block is smaller than the number of NZ, a partial block coefficient flag of the next partial block may be encoded in a same meaning as a partial block coefficient flag of the current partial block. That is, in the next partial block, when a coefficient is a non-zero coefficient, a partial block coefficient flag for the coefficient may be encoded to a first value (for example, "1"), and when the coefficient is 0, a partial block coefficient flag for the coefficient may be encoded to a second value (e.g., "0").

The encoding scheme described above may be performed in units of a transform block. For example, the encoding scheme may be restricted to be performed only until the next partial block reaches a partial block having a last encoding order in the transform block. However, the present invention is not limited thereto, and the same/similar scheme may be performed when the current partial block and the next partial block belong to different transform blocks.

When the partial block coefficient flag is encoded according to the above-described manner, an image decoding device may determine whether a coefficient of a current partial block is a non-zero coefficient, based on at least one of encoded partial block coefficient flag for a current partial block or the number of non-zero coefficients in a previous partial block.

For example, when a partial block coefficient flag for a coefficient of a current partial block is a first value, the coefficient may be determined as a non-zero coefficient, and when the partial block coefficient flag is a second value, the coefficient may be determined as "0".

Here, further considering the number of non-zero coefficients in a previous partial block, it may be finally determined whether or not the coefficient is a non-zero coefficient. When the number of non-zero coefficients in a previous partial block is larger than the number of NZ, a coefficient having a partial block coefficient flag of a first value may be determined as 0, and a coefficient having a partial block coefficient flag of a second value may be determined as a non-zero coefficient. In addition, when the number of non-zero coefficients in a previous partial block is smaller than the number of NZ, a first determination as to whether it is a non-zero coefficient may be maintained.

A previous partial block referred to by the current partial block may be restricted to belong to the same transform block as the current partial block. However, the present invention is not limited thereto, and a partial block coefficient flag for a current partial block may be decoded by referring to a partial block belonging to another transform block.

Figure 19:
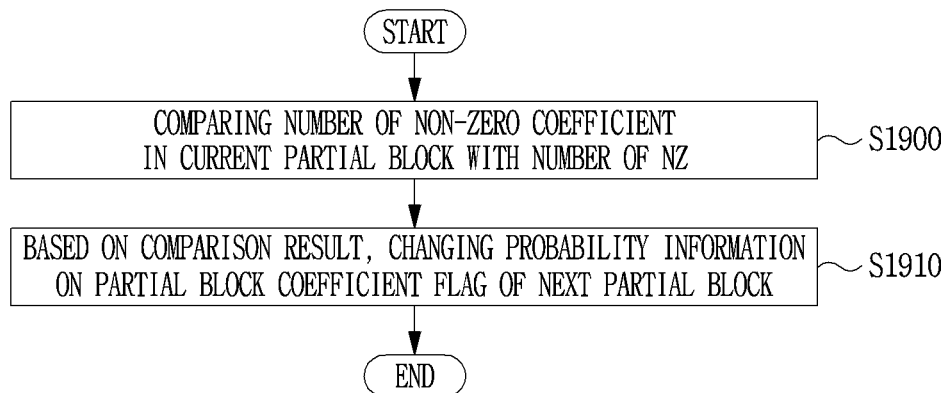
FIG. 19 is a diagram illustrating a method of changing probability information of a partial block coefficient flag based on the number of non-zero coefficients in a partial block as an embodiment to which the present invention is applied.

FIG. 19 is a diagram illustrating a method of changing probability information of a partial block coefficient flag based on the number of non-zero coefficients in a partial block as an embodiment to which the present invention is applied.

An image encoding device may encode a partial block coefficient flag to a predetermined value according to whether a coefficient of a current partial block is a non-zero coefficient. That is, when the coefficient is a non-zero coefficient, the partial block coefficient flag may be encoded to a first value (e.g., "1"), and when the coefficient is 0, the partial block coefficient flag may be encoded to a second value (For example, "0"). Further, based on the number of non-zero coefficients in the current partial block, probability information of a partial block coefficient flag of a next partial block may be changed. Hereinafter, for convenience of explanation, it is assumed that a partial block coefficient flag is encoded/decoded based on the CABAC regular coding method.

Referring to FIG. 19, the number of non-zero coefficients in a current partial block may be compared with a predetermined threshold value (hereinafter, referred to as the number of NZ) (S1900). Here, the number of NZ is as shown in the embodiment of FIG. 18, and a detailed description thereof will be omitted.

Based on a comparison result of step S1900, probability information of a partial block coefficient flag for a coefficient of a next partial block may be changed (S1910). Here, the next partial block may mean a partial block to be encoded next to a current partial block according to an encoding order (or an order according to a scan type). The probability information may refer to a probability table predetermined in an image encoding/decoding device, a probability value derived from an image encoding/decoding device, a variable for calculating probability, and the like.

For example, in encoding a partial block coefficient flag of a next partial block, when the number of non-zero coefficients in the current partial block is larger than the number of NZ, for the partial block coefficient flag of the next partial block, probability information on occurrence of "0" and probability information on occurrence of "1" may be exchanged with each other. In addition, when the number of non-zero coefficients in the current partial block is smaller than the number of NZ, for the partial block coefficient flag of the next partial block, probability information on occurrence of "0" and probability information on occurrence of "0" may not be exchanged with each other.

The encoding scheme described above may be performed in units of a transform block. For example, the encoding scheme may be restricted to be performed only until the next partial block reaches a partial block having a last encoding order in the transform block. However, the present invention is not limited thereto, and the same/similar scheme may be performed when the current partial block and the next partial block belong to different transform blocks.

When the partial block coefficient flag is encoded according to the above-described manner, an image decoding device may decode a partial block coefficient flag of a current partial block, based on the number of non-zero coefficients in a previous partial block.

Specifically, probability information on a partial block coefficient flag of a current partial block may be changed based on the comparison result of the number of non-zero coefficients in the previous block and the number of NZ, and the partial block coefficient flag may be decoded based on the changed probability information.

For example, when the number of non-zero coefficients in a previous partial block is larger than the number of NZ, for the partial block coefficient flag, probability information on occurrence of "0" and the probability information on occurrence of "1" may be exchanged each other. In addition, when the number of non-zero coefficients in a previous partial block is smaller than a number of NZ, for the partial block coefficient flag, probability information on occurrence of "0" and the probability information on occurrence of "1" may not be exchanged each other.

In addition, a previous partial block referred to by the current partial block may be restricted to belong to the same transform block as the current partial block. However, the present invention is not limited thereto, and a partial block coefficient flag for a current partial block may be decoded by referring to a partial block belonging to another transform block.

Figure 20:
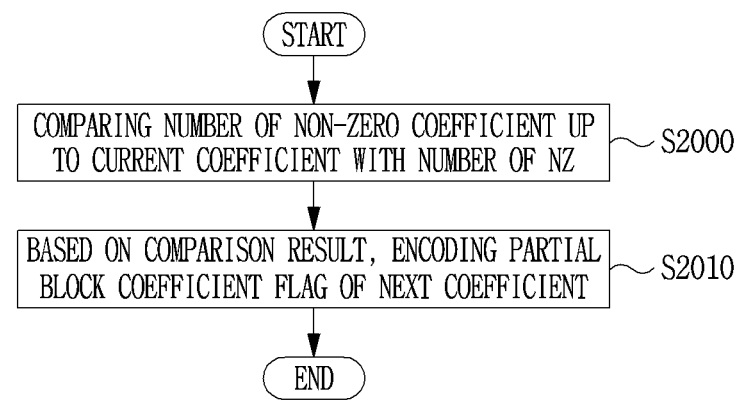
FIG. 20 is a diagram illustrating a method of encoding a partial block coefficient flag based on the number of non-zero coefficients up to a current coefficient as an embodiment to which the present invention is applied.

FIG. 20 is a diagram illustrating a method of encoding a partial block coefficient flag based on the number of non-zero coefficients up to a current coefficient as an embodiment to which the present invention is applied.

Referring to FIG. 20, the number of non-zero coefficients up to a current coefficient in a current partial block may be compared with the number of NZ (S2000). The number of non-zero coefficients up to a current coefficient may be calculated according to an encoding order of coefficients (or an order according to a scan type). The number of NZ is as shown in the embodiment of FIG. 18, and a detailed description thereof will be omitted.

Based on a comparison result of step S2000, a partial block coefficient flag for a next coefficient may be encoded (S2010). Here, the next coefficient may mean a coefficient to be encoded next to a current coefficient according to an encoding order (or an order according to a scan type).

For example, when the number of non-zero coefficients up to the current coefficient is larger than or equal to the number of NZ, a partial block coefficient flag of the next coefficient may be encoded in a different meaning from a partial block coefficient flag of the current coefficient. That is, when a next coefficient is a non-zero coefficient, a partial block coefficient flag for the next coefficient may be encoded to a second value (e.g., "0"), and when the next coefficient is 0, a partial block coefficient flag for the next coefficient may be encoded to a first value (e.g., "1").

In addition, when the number of non-zero coefficients up to the current coefficient is smaller than the number of NZ, a partial block coefficient flag of the next coefficient may be encoded in a same meaning as a partial block coefficient flag of the current coefficient. That is, when a next coefficient is a non-zero coefficient, a partial block coefficient flag for the next coefficient may be encoded to a first value (for example, "1"), and when the next coefficient is 0, a partial block coefficient flag for the next coefficient may be encoded to a second value (e.g., "0").

The encoding scheme described above may be performed in units of a transform block or a partial block. For example, the encoding scheme may be restricted to be performed only until the next coefficient reaches a coefficient having a last encoding order in the transform block or in the partial block. However, the present invention is not limited thereto, and the same/similar scheme may be performed when the current coefficient and the next coefficient belong to different transform blocks or different partial blocks.

When the partial block coefficient flag is encoded according to the above-described manner, an image decoding device may determine whether a current coefficient is a non-zero coefficient, based on at least one of encoded partial block coefficient flag for a current coefficient or the number of non-zero coefficients up to a previous coefficient.

For example, when a partial block coefficient flag for a current coefficient is a first value, the current coefficient may be determined as a non-zero coefficient, and when the partial block coefficient flag is a second value, the current coefficient may be determined as "0".

Here, further considering the number of non-zero coefficients up to a previous coefficient in a current partial block, it may be finally determined whether or not the current coefficient is a non-zero coefficient. When the number of non-zero coefficients up to a previous coefficient is larger than the number of NZ, a current coefficient having a partial block coefficient flag of a first value may be determined as 0, and a current coefficient having a partial block coefficient flag of a second value may be determined as a non-zero coefficient. In addition, when the number of non-zero coefficients up to a previous coefficient is smaller than the number of NZ, a first determination as to whether it is a non-zero coefficient may be maintained.

In addition, a previous coefficient referred to by the current coefficient may be restricted to belong to the same partial block as the current coefficient. However, the present invention is not limited thereto, and a current coefficient may refer to a coefficient that belongs to another partial block or another transform block.

Figure 21:
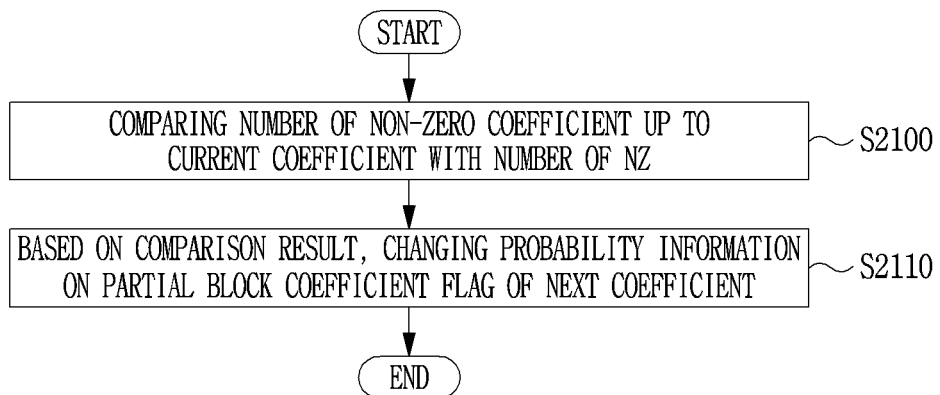
FIG. 21 is a diagram illustrating a method of changing probability information of a partial block coefficient flag based on the number of non-zero coefficients up to a current coefficient as an embodiment to which the present invention is applied.

FIG. 21 is a diagram illustrating a method of changing probability information of a partial block coefficient flag based on the number of non-zero coefficients up to a current coefficient as an embodiment to which the present invention is applied.

An image encoding device may encode a partial block coefficient flag to a predetermined value according to whether a coefficient of a current partial block is a non-zero coefficient. That is, when the coefficient is a non-zero coefficient, the partial block coefficient flag may be encoded to a first value (e.g., "1"), and when the coefficient is 0, the partial block coefficient flag may be encoded to a second value (For example, "0"). Here, in the current partial block, based on the number of non-zero coefficients up to the current coefficient, probability information of a partial block coefficient flag of a next coefficient may be changed. Hereinafter, for convenience of explanation, it is assumed that a partial block coefficient flag is encoded/decoded based on the CABAC regular coding method.

Referring to FIG. 21, the number of non-zero coefficients up to a current coefficient in the current partial block may be compared with the number of NZ (S2100). Here, the number of NZ is as shown in the embodiment of FIG. 18, and a detailed description thereof will be omitted.

Based on a comparison result of step S2100, probability information of a partial block coefficient flag for a next coefficient may be changed (S1910). Here, the next coefficient may mean a coefficient to be encoded next to a current coefficient according to an encoding order (or an order according to a scan type). The probability information may refer to a probability table predetermined in an image encoding/decoding device, a probability value derived from an image encoding/decoding device, a variable for calculating probability, and the like.

For example, in encoding a partial block coefficient flag of a next coefficient, when the number of non-zero coefficients up to a current coefficient in the current partial block is larger than or equal to the number of NZ, for the partial block coefficient flag of the next coefficient, probability information on occurrence of "0" and probability information on occurrence of "1" may be exchanged with each other. In addition, when the number of non-zero coefficients up to a current coefficient is smaller than the number of NZ, for the partial block coefficient flag of the next coefficient, for the partial block coefficient flag of the next partial block, probability information on occurrence of "0" and probability information on occurrence of "0" may not be exchanged with each other.

The encoding scheme described above may be performed in units of a partial block or a transform block. For example, the encoding scheme may be restricted to be performed only until the next coefficient reaches a coefficient having a last encoding order in the transform block or in the partial block. However, the present invention is not limited thereto, and the same/similar scheme may be performed when the current coefficient and the next coefficient belong to different transform blocks or different partial blocks.

When the partial block coefficient flag is encoded according to the above-described manner, an image decoding device may decode a partial block coefficient flag of a current partial block, based on the number of non-zero coefficients up to a previous coefficient in a current partial block.

Specifically, probability information on a partial block coefficient flag of a current coefficient may be changed based on the comparison result of the number of non-zero coefficients up to the previous coefficient and the number of NZ, and the partial block coefficient flag may be decoded based on the changed probability information.

For example, when the number of non-zero coefficients up to a previous coefficient is larger than or equal to the number of NZ, for the partial block coefficient flag of the current coefficient, probability information on occurrence of "0" and the probability information on occurrence of "1" may be exchanged each other. In addition, when the number of non-zero coefficients up to a previous partial block is smaller than a number of NZ, for the partial block coefficient flag of the current coefficient, probability information on occurrence of "0" and the probability information on occurrence of "1" may not be exchanged each other.

In addition, a previous coefficient referred to by the current coefficient may be restricted to belong to the same partial block as the current coefficient. However, the present invention is not limited thereto, and a current coefficient may refer to a coefficient that belongs to another partial block or another transform block.

The partial block coefficient flag encoding/decoding method described above may be selectively used according to a quantization parameter (QP) related to a transform block.

For example, when a QP of the transform block is larger than a predetermined QP threshold value, the above-described encoding/decoding method may be restricted so as not to be used. In addition, when a QP of the transform block is smaller than a predetermined QP threshold value, the partial block coefficient flag may be encoded/decoded using at least one of the encoding/decoding methods described above.

The number of QP threshold values may be one, two, or more. The QP threshold value may be predetermined in an image encoding device. For example, the QP threshold value may correspond to a median value of a range of QPs available in the image encoding/decoding device. Alternatively, the image encoding device may determine an optimal QP threshold value considering encoding efficiency, and encode the QP threshold value.

Alternatively, the partial block coefficient flag encoding/decoding method may be selectively used depending on a size of a transform block (or a partial block).

For example, when a size of a transform block is larger than or equal to a predetermined threshold size, the partial block coefficient flag may be encoded/decoded using at least one of the encoding/decoding methods described above. In addition, when a size of a transform block is smaller than a predetermined threshold size, the above-described encoding/decoding method may be restricted so as not to be used.

The number of threshold size may be one, two, or more. The threshold size may be predetermined in an image encoding device. For example, the threshold size may represented by a×b, wherein a and b are 2, 4, 8, 16, 32, 64 or more, and a and b may be equal to or different from each other. Alternatively, the image encoding device may determine an optimal threshold size considering encoding efficiency, and encode the threshold size.

Figure 22:
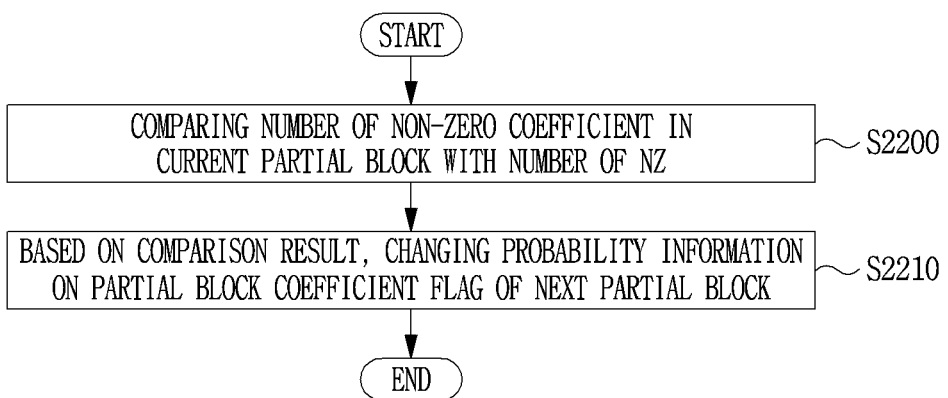
FIG. 22 is a diagram illustrating a method of changing probability information of a partial block coefficient flag based on the number of non-zero coefficients in a partial block as an embodiment to which the present invention is applied.

FIG. 22 is a diagram illustrating a method of changing probability information of a partial block coefficient flag based on the number of non-zero coefficients in a partial block as an embodiment to which the present invention is applied.

Referring to FIG. 22, the number of non-zero coefficients in a current partial block may be compared with the number of NZ (S2200). Here, the number of NZ is as shown in the embodiment of FIG. 18, and a detailed description thereof will be omitted.

Based on a comparison result of step S2200, probability information of a partial block coefficient flag for a next partial block may be changed (S2210). Here, the next partial block may mean a partial block to be encoded next to a current partial block according to an encoding order (or an order according to a scan type). The probability information may refer to a probability table predetermined in an image encoding/decoding device, a probability value derived from an image encoding/decoding device, a variable for calculating probability, and the like.

For example, when the number of non-zero coefficients in the current partial block is larger than the number of NZ, probability information of a partial block coefficient flag of a next partial block may be changed. The change may mean applying other probability information with a high probability that the partial block coefficient flag is "true".

In addition, when the number of non-zero coefficients in the current partial block is smaller than the number of NZ, probability information of a partial block coefficient flag of a next partial block may not be changed. That is, a partial block coefficient flag of the next partial block may use the probability information on the partial block coefficient flag of the current partial block as it is.

The encoding scheme described above may be performed in units of a transform block. For example, the encoding scheme may be restricted to be performed only until the next partial block reaches a partial block having a last encoding order in the transform block. However, the present invention is not limited thereto, and the same/similar scheme may be performed when the current partial block and the next partial block belong to different transform blocks.

An image decoding device may decode a partial block coefficient flag of a partial block according to a same/similar scheme as the above-described encoding scheme.

Figure 23:
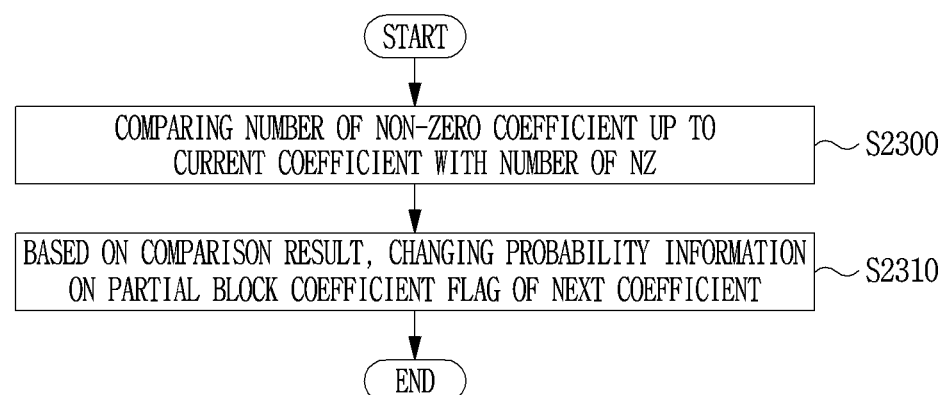
FIG. 23 is a diagram illustrating a method of changing probability information of a partial block coefficient flag based on the number of non-zero coefficients up to a current coefficient as an embodiment to which the present invention is applied.

FIG. 23 is a diagram illustrating a method of changing probability information of a partial block coefficient flag based on the number of non-zero coefficients up to a current coefficient as an embodiment to which the present invention is applied.

Referring to FIG. 23, the number of non-zero coefficients up to a current coefficient in the current partial block may be compared with the number of NZ (S2300). The number of non-zero coefficients up to a current coefficient may be calculated according to an encoding order of coefficients (or an order according to a scan type). The number of NZ is as shown in the embodiment of FIG. 18, and a detailed description thereof will be omitted.

Based on a comparison result of step S2300, a partial block coefficient flag for a next coefficient may be encoded (S2310). Here, the next coefficient may mean a coefficient to be encoded next to a current coefficient according to an encoding order (or an order according to a scan type). The probability information may refer to a probability table predetermined in an image encoding/decoding device, a probability value derived from an image encoding/decoding device, a variable for calculating probability, and the like.

For example, when the number of non-zero coefficients up to the current coefficient is larger than or equal to the number of NZ, probability information of a partial block coefficient flag of a next coefficient may be changed. The change may mean applying other probability information with a high probability that the partial block coefficient flag is "true".

In addition, when the number of non-zero coefficients up to the current coefficient is smaller than the number of NZ, probability information of a partial block coefficient flag of a next coefficient may not be changed. That is, a partial block coefficient flag of the next coefficient may use the probability information on the partial block coefficient flag of the current coefficient as it is.

The encoding scheme described above may be performed in units of a transform block or a partial block. For example, the encoding scheme may be restricted to be performed only until the next coefficient reaches a coefficient having a last encoding order in the transform block or the partial block. However, the present invention is not limited thereto, and the same/similar scheme may be performed when the current coefficient and the next coefficient belong to different transform blocks or different partial blocks.

An image decoding device may change probability information of a partial block coefficient flag according to a same/similar scheme as the above-described encoding scheme.

In addition, the above-described change of the probability information may be performed in consideration of frequency components of a transform block. Referring to FIG. 16, AC component region (e.g., partial blocks 1620, 1630, 1640) may use probability information with a higher probability of a partial block coefficient flag that is "false", and DC component region (e.g., partial block 1610) may use probability information with a higher probability of a partial block coefficient flag that is "true".

Figure 24:
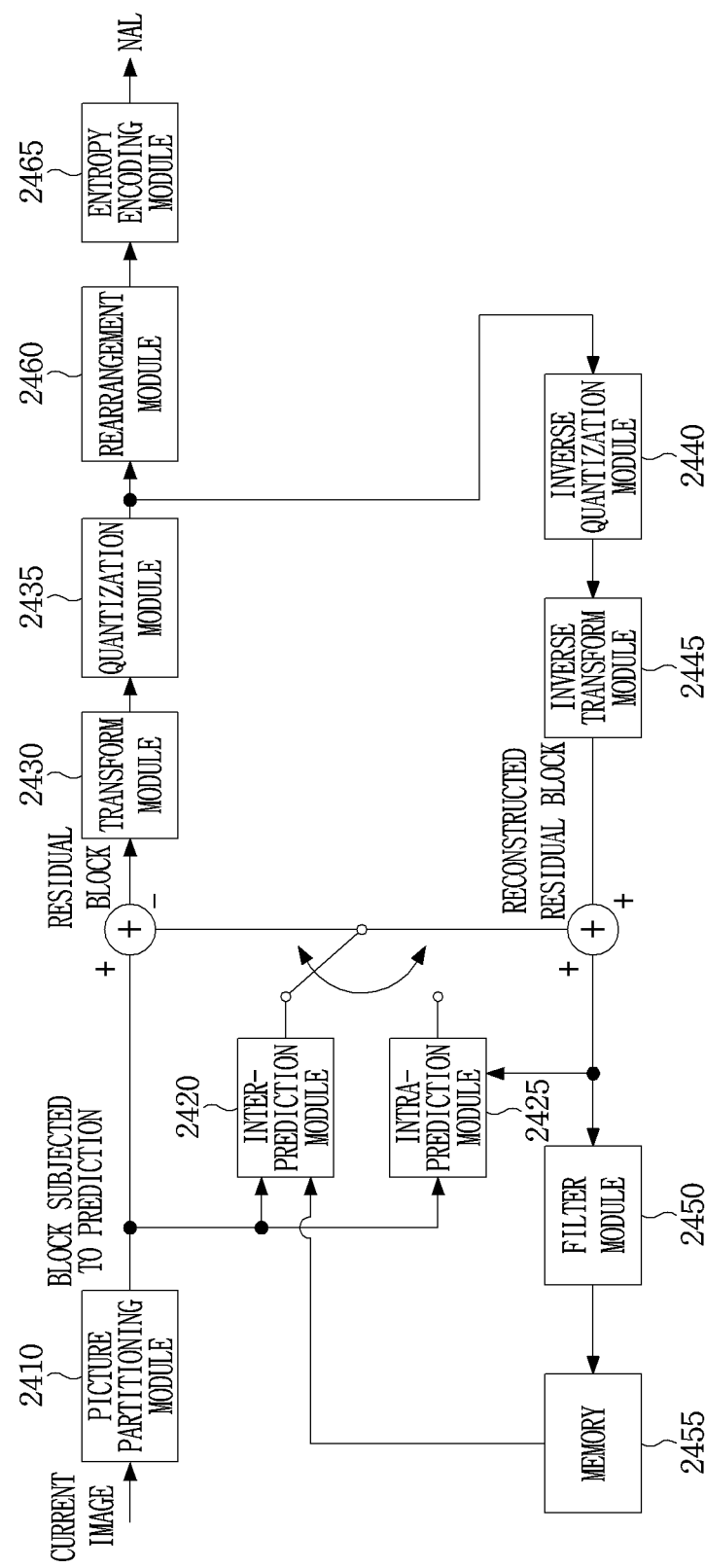
FIG. 24 is a block diagram illustrating an image encoding device according to an embodiment of the present invention.

FIG. 24 is a block diagram illustrating an image encoding device according to an embodiment of the present invention.

Referring to 24, an image encoding device 2400 may include a picture partitioning module 2410, prediction modules 2420 and 2425, a transform module 2430, a quantization module 2435, a rearrangement module 2460, an entropy encoding module 2465, an inverse quantization module 2440, an inverse transform module 2445, a filter module 2450, and a memory 2455.

The constitutional parts shown in FIG. 24 are independently shown so as to represent characteristic functions different from each other in the image encoding device, and it does not mean that each constitutional part is constituted in a constitutional unit of separated hardware or software. In other words, each constitutional part includes each of enumerated constitutional parts for convenience, and at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be optional constituents improving only performance thereof. The present invention may be implemented by including only the indispensable constitutional parts for implementing the essence of the present invention except the constituents used in improving performance. The structure including only the indispensable constituents except the optional constituents used in improving only performance is also included in the scope of the present invention.

The picture partitioning module 2410 may partition an input picture into at least one block. Here, a block may mean a coding unit (CU), a prediction unit (PU), or a transform unit (TU). The partitioning may be performed based on at least one of a quad tree or a binary tree. A quad tree is a method of partitioning an upper-level block into four lower-level blocks whose width and height are half of the upper-level block. A binary tree is a method of partitioning an upper-level block into two lower-level blocks whose width or height is half of the upper-level block. Using the binary tree-based partitioning, a block may have a square shape as well as a non-square shape.

Hereinafter, in embodiments of the present invention, a coding unit may be used as a unit for performing encoding, or may be used as a unit for performing decoding.

The prediction modules 2420 and 2425 may include an inter-prediction module 2420 for performing inter-prediction and an intra-prediction module 2425 for performing intra-prediction. Whether to perform inter-prediction or intra-prediction for a prediction unit may be determined, and specific information (e.g., intra-prediction mode, motion vector, reference picture, etc.) according to each prediction method may be determined. Here, a processing unit subjected to prediction may be different from a processing unit for which a prediction method and specific contents are determined. For example, a prediction method, a prediction mode and the like may be determined in units of prediction unit, and a prediction may be performed in units of transform unit.

The encoding device may determine an optimal prediction mode for an encoding block by using various schemes such as rate-distortion optimization (RDO) for a residual block obtained by subtracting a source block from a prediction block. In one example, RDO may be determined by the following Equation 1.

$$J(\Phi,\lambda)=D(\Phi)+\lambda R(\Phi) \qquad \text{[Equation 1]}$$

In the above Equation (1), D represents a deterioration due to quantization, R represents a rate of compressed stream, and J represents the RD cost. Further, $\phi$ represents an encoding mode, $\lambda$ represents a Lagrangian multiplier. $\lambda$ may be used as a scale correction coefficient for matching a unit of error amount and bit amount. In an encoding procedure, an encoding device may determine a mode with a minimum RD cost value as an optimal mode for an encoding block. Here, an RD-cost value is calculated considering both a bit rate and an error.

Figure 26:
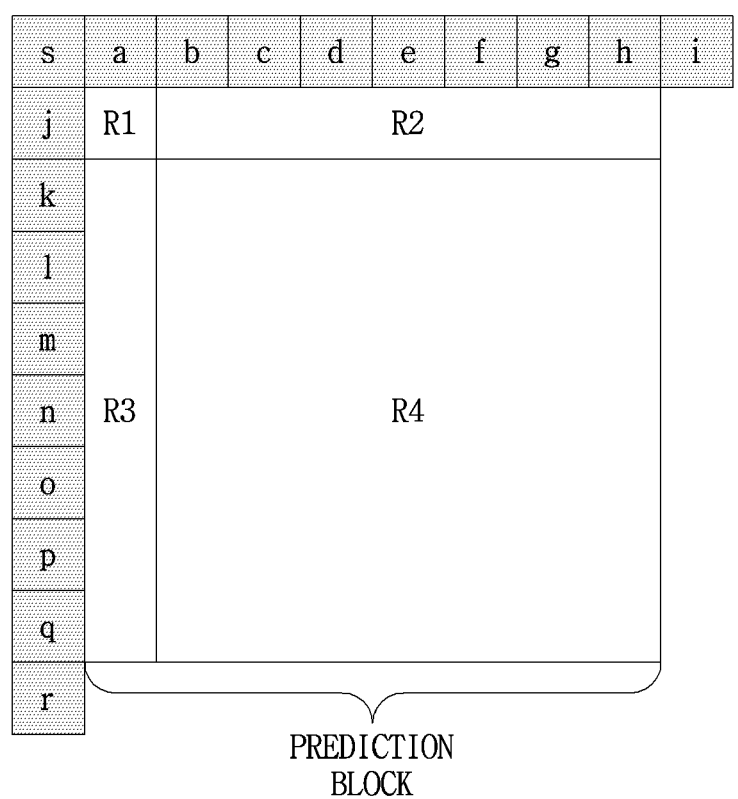
FIG. 26 is a diagram for explaining an intra-prediction method using a DC mode.

Among intra modes, a DC mode, which is a non-directional prediction mode (or a non-angular prediction mode), may use an average value of neighboring pixels of a current block. FIG. 26 is a diagram for explaining an intra-prediction method using a DC mode.

After an average value of neighboring pixels is filled in a prediction block, a filtering may be performed on pixels located at a boundary of the prediction block. In one example, weighted sum filtering with neighboring reference pixels may be applied to pixels located at a left or top boundary of a prediction block. For example, Equation 2 shows an example of generating prediction pixels through a DC mode for each region. In Equation 2, zones R1, R2, R3 are regions located at an outermost (i.e., boundary) of a prediction block, and weighted sum filtering may be applied to pixels included in the region.

$$DC\ \text{Value} = \frac{\sum_{x=0}^{Wid-1} R[x][-1] + \sum_{y=0}^{Hei-1} R[-1][y] + ((Wid+Hei) \gg 1))}{(Wid+Hei)} \qquad \text{[Equation 2]}$$

R1 region)

$$Pred[0][0] = (R[-1][0] + 2*DC\ \text{value} + R[0][-1] + 2) \gg 2$$

R2 region)

$$Pred[x][0] = (R[x][-1] + 3*DC\ \text{value} + 2) \gg 2,$$

$$x > 0$$

R3 region)

-continued
$$Pred[0][y] = (R[0][y] + 3 * DC\text{ value} + 2) \gg 2,$$
$$y > 0$$
R4 region)
$$Pred[x][y] = DC\text{ value}, x > 0, y > 0$$

In the Equation 2, Wid represents a horizontal length of a prediction block, and Hei represents a vertical length of a prediction block. x, y means a coordinate position of each prediction pixel when a most left top position of a prediction block is defined as (0, 0). R denotes a neighboring pixel. For example, when pixel s shown in FIG. 26 is defined as R [−1] [−1], pixel a to pixel i may be represented as R [0] [−1] to R [8] [−1], pixel j to pixel r may be represented as R [−1] [0] to R [−1] [8]. In the example shown in FIG. 26, a prediction pixel value Pred may be calculated for each of regions R1 to R4 according to a weighted sum filtering method as shown in Equation 2.

A planar mode among a non-directional mode is a method of generating a prediction pixel of a current block by applying linear interpolation to neighboring pixels of the current block by distance. For example, FIG. 27 is a diagram for explaining an intra-prediction method using a planar mode.

Figure 27:
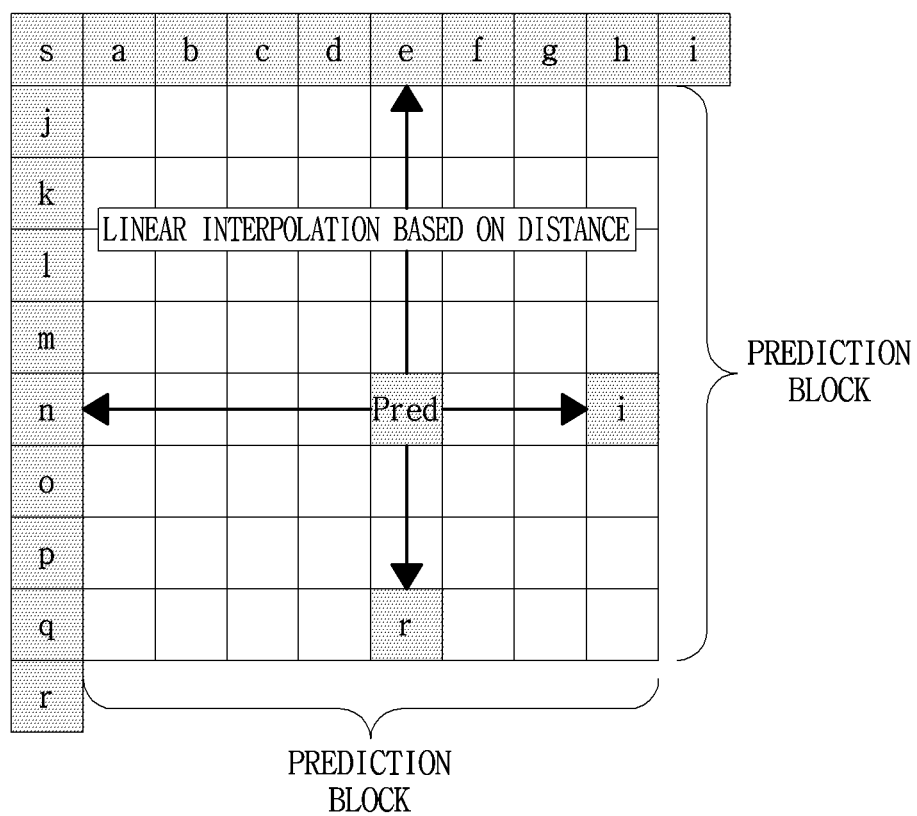
FIG. 27 is a diagram for explaining an intra-prediction method using a planar mode.

For example, it is assumed that Pred shown in FIG. 27 is predicted in an 8×8 encoding block. In this case, pixel e located at a top side of Pred and pixel r pixel located at a left bottom side of Pred may be copied to a most bottom side of Pred, and a vertical prediction value may be obtained by linear interpolation by distance in a vertical direction. In addition, pixel n located at a left side of Pred and pixel i located at a right top side of Pred may be copied to a most right side of Pred, and a horizontal prediction value may be obtained by linear interpolation by distance in a horizontal direction. Then, an average value of the horizontal and vertical prediction values may be determined as a value of Pred. Equation 3 is a formula expressing a process of obtaining a prediction value Pred according to a planner mode.

$$Pred[x][y] = \frac{[(Wid - 1 - x) * R[-1][y]] + [(x + 1) * R[Wid][-1]] + [(Hei - 1 - y) * R[x][-1]] + [(y + 1) * R[-1][Hei]] + 1}{2}$$ [Equation 3]

In the Equation 3, Wid represents a horizontal length of a prediction block, and Hei represents a vertical length of a prediction block. x, y means a coordinate position of each prediction pixel when a most left top position of a prediction block is defined as (0, 0). R denotes a neighboring pixel. For example, when pixel s shown in FIG. 27 is defined as R [−1] [−1], pixel a to pixel i may be represented as R [0] [−1] to R [8] [−1], pixel j to pixel r may be represented as R [−1] [0] to R [−1] [8].

Figure 28:
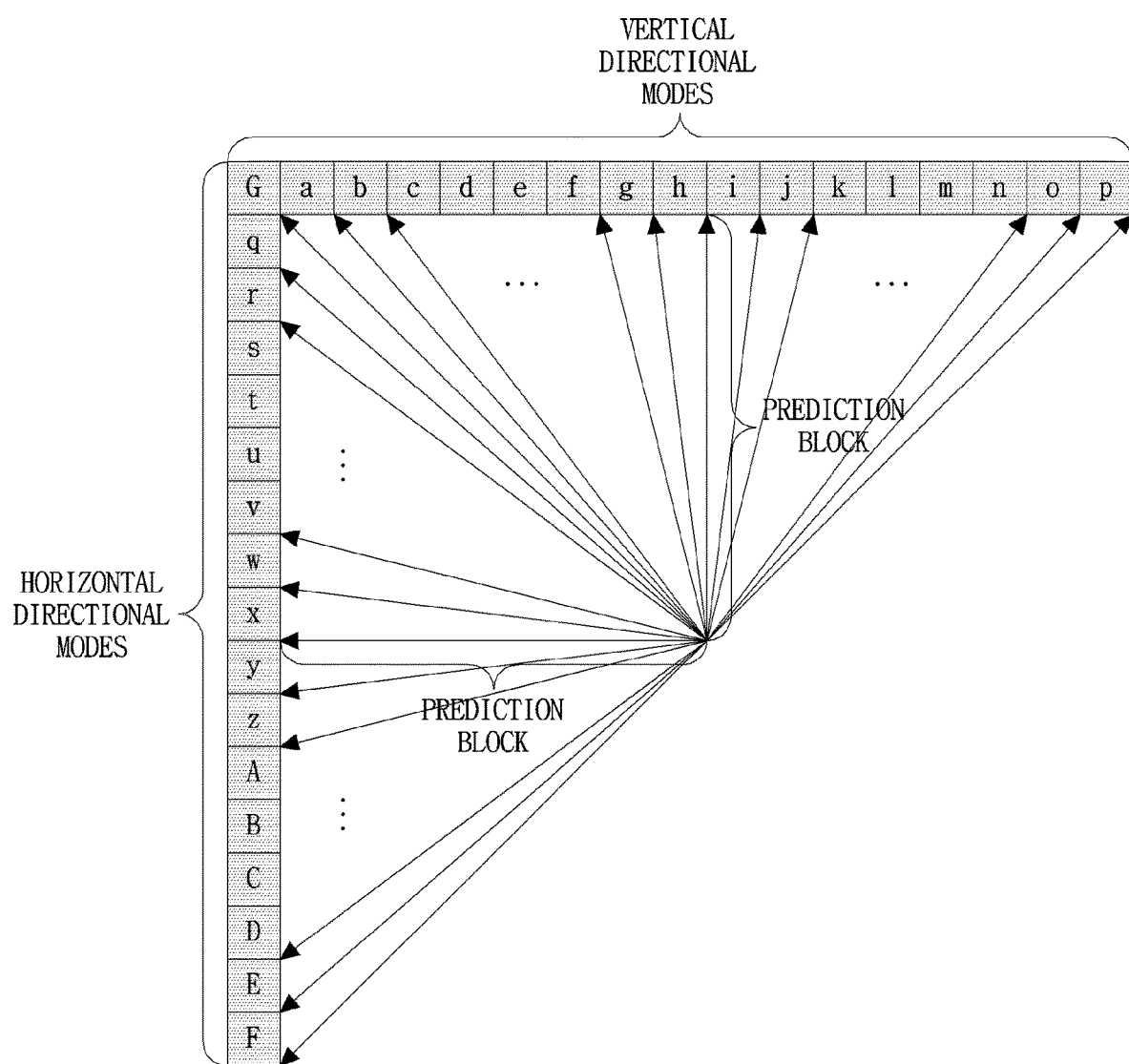
FIG. 28 is a diagram for explaining an intra-prediction method using a directional prediction mode.

FIG. 28 is a diagram for explaining an intra-prediction method using a directional prediction mode.

A directional prediction mode (or an angular prediction mode) is a method of generating at least one or more pixels located in any one of N predetermined directions among neighboring pixels of a current block as prediction samples.

A directional prediction mode may include a horizontal direction mode and a vertical direction mode. Here, a horizontal directional mode means modes having greater horizontal directionality than an angular prediction mode directed to 45 degrees to a left top side, and a vertical directional mode means modes having greater vertical direction than an angular prediction mode directed to 45 degrees to a left top side. A directional prediction mode having a prediction direction directed to 45 degrees to a left top side may be treated as a horizontal directional mode or may be treated as a vertical directional mode. In FIG. 28, horizontal directional modes and vertical directional modes are shown.

Referring to FIG. 28, there may be a direction that does not match to an integer pixel portion for each direction. In such a case, after applying an interpolation by distance such as a linear interpolation method, a DCT-IF method, a cubic convolution interpolation method, and the like to a distance between a pixel and a neighboring pixel, and the pixel values may be filled in a pixel position matching to a direction of a prediction block.

A residual value (residual block or transform block) between the generated prediction block and an original block may be input to the transform module 2430. A residual block is a minimum unit for transform and quantization procedure. A partitioning method of an encoding block may be applied to a transform block. In one example, a transform block may be partitioned into four or two partial blocks.

Prediction mode information, motion vector information and the like used for prediction may be encoded with a residual value by the entropy encoding module 2465 and may be transmitted to a decoding device. When a particular encoding mode is used, it is possible to transmit to a decoding device by encoding the original block as it is without generating the prediction block through the prediction modules 2420 and 2425.

The inter-prediction module 2420 may predict the prediction unit based on information of at least one of a previous picture or a subsequent picture of the current picture, or may predict the prediction unit based on information of some encoded regions in the current picture, in some cases. The inter-prediction module 2420 may include a reference picture interpolation module, a motion prediction module, and a motion compensation module.

The reference picture interpolation module may receive reference picture information from the memory 2455 and may generate pixel information of an integer pixel or less than the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on a reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an Advanced Motion Vector Prediction (AMVP) method, etc., may be used.

An encoding device may generate motion information of a current block based on motion estimation or motion information of a neighboring block. Here, the motion information may include at least one of a motion vector, a reference image index and a prediction direction.

The intra prediction module 2425 may generate a prediction unit based on reference pixel information neighboring to a current block which is pixel information in the current picture. When the neighboring block of the current prediction unit is a block subjected to inter-prediction and thus a reference pixel is a pixel subjected to inter-prediction, the reference pixel included in the block subjected to inter-prediction may be replaced with reference pixel information of a neighboring block subjected to intra-prediction. That is, when a reference pixel is not available, at least one reference pixel of available reference pixels may be used instead of unavailable reference pixel information.

Prediction modes in intra-prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra-prediction mode information used to predict luma information or predicted luma signal information may be utilized.

In the intra-prediction method, a prediction block may be generated after applying an Adaptive Intra Smoothing (AIS) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information, and when the prediction mode of the current prediction unit is different from the prediction mode of the neighboring prediction unit, entropy encoding may be performed to encode prediction mode information of the current block.

Also, a residual block including information on a residual value which is a difference between the prediction unit subjected to prediction and the original block of the prediction unit may be generated based on prediction units generated by the prediction modules 2420 and 2425. The generated residual block may be input to the transform module 2430.

The transform module 2430 may transform the residual block including residual data using a transform method, such as discrete cosine transform (DCT), discrete sine transform (DST), and Karhunen Loeve Transform (KLT). In order to make easy use of a transform method, a matrix operation is performed using a basis vector. Here, depending on a prediction mode in which a prediction block is encoded, various transform methods may be variously mixed and used in matrix operation. For example, when performing intra-prediction, depending on intra-prediction mode, discrete cosine transform may be used for horizontal direction and discrete sine transform may be used for vertical direction.

The quantization module 2435 may quantize values transformed to a frequency domain by the transform module 2430. That is, the quantization module 2435 may quantize transform coefficients of a transform block generated from the transform module 2430, and generate a quantized transform block having the quantized transform coefficients. Here, the quantization methods may include Dead Zone Uniform Threshold Quantization (DZUTQ) or a Quantization Weighted Matrix, and the like. It is also possible to use an improved quantization methods that improves these quantization methods. The quantization coefficients may vary depending on a block or an importance of an image. Values calculated by the quantization module 2435 may be provided to the inverse quantization module 2440 and the rearrangement module 2460.

The transform module unit 2430 and/or the quantization module 2435 may be selectively included in the image encoding device 2400. That is, the image encoding device 2400 may perform at least one of transformation or quantization on the residual data of the residual block, or may skip both the transformation and the quantization, thereby encoding the residual block. A block provided as an input of the entropy encoding module 2465 is generally referred to as a transform block (or quantized transform block) even though either the transformation or the quantization is not performed or both the transformation and the quantization are not performed in the image encoding device 2400.

The rearrangement module 2460 may rearrange coefficients of quantized residual values.

The rearrangement module 2460 may change a coefficient in the form of a two-dimensional block into a coefficient in the form of a one-dimensional vector through a coefficient scanning method. For example, the rearrangement module 2460 may scan from a DC coefficient to a coefficient in a high frequency domain using a predetermined scanning method so as to change the coefficients to be in the form of one-dimensional vectors.

The entropy encoding module 2465 may perform entropy encoding based on the values calculated by the rearrangement module 2460. Entropy encoding may use various encoding methods, for example, exponential Golomb coding, context-adaptive variable length coding (CAVLC), and context-adaptive binary arithmetic coding (CABAC).

The entropy encoding module 2465 may encode various information, such as residual value coefficient information and block type information of the coding unit, prediction mode information, partition unit information, prediction unit information and transmit unit information, motion vector information, reference frame information, interpolation information of a block, filtering information, etc. from the rearrangement module 2460 and the prediction modules 2420 and 2425. In the entropy encoding module 2465, the coefficient of the transform block may be encoded, in units of partial block in a transform block, as a non-zero coefficient, a coefficient whose absolute value is larger than 1 or 2, and various types of flags indicating a sign of a coefficient, etc. The coefficient that is not encoded with only the flag may be encoded through the absolute value of the difference between the coefficient encoded through the flag and the coefficient of the actual transform block.

The entropy encoding module 2465 may entropy encode coefficients of the coding unit input from the rearrangement module 2460.

The inverse quantization module 2440 may inversely quantize the values quantized by the quantization module 2435 and the inverse transform module 2445 may inversely transform the values transformed by the transform module 2430.

In addition, the inverse quantization module 2440 and the inverse transform module 2445 may perform inverse quantization and inverse transformation by inversely using the quantization method and the transformation method used in the quantization module 2435 and the transform module 2430. In addition, when the transform module 2430 and the quantization module 2435 perform only quantization and do not perform the transformation, only the inverse quantization is performed and the inverse transformation may not be performed. When both the transformation and the quantization are not performed, the inverse quantization module 2440 and the inverse transform module 2445 may neither perform inverse transform nor inverse quantization nor be included in the image encoding device 2400 and may be omitted.

The residual value generated by the inverse quantization module 2440 and the inverse transform module 2445 may be combined with the prediction unit predicted by a motion estimation module, a motion compensation module, and the intra-prediction module included in the prediction modules 2420 and 2425 so as to generate a reconstructed block.

The filter module 2450 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns included in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU), and the shape and filter coefficient of a filter for ALF may vary depending on each block. Also, the filter for ALF in the same shape (fixed shape) may be applied regardless of characteristics of the application target block.

The memory 2455 may store the reconstructed block or picture calculated through the filter module 2450, and the stored reconstructed block or picture may be provided to the prediction modules 2420 and 2425 in performing inter-prediction.

Figure 25:
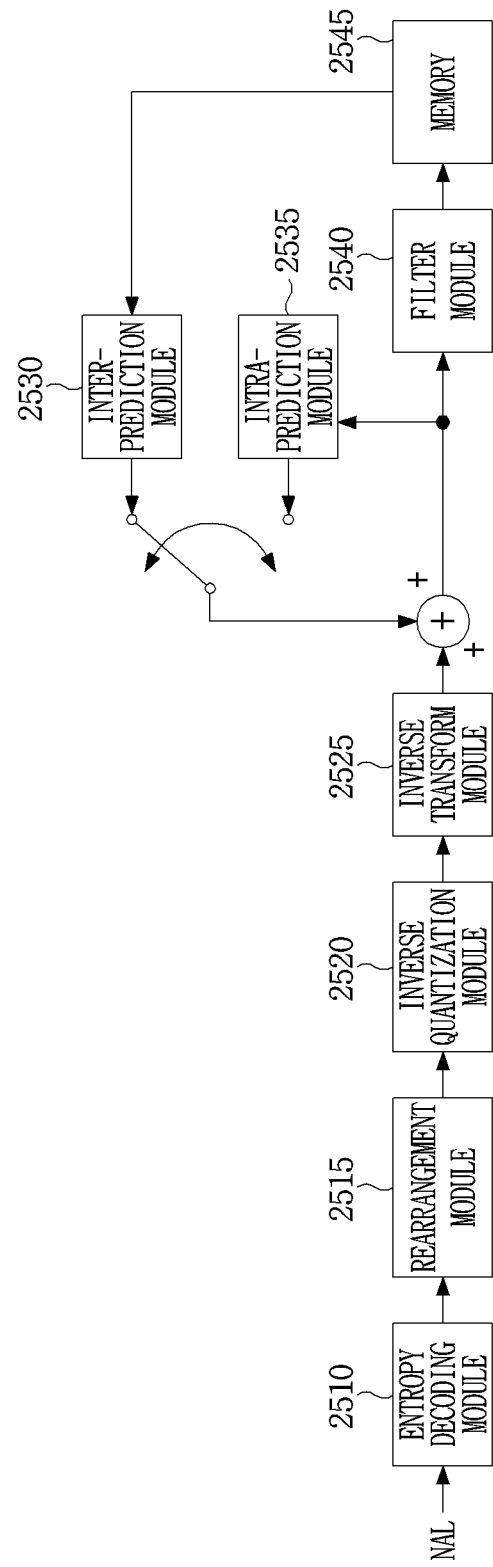
FIG. 25 is a block diagram illustrating an image decoding device according to an embodiment of the present invention.

FIG. 25 is a block diagram illustrating an image decoding device according to an embodiment of the present invention.

Referring to FIG. 25, the image decoding device 2500 may include an entropy decoding module 2510, a rearrangement module 2515, an inverse quantization module 2520, an inverse transform module 2525, prediction modules 2530 and 2535, a filter module 2540, and a memory 2545.

When an image bitstream is input from the image encoding device, the input bitstream may be decoded according to an inverse process of the image encoding device.

The entropy decoding module 2510 may perform entropy decoding according to an inverse process of entropy encoding by the entropy encoding module of the image encoding device. For example, corresponding to the methods performed by the image encoding device, various methods, such as exponential Golomb coding, context-adaptive variable length coding (CAVLC), and context-adaptive binary arithmetic coding (CABAC) may be applied. In the entropy decoding module 2510, the coefficient of the transform block may be decoded, in units of partial block in a transform block, based on a non-zero coefficient, a coefficient whose absolute value is larger than 1 or 2, and various types of flags indicating a sign of a coefficient, etc. The coefficient that is not represented by only the flag may be decoded through combination of coefficient represented by the flag and coefficient that is signaled.

The entropy decoding module 2510 may decode information on intra-prediction and inter-prediction performed by the image encoding device.

The rearrangement module 2515 may perform rearrangement on the bitstream entropy decoded by the entropy decoding module 2510 based on the rearrangement method used in the image encoding device. The rearrangement may include reconstructing and rearranging the coefficients in the form of one-dimensional vectors to the coefficient in the form of two-dimensional blocks. The rearrangement module 2515 may receive information related to coefficient scanning performed in the image encoding device and may perform rearrangement via a method of inversely scanning the coefficients based on the scanning order performed in the image encoding device.

The inverse quantization module 2520 may perform inverse quantization based on a quantization parameter received from the image encoding device and the rearranged coefficients of the block.

The inverse transform module 2525 may perform the inverse transform of the inverse quantized transform coefficients according to a predetermined transform method. Here, the transform method may be determined based on a prediction method (inter/intra-prediction), a size/shape of a block, information on intra-prediction mode, etc.

The prediction modules 2530 and 2535 may generate a prediction block based on information on prediction block generation received from the entropy decoding module 2510 and previously decoded block or picture information received from the memory 2545.

The prediction modules 2530 and 2535 may include a prediction unit determination module, an inter-prediction module, and an intra-prediction module. The prediction unit determination module may receive various information, such as prediction unit information, prediction mode information of an intra-prediction method, information on motion prediction of an inter-prediction method, etc. from the entropy decoding module 2510, may divide a current coding unit into prediction units, and may determine whether inter-prediction or intra-prediction is performed on the prediction unit. By using information required in inter-prediction of the current prediction unit received from the image encoding device, the inter-prediction module 2530 may perform inter-prediction on the current prediction unit based on information of at least one of a previous picture or a subsequent picture of the current picture including the current prediction unit. Alternatively, inter-prediction may be performed based on information of some pre-reconstructed regions in the current picture including the current prediction unit.

In order to perform inter-prediction, it may be determined for the coding unit which of a skip mode, a merge mode, an AMVP mode, and an inter block copy mode is used as the motion prediction method of the prediction unit included in the coding unit.

The intra-prediction module 2535 may generate a prediction block based on pixel information in the current picture. When the prediction unit is a prediction unit subjected to intra-prediction, intra-prediction may be performed based on intra-prediction mode information of the prediction unit received from the image encoding device. The intra-prediction module 2535 may include an adaptive intra smoothing (AIS) filter, a reference pixel interpolation module, a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the image encoding device. When the prediction mode of the current block is a mode where AIS filtering is not performed, the AIS filter may not be applied.

When the prediction mode of the prediction unit is a prediction mode in which intra-prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 2540. The filter module 2540 may include the deblocking filter, the offset correction module, the ALF.

Information on whether or not the deblocking filter is applied to the corresponding block or picture and information on which of a strong filter and a weak filter is applied when the deblocking filter is applied may be received from the image encoding device. The deblocking filter of the image decoding device may receive information on the deblocking filter from the image encoding device, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the image encoding device. The ALF information may be provided as being included in a particular parameter set.

The memory 2545 may store the reconstructed picture or block for use as a reference picture or block, and may provide the reconstructed picture to an output module.

An encoding block may be partitioned into at least one block. Specifically, here, the encoding block may be partitioned into from a maximum-size encoding block to a minimum-size encoding block based on quad tree partitioning or a binary tree partitioning (or dual tree partitioning). Information on a maximum size encoding block and a minimum size encoding block, or information on a difference value between a maximum size encoding block and a minimum size encoding block may be signaled to a decoding device through a bitstream.

Quad tree (QT) partitioning is a method of partitioning an encoding block into four blocks. By the QT partitioning, an encoding block may be partitioned into four blocks whose vertical length and horizontal length are reduced to ½. A maximum size or a minimum size of encoding block capable of QT partitioning, the number of QT partitioning (or a maximum partitioning depth), a partitioning depth of a minimum size block, a depth capable of partitioning from a maximum size encoding block capable of QT partitioning, and the like may be signaled via an upper header. Here, the upper header may include a slice layer, a picture layer, a sequence layer, a video layer, or the like.

Binary tree (BT) partitioning is a method of partitioning an encoding block into two blocks. By BT partitioning, an encoded block may be divided into two blocks in the horizontal or vertical direction. For example, by BT partitioning, an encoding block may be partitioned into two blocks vertical length and horizontal length are reduced to ½, or two blocks whose vertical length or horizontal length is reduced to ¾ or ¼, respectively. Accordingly, BT partitioning may mean a method of partitioning an encoding block with a degree of precision of 1/N (N≥2). A maximum size or a minimum size of an encoding block capable of BT partitioning, the number of B partitioning (or a maximum partitioning depth), a partitioning depth of a minimum size block, a depth capable of partitioning from a maximum size encoding block capable of BT partitioning, or the like may be signaled via an upper header.

Hereinafter, QT partitioning and BT partitioning will be described in detail with reference to drawings.

Figure 29:
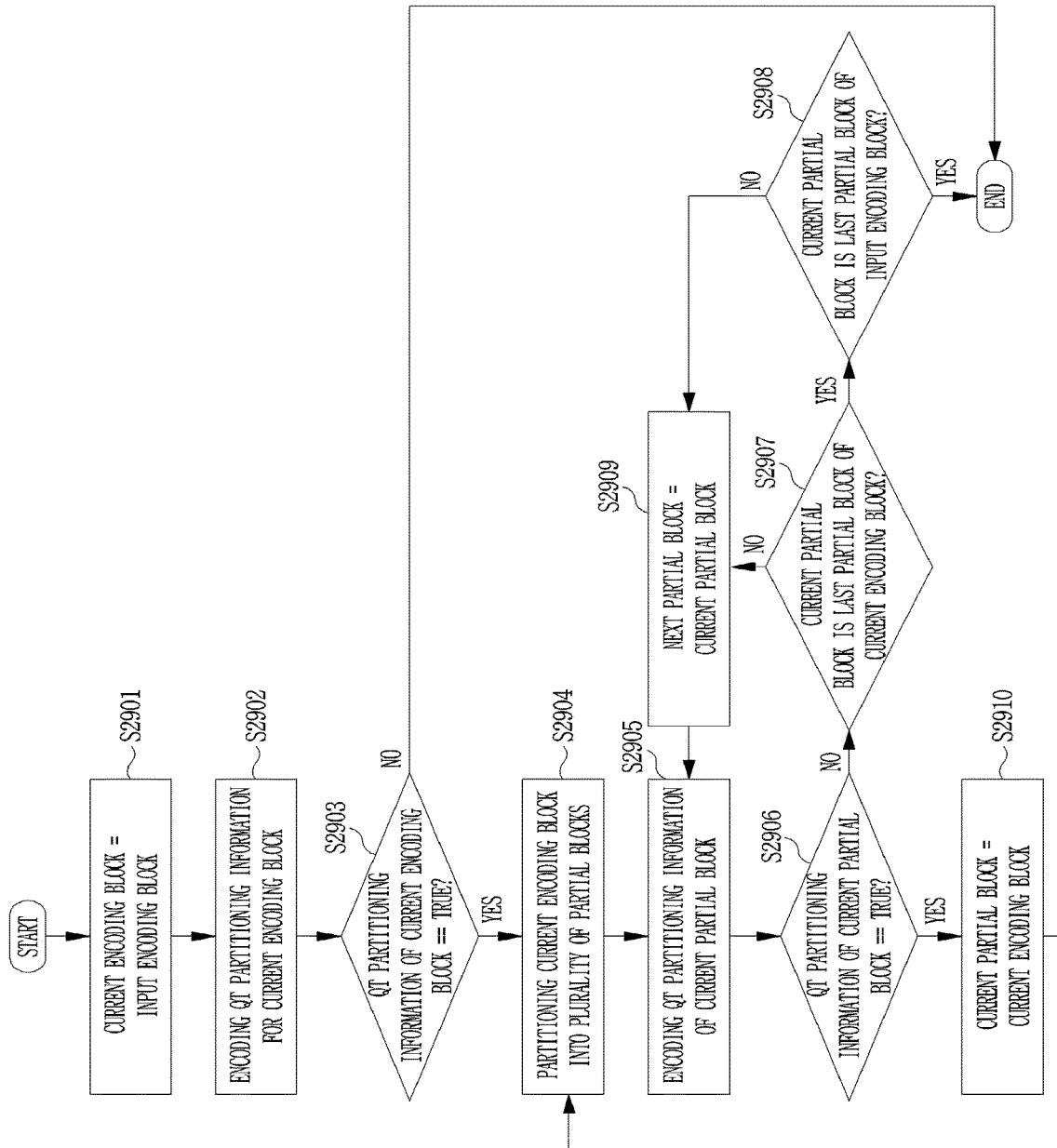
FIG. 29 is a diagram illustrating a method of encoding QT partitioning information for an encoding block.

FIG. 29 is a diagram illustrating a method of encoding QT partitioning information for an encoding block. In the present embodiment, a 'current' encoding block represents a block subjected to encoding at a specific time point. For example, a current encoding block may refer to a block having a partitioning depth at which encoding is currently performed. For example, when an encoding block is input for encoding, a first input encoding block may be treated as a 'current encoding block'. Thereafter, as the encoding block is partitioned, when encoding is performed for a partitioned block, the partitioned block may be treated as a 'current encoding block'.

When an encoding block is input, the input encoding block may be treated as a 'current encoding block' (S2901). The encoding block that is input first may refer to an encoding block having a highest level partitioning depth to be encoded (i.e., an encoding block having a depth of 0).

An encoding device may encode QT partitioning information for a current encoding block (S2902). Here, the QT partitioning information indicates whether or not QT partitioning has performed for a current encoding block. When a current encoding block is QT partitioned, QT partitioning information may be set to 'true', and when a current encoding block is not QT partitioned, QT partitioning information may be set to 'false'.

When it is determined that a current encoding block is not QT partitioned (S2903), QT partitioning procedure for the current encoding block may be terminated. In addition, when it is determined that a current encoding block is QT partitioned (S2903), four partial blocks (or sub-blocks)

included in the current encoding block may be generated through QT partitioning (S2904).

When a current encoding block is partitioned into four partial blocks, according to an encoding order, one of the partial blocks included in the current encoding block is set as a current partial block, and QT partitioning information of the current partial block may be encoded (S2905). Here, the encoding order between the partial blocks may follow raster scan, Z scan, or the like, or may follow a predetermined order. That is, according to an encoding order of partial blocks, QT partitioning information of partial blocks may be sequentially encoded.

When it is determined that a current partial block is not QT partitioned (S2906), the QT partitioning procedure may be terminated based on whether the current partial block is a last block in the current encoding block and in the input encoding block (S2907, S2908). For example, when a current partial block is not QT partitioned, and the current partial block is a last block in the current encoding block and in the input encoding block, the QT partitioning procedure may be terminated. In addition, when a current partial block is not the last partial block of the current encoding block, or when the current encoding block is the last partial block of the current encoding block but not the last partial block in the input encoding block, QT partitioning information encoding procedure may be performed for a next partial block as a current partial block (S2909).

In addition, when it is determined that a current partial block is QT partitioned (S2906), the current partial block may be set as the current encoding block (S2910), and the newly set current encoding block may be partitioned into four partial blocks (S2904). When the newly set current encoding block is partitioned into four partial blocks, QT partitioning information encoding procedure for the four newly generated partial blocks may be repeatedly performed (S2905 to S2910).

An encoding device may encode a maximum size of an encoding block capable of QT partitioning, a depth of an encoding block capable of QT partitioning and the like, through an upper header, based on the partitioning result of the current encoding block.

The partitioning result of the current encoding block may be used to determine a maximum size of an encoding block capable of QT partitioning, a depth of an encoding block capable of QT partitioning and the like, for a next encoding block.

Figure 30:
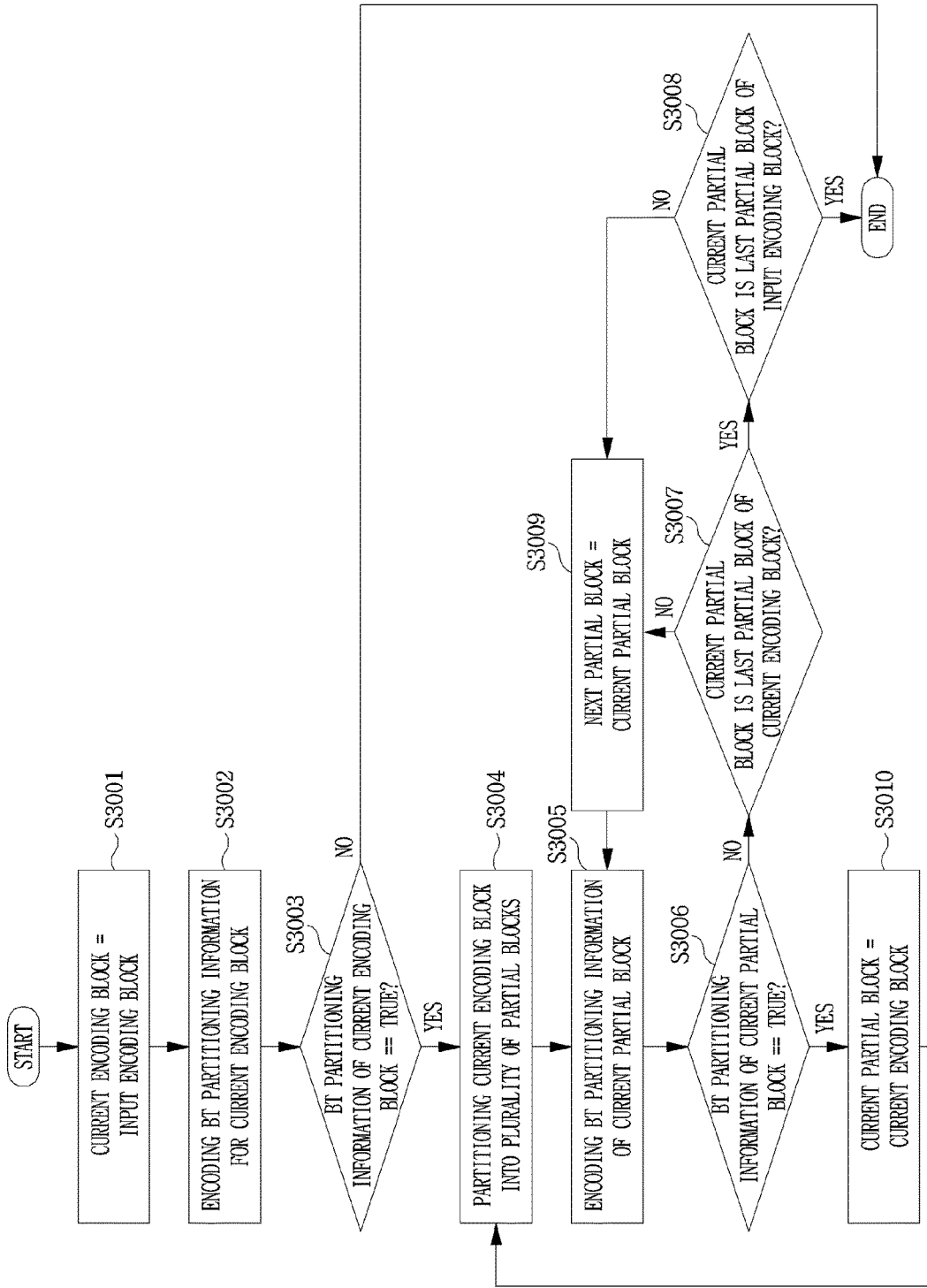
FIG. 30 is a diagram illustrating a method of encoding BT partitioning information for an encoding block.

FIG. 30 is a diagram illustrating a method of encoding BT partitioning information for an encoding block.

When an encoding block is input, the input encoding block may be treated as a current encoding block (S3001). The encoding block that is input first may refer to an encoding block having a highest level partitioning depth to be encoded (i.e., an encoding block having a depth of 0).

An encoding device may encode BT partitioning information for a current encoding block (S3002). Here, the BT partitioning information indicates whether or not BT partitioning has performed for a current encoding block. When a current encoding block is BT partitioned, BT partitioning information may be set to 'true', and when a current encoding block is not BT partitioned, BT partitioning information may be set to 'false'.

When a current encoding block is partitioned into two partial blocks, an encoding device may further encode information on a partitioning pattern. In one example, the information on the partitioning pattern may further include information on at least one of a partitioning direction or a degree of precision. Here, the partitioning direction indicates whether a current encoding block is partitioned in a horizontal direction or a vertical direction. In addition, a degree of precision of a current block may be used as an element for determining a size of a partial block. For example, according to a degree of precision of a current block, it may be partitioned into two partial blocks having a horizontal length or a vertical length of ¼ and ¾, respectively, compared to an upper level block, or it may be partitioned into two partial blocks having a horizontal length or a vertical length of ½, respectively, compared to an upper level block.

For an additional example, the information on the partitioning pattern may include a partitioning index. Here, the partitioning index indicates a partitioning shape of a current encoding block. For example, according to a degree of precision, a current encoding block may be partitioned into partial blocks having a horizontal length of ¼ compared to an upper level block, a horizontal length of ½ compared to an upper level block, a horizontal length of ¾ compared to an upper level block, a vertical length of ¼ compared to an upper level block, a vertical length of ½ compared to an upper level block, a vertical length of ¾ compared to an upper level block, or the like. Accordingly, an encoding device may determine which of the seven cases the partitioning pattern of a current decoding block corresponds to, and then may encode an index corresponding to the partitioning pattern of the current decoding block according to the determination result.

When it is determined that a current encoding block is not BT partitioned (S3003), BT partitioning procedure for the current encoding block may be terminated. In addition, when it is determined that a current encoding block is BT partitioned (S3003), two partial blocks (or sub-blocks) included in the current encoding block may be generated through BT partitioning (S3004).

When a current encoding block is partitioned into two partial blocks, according to an encoding order, one of the partial blocks included in the current encoding block is set as a current partial block, and BT partitioning information of the current partial block may be encoded (S3005). Here, the encoding order between the partial blocks may follow raster scan, Z scan, or the like, or may follow a predetermined order. That is, according to an encoding order of partial blocks, BT partitioning information of partial blocks may be sequentially encoded.

When it is determined that a current partial block is not BT partitioned (S3006), the BT partitioning procedure may be terminated based on whether the current partial block is a last block in the current encoding block and in the input encoding block (S3007, S3008). For example, when a current partial block is not BT partitioned, and the current partial block is a last block in the current encoding block and in the input encoding block, the BT partitioning procedure may be terminated. In addition, when a current partial block is not the last partial block of the current encoding block, or when the current encoding block is the last partial block of the current encoding block but not the last partial block in the input encoding block, BT partitioning information encoding procedure may be performed for a next partial block as a current partial block (S3009).

In addition, when it is determined that a current partial block is BT partitioned (S3006), the current partial block may be set as the current encoding block (S3010), and the newly set current encoding block may be partitioned into two partial blocks (S3004). When the newly set current encoding block is partitioned into two partial blocks, BT partitioning information encoding procedure for the two newly generated partial blocks may be repeatedly performed (S3005 to S3010).

An encoding device may encode a maximum size of an encoding block capable of BT partitioning, a depth of an encoding block capable of BT partitioning and the like, through an upper header, based on the partitioning result of the current encoding block.

The partitioning result of the current encoding block may be used to determine a maximum size of an encoding block capable of BT partitioning, a depth of an encoding block capable of BT partitioning and the like, for a next encoding block.

Figure 31:
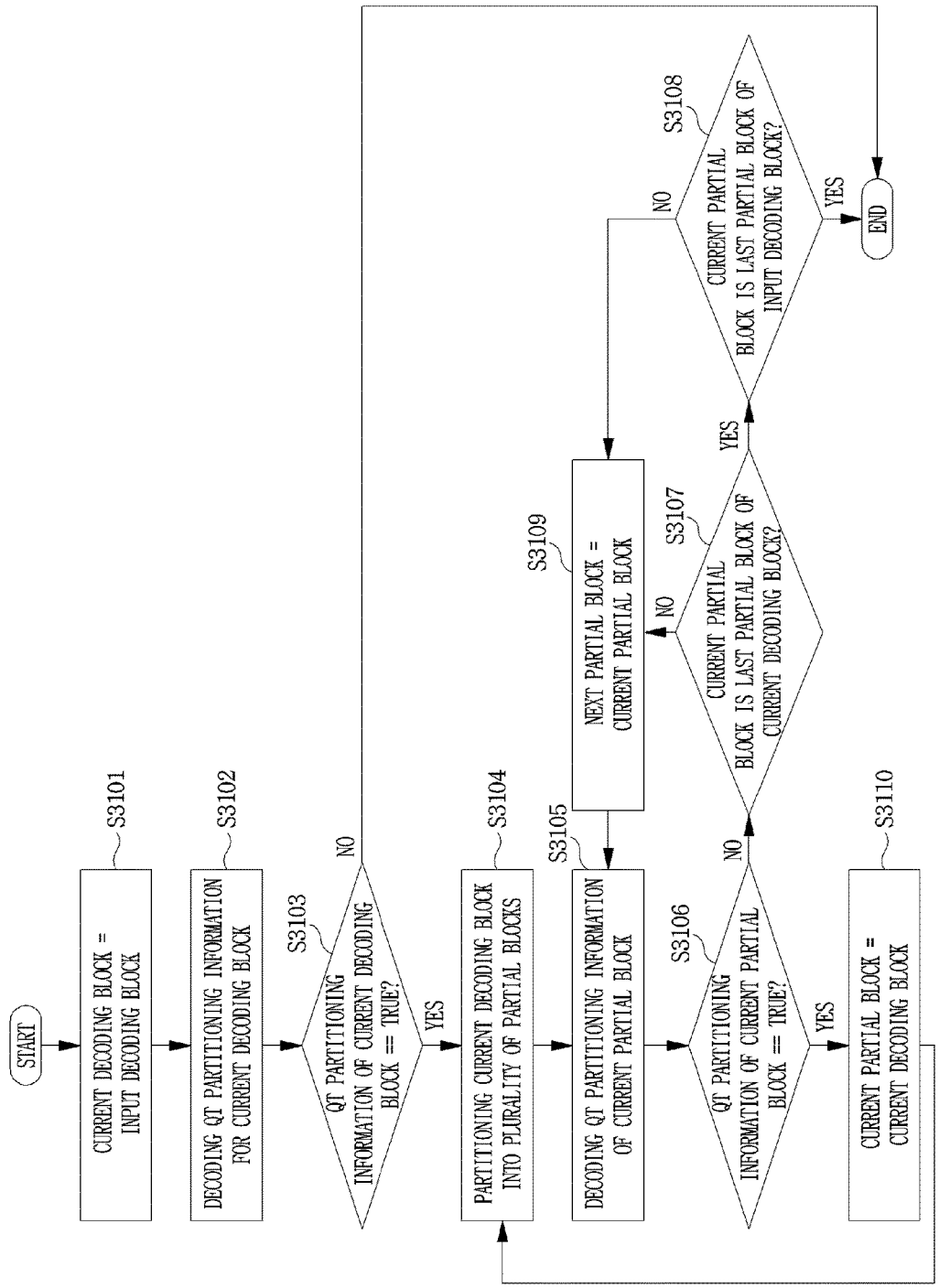
FIG. 31 is a diagram illustrating a method of decoding QT partitioning information for a decoding block.

FIG. 31 is a diagram illustrating a method of decoding QT partitioning information for a decoding block. In the present embodiment, a 'current' decoding block represents a block subjected to decoding at a specific time point. For example, a current decoding block may refer to a block having a partitioning depth at which decoding is currently performed. For example, when a decoding block is input for decoding, a first input decoding block may be treated as a 'current decoding block'. Thereafter, as the decoding block is partitioned, when decoding is performed for a partitioned block, the partitioned block may be treated as a 'current decoding block'.

When a decoding block is input, the input decoding block may be treated as a 'current decoding block' (S3101). The decoding block that is input first may refer to a decoding block having a highest level partitioning depth to be decoded (i.e., a decoding block having a depth of 0).

A decoding device may decode QT partitioning information for a current decoding block (S3102). Here, the QT partitioning information indicates whether or not QT partitioning has performed for a current decoding block. When QT partitioning information is 'true', a current decoding block may QT partitioned, and when QT partitioning information is 'false', a current decoding block may not be QT partitioned.

When QT partitioning information is false, that is, when it is determined that a current decoding block is not QT partitioned (S3103), QT partitioning procedure for the current decoding block may be terminated. In addition, when QT partitioning information is true, that is, when it is determined that a current decoding block is QT partitioned (S3103), four partial blocks (or sub-blocks) included in the current decoding block may be generated through QT partitioning (S3004).

When a current decoding block is partitioned into four partial blocks, according to an decoding order, one of the partial blocks included in the current decoding block is set as a current partial block, and QT partitioning information of the current partial block may be decoded (S3105). Here, the decoding order between the partial blocks may follow raster scan, Z scan, or the like, or may follow a predetermined order. That is, according to a decoding order of partial blocks, QT partitioning information of partial blocks may be sequentially decoded.

When QT partitioning information of a current partial block is false, that is, when it is determined that a current partial block is not QT partitioned (S3106), the QT partitioning procedure may be terminated based on whether the current partial block is a last block in the current decoding block and in the input decoding block (S3107, S3108). For example, when a current partial block is not QT partitioned, and the current partial block is a last block in the current decoding block and in the input decoding block, the QT partitioning procedure may be terminated. In addition, when a current partial block is not the last partial block of the current decoding block, or when the current decoding block is the last partial block of the current decoding block but not the last partial block in the input decoding block, QT partitioning information decoding procedure may be performed for a next partial block as a current partial block (S3109).

In addition, when QT partitioning information of a current partial block is true, that is, when it is determined that a current partial block is QT partitioned (S3106), the current partial block may be set as the current decoding block (S3110), and the newly set current decoding block may be partitioned into four partial blocks (S3104). When the newly set current decoding block is partitioned into four partial blocks, QT partitioning information decoding procedure for the four newly generated partial blocks may be repeatedly performed (S3105 to S3110).

In the above-described embodiment, when a size of the current decoding block is equal to or smaller than a maximum block size capable of QT partitioning signaled from an upper header, or a depth of the current decoding block is equal to or greater than a maximum block size capable of QT partitioning signaled from an upper header, decoding of the partitioning information for the current decoding block may be omitted and the QT partitioning may not be performed for the current decoding block anymore.

Figure 32:
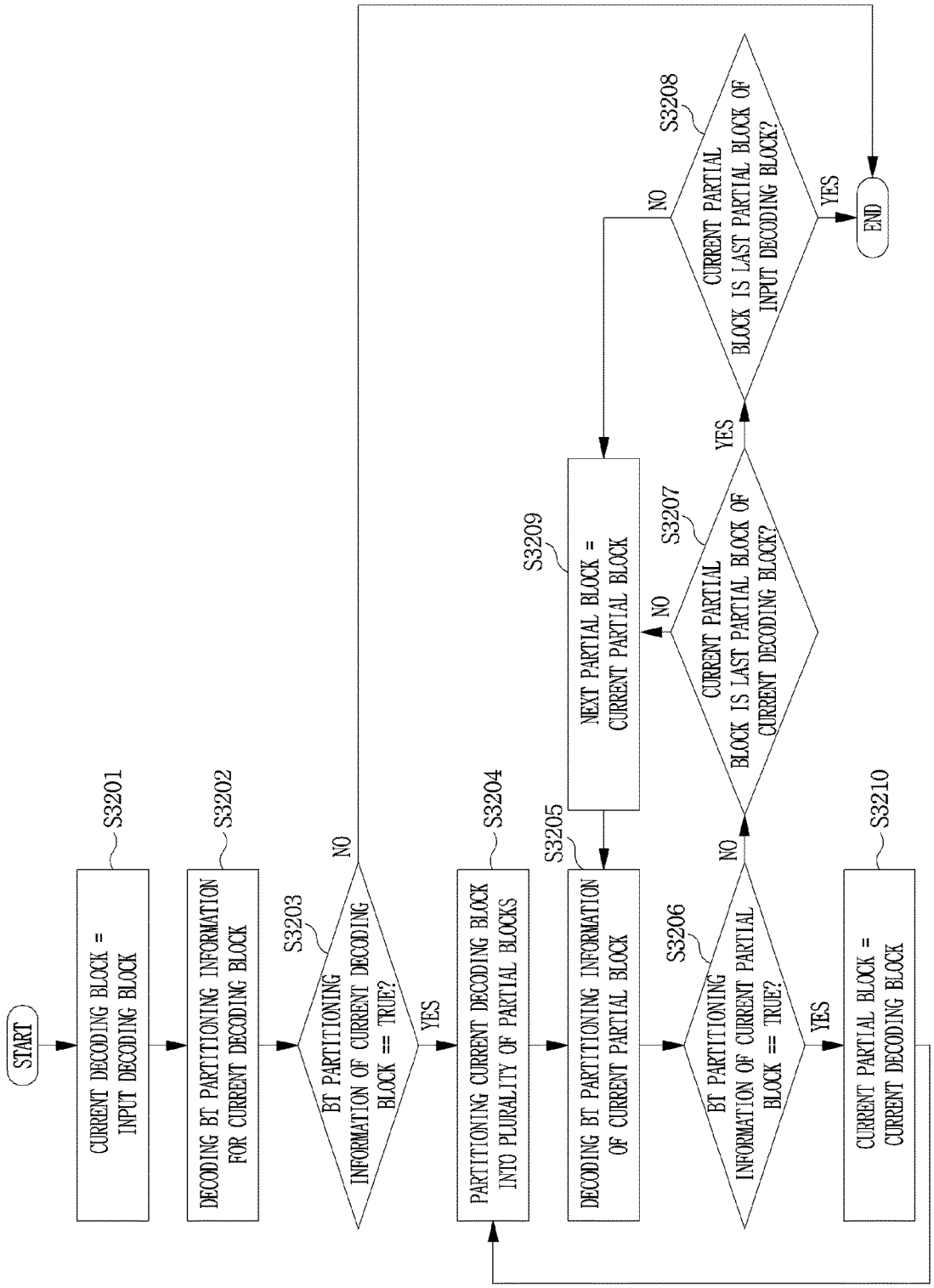
FIG. 32 is a diagram illustrating a method of decoding BT partitioning information for a decoding block.

FIG. 32 is a diagram illustrating a method of decoding BT partitioning information for a decoding block.

When a decoding block is input, the input decoding block may be treated as a current decoding block (S3201). The decoding block that is input first may refer to a decoding block having a highest level partitioning depth to be decoded (i.e., a decoding block having a depth of 0).

A decoding device may decode BT partitioning information for a current decoding block (S3202). Here, the BT partitioning information indicates whether or not BT partitioning has performed for a current decoding block. When BT partitioning information is 'true', a current decoding block may be BT partitioned, BT partitioning information may be set to 'true', and when BT partitioning information is 'false', a current decoding block may not be BT partitioned.

When BT partitioning information is true, that is, when a current decoding block is BT partitioned, a decoding device may further decode information on a partitioning pattern. In one example, the information on the partitioning pattern may further include information on at least one of a partitioning direction or a degree of precision. Here, the partitioning direction indicates whether a current decoding block is partitioned in a horizontal direction or a vertical direction. In addition, a degree of precision of a current block may be used as an element for determining a size of a partial block. For example, according to a degree of precision of a current block, it may be partitioned into two partial blocks having a horizontal length or a vertical length of ¼ and ¾, respectively, compared to an upper level block, or it may be partitioned into two partial blocks having a horizontal length or a vertical length of ½, respectively, compared to an upper level block.

For an additional example, the information on the partitioning pattern may include a partitioning index. Here, the partitioning index indicates a partitioning shape of a current decoding block. For example, according to a degree of precision, a current decoding block may be partitioned into partial blocks having a horizontal length of ¼ compared to an upper level block, a horizontal length of ½ compared to an upper level block, a horizontal length of ¾ compared to an upper level block, a vertical length of ¼ compared to an upper level block, a vertical length of ½ compared to an upper level block, a vertical length of ¾ compared to an upper level block, or the like. Accordingly, a decoding device may decode an index indicating one of the seven cases may determine a partitioning pattern of the current decoding block.

When BT partitioning information is false, that is, when it is determined that a current decoding block is not BT partitioned (S3203), BT partitioning procedure for the current decoding block may be terminated. In addition, when BT partitioning information is true, that is, when it is determined that a current decoding block is BT partitioned (S3203), two partial blocks (or sub-blocks) included in the current decoding block may be generated through BT partitioning (S3204).

When a current decoding block is partitioned into two partial blocks, according to an decoding order, one of the partial blocks included in the current decoding block is set as a current partial block, and BT partitioning information of the current partial block may be decoded (S3205). Here, the decoding order between the partial blocks may follow raster scan, Z scan, or the like, or may follow a predetermined order. That is, according to a decoding order of partial blocks, BT partitioning information of partial blocks may be sequentially decoded.

When it is determined that a current partial block is not BT partitioned (S3206), the BT partitioning procedure may be terminated based on whether the current partial block is a last block in the current decoding block and in the input decoding block (S3207, S3208). For example, when a current partial block is not BT partitioned, and the current partial block is a last block in the current decoding block and in the input decoding block, the BT partitioning procedure may be terminated. In addition, when a current partial block is not the last partial block of the current decoding block, or when the current decoding block is the last partial block of the current decoding block but not the last partial block in the input decoding block, BT partitioning information decoding procedure may be performed for a next partial block as a current partial block (S3209).

In addition, when it is determined that a current partial block is BT partitioned (S3206), the current partial block may be set as the current decoding block (S3210), and the newly set current decoding block may be partitioned into two partial blocks (S3204). When the newly set current decoding block is partitioned into two partial blocks, BT partitioning information decoding procedure for the two newly generated partial blocks may be repeatedly performed (S3205 to S3210).

In the above-described embodiment, when a size of the current decoding block is equal to or smaller than a maximum block size capable of BT partitioning signaled from an upper header, or a depth of the current decoding block is equal to or greater than a maximum block size capable of QT partitioning signaled from an upper header, decoding of the partitioning information for the current decoding block may be omitted and the BT partitioning may not be performed for the current decoding block anymore.

In the examples shown in FIG. 29 to FIG. 32, a method of recursively partitioning an encoding/decoding block of a maximum size using QT partitioning or BT partitioning has been described. Here, in partitioning an encoding/decoding block into a plurality of partial blocks, QT partitioning method and BT partitioning method may be used in combination, and an order of QT partitioning and BT partitioning may be variously set. For example, an encoding device may proceed with partitioning a maximum encoding block using QT partitioning, and when a partial block determined to be optimal for applying BT partitioning is found, may terminate QT partitioning and may proceed with partitioning the partial block through the BT partitioning. Alternatively, when a partial block generated from BT partitioning is determined to be optimal for applying QT partitioning, the partial block may be partitioned using QT partitioning. As such, an encoding device may identify an optimal partitioning method for each block, and accordingly may encode information indicating optimal partitioning method for each block.

For additional example, a decoding device may decode QT partitioning information or BT partitioning information to determine an optimal partitioning state of a decoding block. Here, either QT partitioning method or BT partitioning method may be applied only when the other method may not be applied. For example, BT partitioning information for a predetermined block may be decoded only when QT division information for the predetermined block is false or when an upper level block including the predetermined block is BT partitioned.

In encoding block partitioning information, an encoding device may encode information indicating whether each partitioning method is used through an upper header. For example, encoding device may encode, through an upper header, information indicating whether QT partitioning is used, whether BT partitioning is used, or the like. For example, when it is determined that QT partitioning is used but BT partitioning is not used, an encoding block may be partitioned using only QT partitioning. In this case, encoding for BT partitioning information indicating whether an encoding block has been BT partitioned may be omitted. For additional example, when it is determined that both QT partitioning and BT partitioning are to be used, an encoding block may be partitioned using QT and BT partitioning modes.

Figure 33:
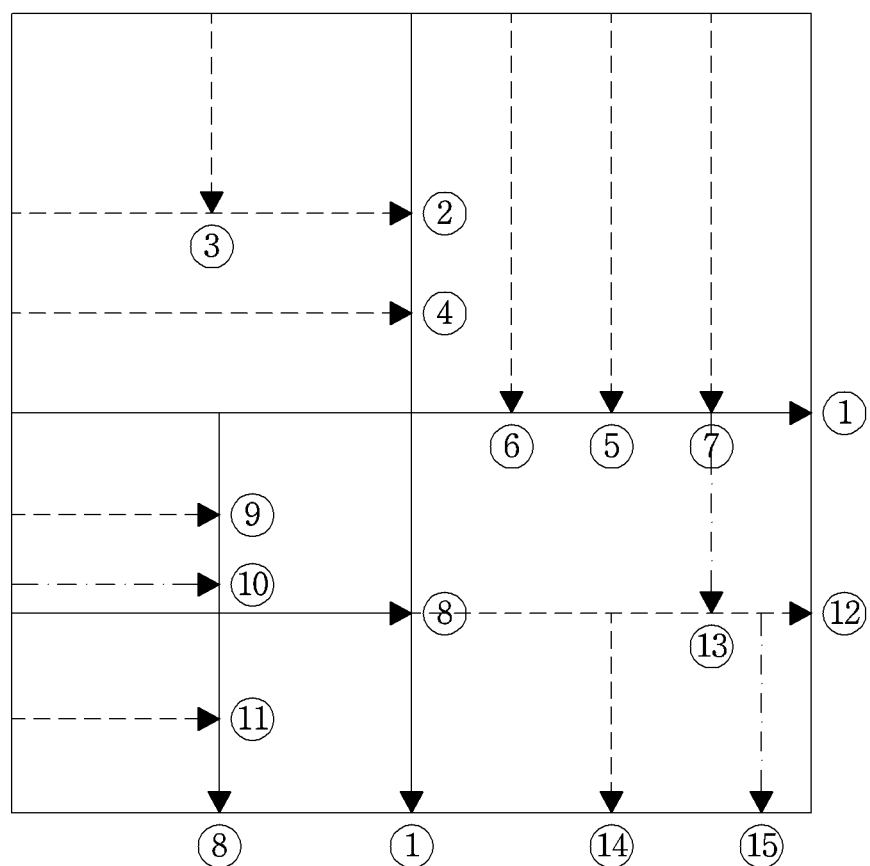
FIG. 33 is a diagram illustrating a state of partitioning in an encoding block.

FIG. 33 is a diagram illustrating a state of partitioning in an encoding block.

For convenience of explanation, it is assumed that, when a block is BT partitioned, partial blocks generated by BT partitioning may not be partitioned into BT blocks any more. In the example shown in FIG. 33, a solid line indicates that it is partitioned using QT partitioning method, and a dotted line indicates that it is partitioned using BT partitioning method. Referring to FIG. 33, it is shown that a subblock having a width and a length reduced by ½ of an upper level block is generated by QT partitioning, and a subblock in which one of a horizontal or vertical length is reduced to ½ of an upper level block or a subblock in which one of a horizontal or vertical length is reduced to ¼ of an upper level block is generated by BT partitioning. Accordingly, in the illustrated example, a maximum degree of precision of partitioning of an encoding block may be ¼. Numbers indicated on each partitioning line indicate a partitioning order.

Referring to FIG. 33, a partitioning line ① indicates that QT partitioning is optimal for a first input encoding block. A partitioning line ② indicates that BT horizontal ½ partitioning is an optimal partitioning for a left top partial block partitioned by the partitioning line ①. A partitioning line ③ is indicates that BT vertical ½ partitioning is an optimal partitioning for a top partial block partitioned by the partitioning line ②. A partitioning line ④ indicates that BT horizontal ½ partitioning is an optimal partitioning for a bottom partial block partitioned by the partitioning line ②. A partitioning line ⑤ indicates that BT vertical ½ partitioning is an optimal partitioning for a right top partial block partitioned by the partitioning line ①. A partitioning line ⑥ indicates that BT vertical ½ partitioning is an optimal partitioning for a left partial block partitioned by the partitioning line ⑤. A partitioning line ⑦ indicates that BT vertical ½ partitioning is an optimal partitioning for a right partial block partitioned by the partitioning line ⑤. A partitioning line ⑧ indicates that QT partitioning is an optimal partitioning for a left bottom partial block partitioned by the partitioning line ①. A partitioning line ⑨ indicates that BT horizontal ½ partitioning is an optimal partitioning for a left top partial block partitioned by the partitioning line ⑧. A partitioning line ⑩ indicates that BT horizontal ¾ partitioning is an optimal partitioning for a bottom partial block partitioned by the partitioning line ⑨. A partitioning line ⑪ indicates that BT horizontal ¼ partitioning is an optimal partitioning for a left bottom partial block partitioned by the partitioning line ⑧. A partitioning line ⑫ indicates that BT horizontal ½ partitioning is an optimal partitioning for a right bottom partial block partitioned by the partitioning line ①. A partitioning line ⑬ indicates that BT vertical ¾ partitioning is an optimal partitioning for a top partial block partitioned by the partitioning line ⑫. A partitioning line ⑭ indicates that BT vertical ½ partitioning is an optimal partitioning for a bottom partial block partitioned by the partitioning line ⑫.

A partitioning line ⑮ indicates that BT vertical ¾ partitioning is an optimal partitioning for a right partial block partitioned by the partitioning line ⑭.

Figure 34:
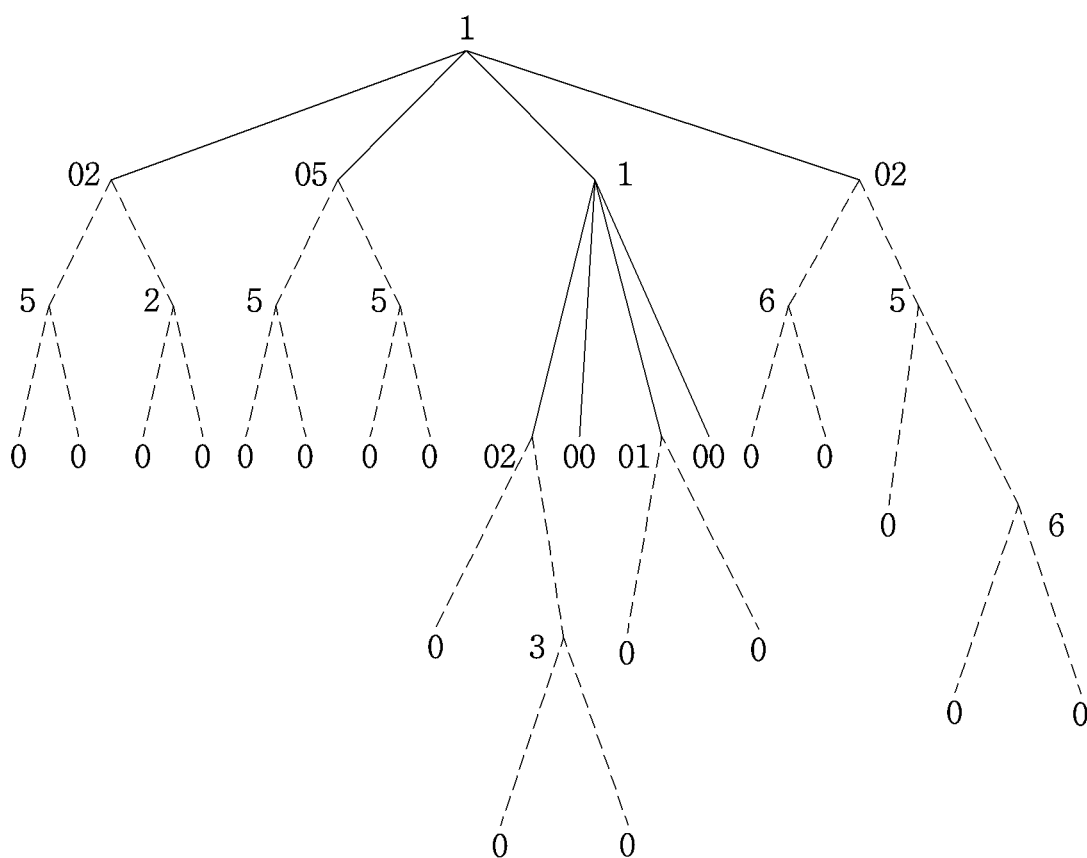
FIG. 34 is a diagram illustrating an optimal partitioning state of an input encoding block shown in FIG. 33 using a tree structure.

FIG. 34 is a diagram illustrating an optimal partitioning state of an input encoding block shown in FIG. 33 using a tree structure.

In case of QT partitioning, since there are two cases, that is, a case where the QT partitioning is not performed and a case where the block is partitioned into four partial blocks (i.e., partitioning horizontal and vertical by ½) according to the QT partitioning, QT partitioning information may be represented as 0 or 1. Cases for BT partitioning may include a case where BT partitioning is not performed and a case where a block is partitioned into two partial blocks according to the BT partitioning may be included. Here, when a block is partitioned into two partial blocks, depending on a degree of precision, there are various cases where a block is partitioned into partial blocks having a horizontal length of ¼ of an upper level block, where a block is partitioned into partial blocks having a horizontal length of ½ of an upper level block, where a block is partitioned into partial blocks having a horizontal length of ¾ of an upper level block, where a block is partitioned into partial blocks having a vertical length of ¼ of an upper level block, where a block is partitioned into partial blocks having a vertical length of ½ of an upper level block, where a block is partitioned into partial blocks having a vertical length of ¾ of an upper level block, and the like. Accordingly, BT partitioning information may be represented as 0 to 6.

In FIG. 34, QT partitioning information and BT partitioning information are indicated in a tree structure.

Based on the above description, a method for controlling the number or type of intra-prediction modes in an encoding/decoding block and a method for encoding/decoding the same will be described in detail.

Figure 35:
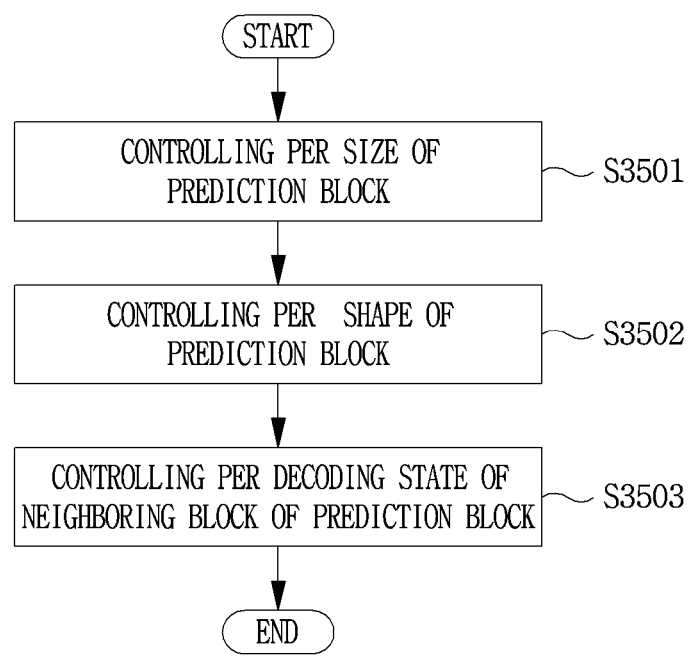
FIG. 35 is a flowchart illustrating a procedure of controlling the number or type of prediction modes in an encoding device.

FIG. 35 is a flowchart illustrating a procedure of controlling the number or type of prediction modes in an encoding device. In FIG. 35, each steps are connected as a series of flow, but it is not limited that each steps is performed in the exemplified order. For example, when a determination result on the number or type of intra-prediction modes of a prediction block is not affected, the exemplified order may be changed. For example, when there is no change in the number or type of intra-prediction modes if the order of steps S3501 and S3502 is changed, the order may be changed. In addition, some of the steps shown in FIG. 35 may be omitted. For example, if it is possible to control the number or type of intra-prediction modes regardless of a shape of a prediction block, step S3502 may be omitted.

In the present embodiment, a current encoding block may represent a prediction block or an encoding block including a prediction block. Hereinafter, the present invention will be described in detail with reference to FIG. 35.

In S3501, it has been shown that the number or type of intra-prediction modes may be controlled according to a size of a current encoding block. In detail, the number of intra-prediction modes available for a current encoding block may be variably determined according to a size of the current encoding block. For example, the number of intra-prediction modes available for the current encoding block may increase as a size of the current encoding block increases. For example, assuming that a minimum size of a prediction block is 4×4 and a maximum size is 256×256, when the size of the current encoding block is 4×4 or more and 32×32 or less, the number of intra-prediction modes available for the current encoding block may be set to 35, or when the size of the current encoding block is 64×64 or more and 256×256 or less, the number of intra-prediction modes available for the current encoding block may be set to 67.

Alternatively, the number of intra-prediction modes available for a current encoding block may increase as a size of the current encoding block decreases. For example, assuming that a minimum size of a prediction block is 4×4 and a maximum size is 256×256, when the size of the current encoding block is 4×4 or more and 32×32 or less, the number of intra-prediction modes available for the current encoding block may be set to 67, or when the size of the current encoding block is 64×64 or more and 256×256 or less, the number of intra-prediction modes available for the current encoding block may be set to 35.

The number of intra-prediction modes available for a current encoding block may be determined according to a comparison result of a size of the current encoding block with a reference size. Here, the reference size may be signaled through an upper header, or may be derived as a same condition in an encoding device and a decoding device. For example, assuming that the reference size is 32×32, information on the reference size may be defined by applying log function as 'log$_2$32', and may be transmitted through a bitstream. As the size of the current encoding block is smaller or larger than the reference size, the number of intra-prediction modes available for the current encoding block may increase. For example, when the size of the current encoding block is 32×32, the number of intra-prediction modes available for the current encoding block may be 19, when the size of the current encoding block is 64×64 or more and 128×128 or less, the number of intra-prediction modes available for the current encoding block may be 35, and when the size of the current encoding block is 256×256, the number of intra-prediction modes available for the current encoding block may be 67. When the size of the current encoding block is 16×16 or less and 8×8 or more, the number of intra-prediction blocks available for the current encoding block is 35, and when the size of the current encoding block is 4×4, the number of intra-prediction blocks available for the current encoding block is 67.

Alternatively, as the size of the current encoding block is smaller or larger than the reference size, the number of intra-prediction modes available for the current encoding block may decrease. For example, when the size of the current encoding block is 32×32, the number of intra-prediction modes available for the current encoding block may be 67, when the size of the current encoding block is 64×64 or more and 128×128 or less, the number of intra-prediction modes available for the current encoding block may be 35, and when the size of the current encoding block is 256×256, the number of intra-prediction modes available for the current encoding block may be 19. When the size of the current encoding block is 16×16 or less and 8×8 or more, the number of intra-prediction blocks available for the current encoding block is 35, and when the size of the current encoding block is 4×4, the number of intra-prediction blocks available for the current encoding block is 19.

Regardless of a size of a current encoding block, the intra-prediction mode available for the current encoding block may include a non-directional intra-prediction mode (or a non-angular prediction mode). That is, regardless of a size of a current encoding block, the current encoding block may be encoded using a non-directional intra-prediction mode. In addition, the number of directional prediction modes (i.e., angular prediction modes) available for the current encoding block may vary depending on a size of the current encoding block. As the number of intra-prediction modes available for the current encoding block is decreased or increased, the number of directional prediction modes available for the current encoding block may also decrease or increase.

When the number of directional prediction modes available for the current encoding block decreases, the current encoding block may use an integer unit directional prediction mode or a similar mode thereof. Here, the integer unit directional prediction mode means a mode in which intra-prediction may be performed using an integer unit reference sample. Here, the integer unit reference sample may mean the reference sample itself, not an additional reference sample generated through an interpolation of the reference sample. For example, the intra-prediction mode in a horizontal direction, a vertical direction, or a diagonal direction may be an integer unit directional prediction mode.

In addition, a directional prediction mode available for the current encoding block may be determined by partitioning an entire directional prediction mode section by the number N of directional prediction modes to be used (N−1 equally partitioning).

Figure 36:
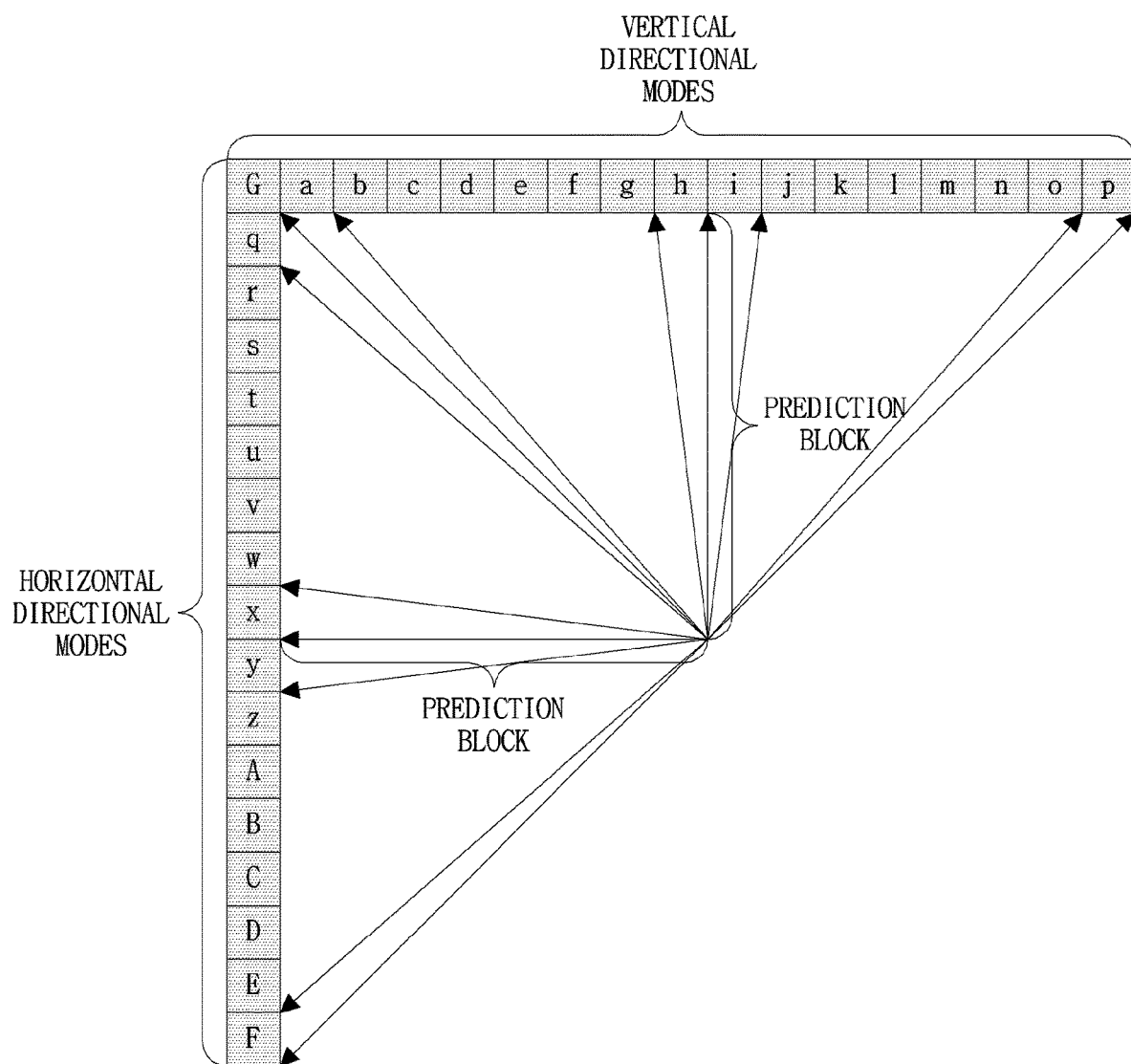
FIG. 36 and FIG. 37 are diagrams illustrating examples in which 13 directional prediction modes are available for the current encoding block.
Figure 37:
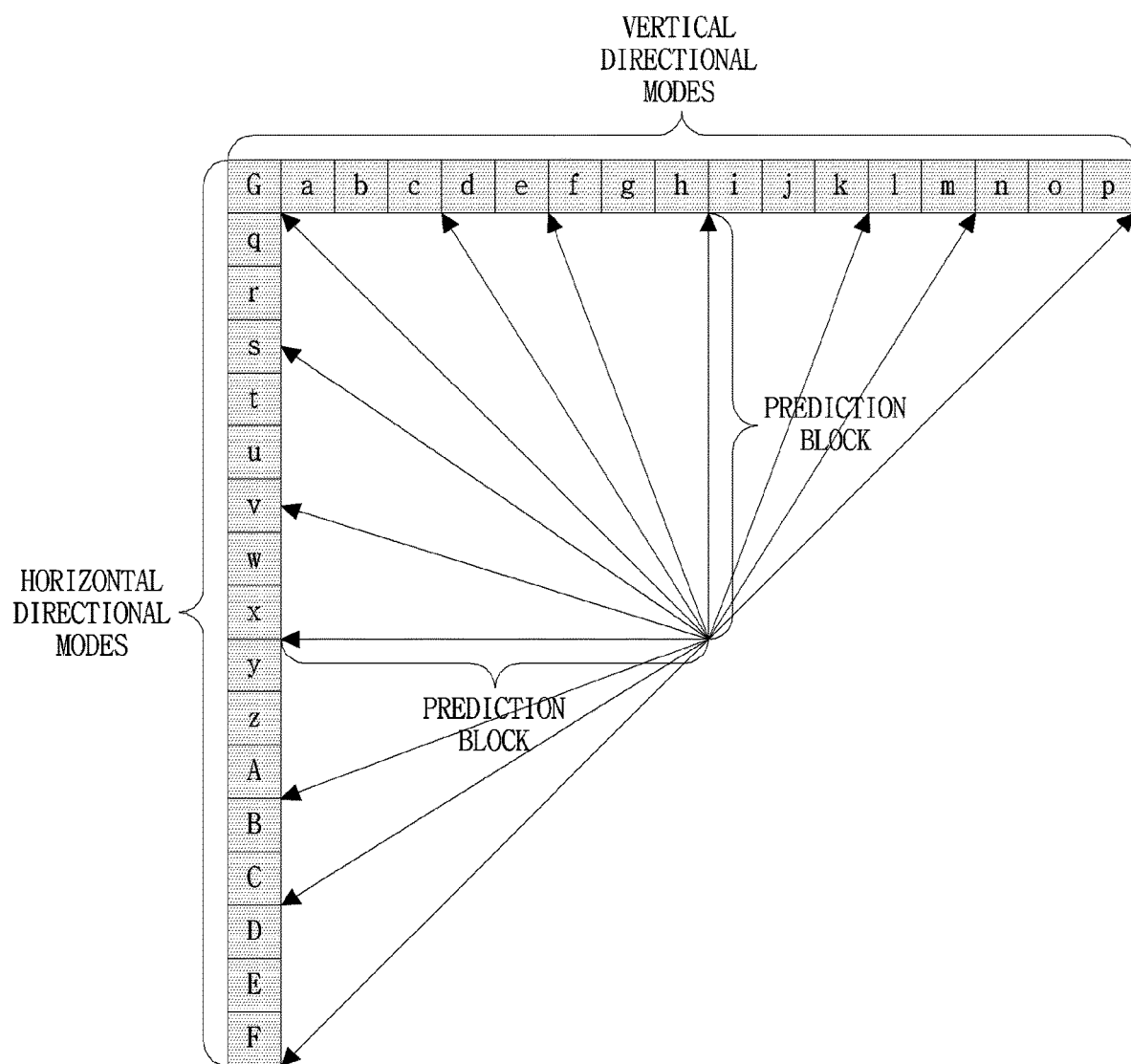

FIG. 36 and FIG. 37 are diagrams illustrating examples in which 13 directional prediction modes are available for the current encoding block.

Referring to FIG. 36, intra-prediction modes available for the current encoding block may be an integer unit directional prediction mode and a directional prediction mode adjacent to the integer unit directional prediction mode. For example, in FIG. 36, intra-prediction modes of a vertical direction, a horizontal direction and three diagonal directions, and intra-prediction modes (intra-prediction modes with an offset of ±1) adjacent thereto are shown as available directional prediction modes.

Referring to FIG. 37, directional prediction modes available for the current encoding block may be 13 directional prediction modes allocated at uniform intervals by partitioning an entire section of directional prediction modes into 12 equal parts.

When the number of intra-prediction modes available to the current prediction block increases, more intra-prediction modes adjacent to an integer unit directional prediction mode may be used, or an entire section of directional prediction modes may be partitioned into more parts.

Figure 38:
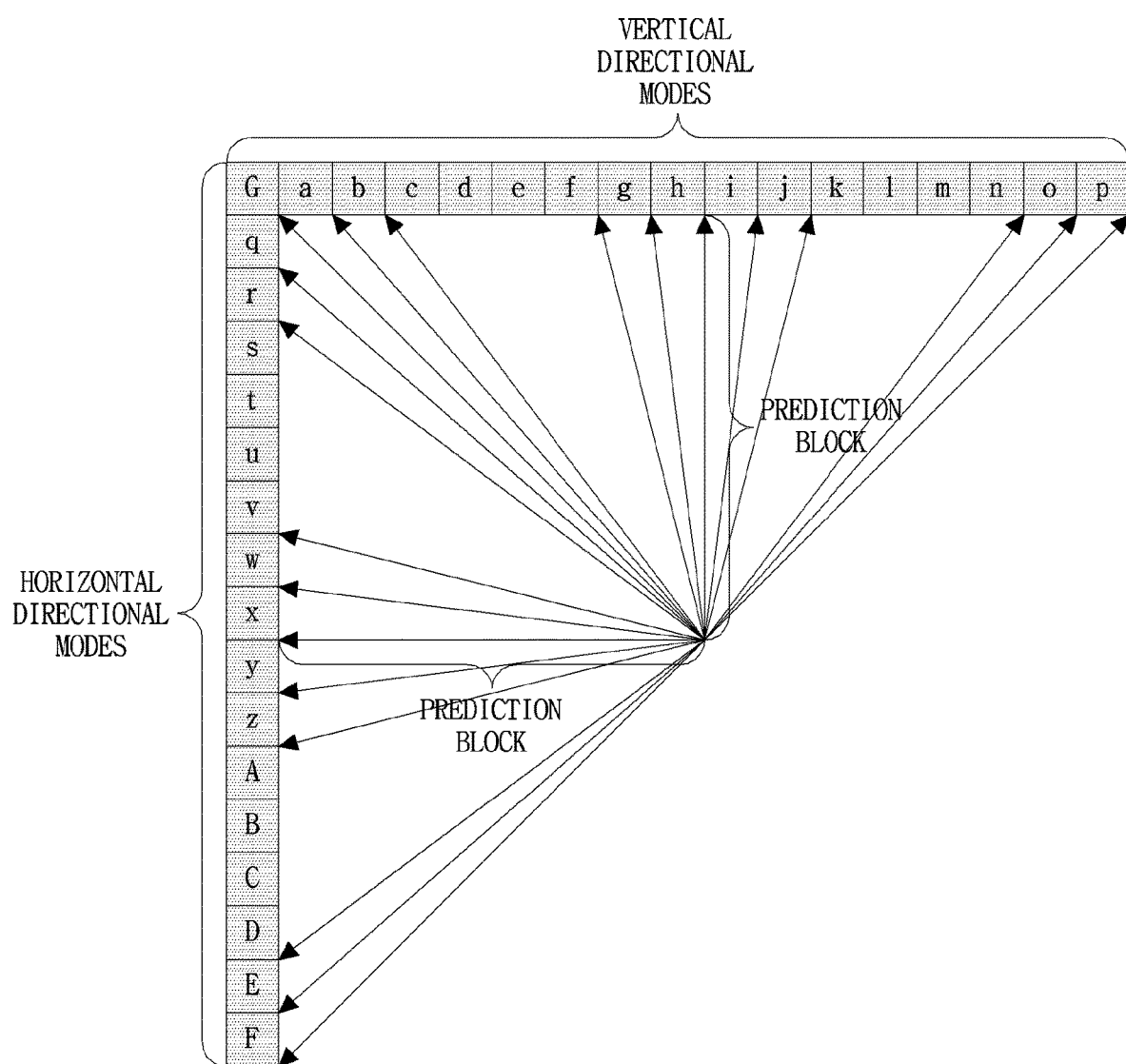
FIG. 38 and FIG. 39 are diagrams illustrating examples in which there are 21 directional prediction modes available for the current block.
Figure 39:
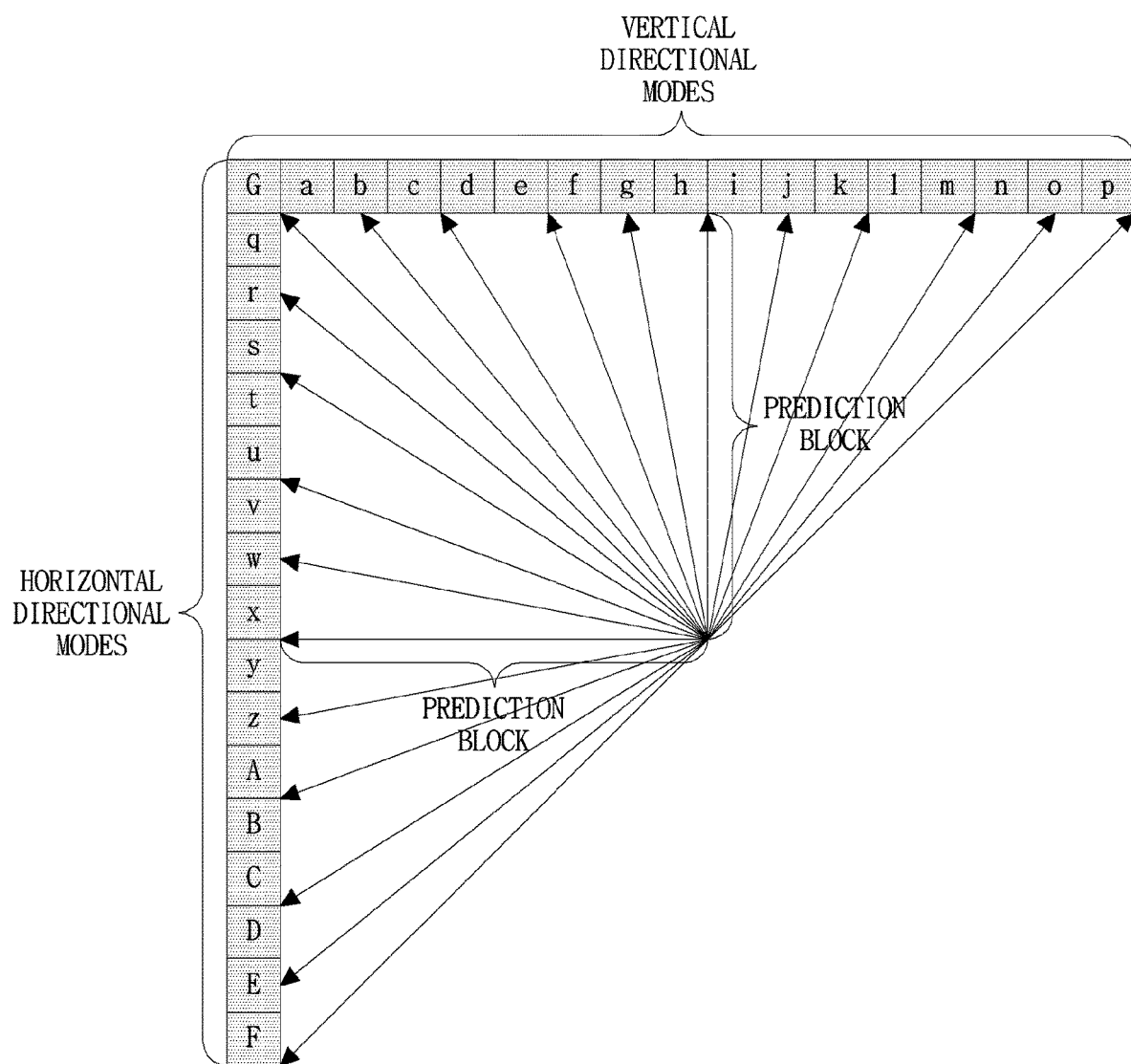

For example, FIG. 38 and FIG. 39 are diagrams illustrating examples in which there are 21 directional prediction modes available for the current block.

In FIG. 38, for intra-prediction modes available for the current encoding block, intra-prediction modes of a vertical direction, a horizontal direction and three diagonal directions, and intra-prediction modes (intra-prediction modes with an offset of ±2) adjacent thereto are shown as directional prediction modes available for the current encoding blocks.

In FIG. 39, it is shown that intra-prediction modes available for the current encoding block are 21 directional prediction modes allocated at uniform intervals by partitioning an entire section of directional prediction modes into 20 equal parts.

An encoding device may encode the number of intra-prediction modes available for each size of a prediction block, and may transmit the encoded number to a decoding device. Here, information indicating the number of intra-prediction modes available for each size of a prediction block may be encoded in an upper header. For example, assuming that a minimum size of a prediction block is 4×4 and a maximum size is 256×256, and when it is determined that the number of intra-prediction modes available for a prediction block smaller than or equal to 32×32 block is 64, a value ($\log_2 64$) which is obtained by applying log to the number of available intra-prediction modes may be encoded and transmitted to a decoding device. When it is determined that the number of intra-prediction modes available for a prediction block with 64×64 is 32, a value ($\log_2 32$) which is obtained by applying log to the number of available intra-prediction modes may be encoded, when it is determined that the number of intra-prediction modes available for a prediction block with 128×128 is 16, a value ($\log_2 16$) which is obtained by applying log to the number of available intra-prediction modes may be encoded, and when it is determined that the number of intra-prediction modes available for a prediction block with 256×256 is 8, a value ($\log_2 8$) which is obtained by applying log to the number of available intra-prediction modes may be encoded.

For additional example, the number of intra-prediction modes available for each size of a prediction block may be predetermined in an upper header, the number of intra-prediction modes optimal for each prediction block may be determined, and thus index information indicating the number of intra-prediction modes available in units of a prediction block may be encoded. For example, when the number of intra-prediction modes available for a 32×32 prediction block is 19, 35 or 67, an index information indicating which one of 19, 35 or 67 is optimal for the 32×32 prediction block may be encoded.

An encoding device may encode information indicating whether the number or type of intra-prediction modes is to be adjusted according to a size of a prediction block. The encoded information may be transmitted to a decoding device through an upper header. Here, the information may be a 1-bit flag, but is not limited thereto. The decoding device may determine in advance, based on the flag information, whether the number or type of intra-prediction modes is adjusted for each size of a prediction block.

Even when information encoded in an upper header indicates that the number of available intra-prediction modes may be adjusted according to a size of a prediction block, intra-prediction in a conventional method may be performed for a current encoding block, or intra-prediction may be performed by adjusting the number of available intra-prediction modes according to the size of the prediction block for the current encoding block. Accordingly, when the information encoded in the upper header indicates that the number of available intra-prediction modes may be adjusted according to the size of the prediction block, an encoding device may further encode, in units of a prediction block, information indicating whether the prediction block is encoded according to a conventional method (i.e., using a fixed number of intra-prediction modes) or the number of available intra-prediction modes is adjusted according to the size of the prediction block. Here, the encoded information may be a 1-bit flag, but is not limited thereto.

In S3502, it is shown that the number or type of intra-prediction modes may be controlled according to a shape of a current encoding block. In detail, the number of intra-prediction modes available for the current encoding block may be variably determined according to a shape of the current encoding block. For example, when the current block is a non-square block (e.g., a rectangle), it may be set for the current block that intra-prediction modes in horizontal direction may be used more than intra-prediction modes in vertical direction, or intra-prediction modes in vertical direction may be used more than intra-prediction modes in horizontal direction.

Specifically, when a shape of a current encoding block is non-square, the number of intra-prediction modes in horizontal direction and intra-prediction modes in vertical direction available for the current block may be determined according to a ratio of width and height of the current encoding block. For example, when the size of the current encoding block is 8×16, since the height is twice the width of the current encoding block, the number of horizontal intra-prediction modes may be about twice the number of horizontal intra-prediction modes available for the current encoding block. For example, when the number of directional intra-prediction modes available for the current coding block is 25, the current encoding block may be set to use 16 horizontal intra-prediction modes and 9 vertical intra-prediction modes.

The number of intra-prediction modes available for a current coding block may be determined by comparing a width or height of the current coding block with a predetermined threshold value. Here, the threshold value may be signaled through an upper header. For example, a value obtained by applying log ($Log_2$) to a threshold value may be signaled through an upper header. Alternatively, an encoding device and a decoding device may derive a threshold value under the same conditions. Here, the threshold value may be set for each of the width and the height, or the same value may be used for the width and the height. For example, when a threshold value for a width is 32, and when the width of the current encoding block is less than the threshold value, the current encoding block may use only ½N among N horizontal direction intra-prediction modes. For example, when the number of horizontal directional prediction mode is 33, the current coding block may use 17 horizontal directional prediction modes.

Regardless of a shape of a current encoding block, intra prediction modes available for the current encoding block may include a non-directional intra prediction mode (or a non-angular prediction mode). In addition, the number of directional prediction modes (i.e., angular prediction modes) available for the current encoding block may vary according to a shape of the current encoding block. As the number of intra-prediction modes available for the current encoding block decreases or increases, the number of directional prediction modes available for the current encoding block may also decrease or increase.

Directional prediction modes available for a current encoding block may be determined to be an integer unit directional prediction mode or a similar mode. Alternatively, directional prediction modes available for a current encoding block may be determined by partitioning an entire section of directional prediction modes by the number N of directional prediction modes to be used (N−1 equally partitioned). This has been described above with reference to FIG. 36 to FIG. 39, so that detailed description thereof will be omitted.

An encoding device may encode information indicating whether the number or type of intra-prediction modes is to be adjusted according to a shape of a prediction block. The encoded information may be transmitted to a decoding device through an upper header. Here, the information may be a 1-bit flag, but is not limited thereto. The decoding device may determine in advance, based on the flag information, whether or not the number or type of intra-prediction modes is adjusted for each shape of a prediction block.

Even when information encoded in an upper header indicates that the number of available intra-prediction modes may be adjusted according to a shape of a prediction block, intra-prediction in a conventional method may be performed for a current encoding block, or intra-prediction may be performed by adjusting the number of available intra-prediction modes according to the shape of the prediction block for the current encoding block. Accordingly, when the information encoded in the upper header indicates that the number of available intra-prediction modes may be adjusted according to the shape of the prediction block, an encoding device may further encode, in units of a prediction block, information indicating whether the prediction block is encoded according to a conventional method (i.e., using a fixed number of intra-prediction modes) or the number of available intra-prediction modes is adjusted according to the shape of the prediction block. Here, the encoded information may be a 1-bit flag, but is not limited thereto.

In S3503, it is shown that the number or type of intra-prediction modes may be controlled according to a neighboring block of a current encoding block. In detail, the number of intra-prediction modes available for a current encoding block may be determined according to intra-prediction modes of neighboring blocks neighboring the current encoding block.

For example, referring to statistics of intra-prediction modes of neighboring blocks of a current encoding block, when non-directional prediction modes and directional prediction modes are mixed and a ratio of the non-directional prediction modes and the directional prediction modes is equal to or greater than a threshold ratio or is equal to or smaller than the threshold ratio, intra-prediction characteristic of the current encoding block may be determined to be ambiguous. When it is determined that the intra-prediction characteristic of the current encoding block is ambiguous, the number or type of intra-prediction modes available for the current encoding block may not be changed. Accordingly, all intra-prediction modes may be used for the current encoding block.

For example, referring to intra-prediction modes of neighboring blocks of a current block, when there are 9 non-directional modes and 8 directional modes, and there are 4 horizontal modes and 4 vertical modes among the directional modes, it is difficult to determine which of the non-directional, vertical directional or horizontal directional mode is desirable for the current encoding block. When it is difficult to determine intra-prediction modes used mainly by neighboring prediction blocks because a ratio of non-directional prediction modes and directional prediction modes of the neighboring blocks neighboring the current prediction block is close to 1:1, or when it is difficult to determine main directionality of neighboring prediction blocks because the neighboring prediction blocks are encoded using directional prediction mode but horizontal directional modes and vertical directional modes are mixed, the number or type of intra-prediction modes available for the current encoding block may not be changed.

In addition, referring to statistics of intra-prediction modes neighboring a current encoding block, when it is determined that non-directional prediction modes are used more than directional prediction modes by more than a threshold ratio, prediction characteristics of the current encoding block may be determined to be a non-directional mode. In this case, intra-prediction modes available for the current encoding block may necessarily include a non-directional mode, and may additionally include a predetermined number of directional modes. When neighboring blocks of the current encoding block are mostly encoded through non-directional prediction modes, it is less likely that a contour having a specific directionality appears in the current encoding block. Accordingly, even when using only non-directional prediction modes, or using only non-directional prediction modes and a predetermined number of directional prediction modes (e.g., two prediction modes of a vertical directional prediction mode and a horizontal directional prediction mode), an optimal intra-prediction mode for the current encoding block may be identified.

Referring to statistics of intra-prediction modes neighboring a current encoding block, when it is determined that directional prediction modes are used more than non-directional prediction modes by more than a threshold ratio, prediction characteristics of the current encoding block may be determined to be a directional mode. When a ratio between horizontal directional prediction modes and vertical directional prediction modes for intra-prediction modes of neighboring blocks is skewed to one side (e.g., when horizontal directional prediction modes are used more than vertical directional prediction mode by a threshold ratio, when vertical directional prediction modes are used more than horizontal directional prediction mode by a threshold ratio, or the like), intra-prediction modes available for the current encoding block may be configured using directional prediction modes more used among horizontal directional prediction modes and vertical directional prediction modes. Here, intra-prediction modes available for the current encoding block may further include non-directional prediction modes in addition to horizontal directional or vertical directional prediction modes.

For example, when intra-prediction modes neighboring a current encoding block is all the directional prediction modes, and there are 11 horizontal directional modes and 2 vertical directional mode among intra-prediction modes of neighboring blocks, it is expected that the current block may have characteristics of horizontal direction. Accordingly, an optimal intra-prediction mode for the current encoding block may be determined using non-directional prediction modes and horizontal directional prediction modes.

In the above example, a threshold ratio (a threshold ratio as a criteria for directional modes and non-directional modes, a threshold ratio as a criteria for horizontal directional modes and vertical directional mode, and the like) may be signaled through an upper header. For example, a value obtained by applying log (log 2) to a threshold ratio may be transmitted through an upper header.

Regardless of intra-prediction modes neighboring a current encoding block, intra-prediction modes available for the current encoding block may include a non-directional intra-prediction mode (or a non-angular prediction mode). In addition, the number of directional prediction modes (i.e., angular prediction modes) available for a current encoding block may vary according to a pattern of using intra-prediction modes neighboring the current encoding block. As the number of intra-prediction modes available for the current encoding block decreases or increases, the number of directional prediction modes available for the current encoding block may also decrease or increase.

Directional prediction modes available for a current encoding block may be determined to be an integer unit directional prediction mode or a similar mode. Alternatively, directional prediction modes available for a current encoding block may be determined by partitioning an entire section of directional prediction modes by the number N of directional prediction modes to be used (N−1 equally partitioned). This has been described above with reference to FIG. 36 to FIG. 39, so that detailed description thereof will be omitted.

An encoding device may encode information indicating whether the number or type of intra-prediction modes is to be adjusted according to a pattern of using intra-prediction mode of neighboring blocks neighboring a prediction block. The encoded information may be transmitted to a decoding device through an upper header. Here, the information may be a 1-bit flag, but is not limited thereto. The decoding device may determine in advance, based on the flag information, whether or not the number or type of intra-prediction modes is adjusted for each shape of a prediction block.

Even when information encoded in an upper header indicates that the number of available intra-prediction modes may be adjusted according to a pattern of using intra-prediction mode of neighboring blocks neighboring a prediction block, intra-prediction in a conventional method may be performed for a current encoding block, or intra-prediction may be performed by adjusting the number of available intra-prediction modes according to the pattern of using intra-prediction mode of neighboring blocks for the current encoding block. Accordingly, when the information encoded in the upper header indicates that the number of available intra-prediction modes may be adjusted according to the pattern of using intra-prediction mode of neighboring blocks, an encoding device may further encode, in units of a prediction block, information indicating whether the prediction block is encoded according to a conventional method (i.e., using a fixed number of intra-prediction modes) or the number of available intra-prediction modes is adjusted according to the pattern of using intra-prediction mode of neighboring blocks. Here, the encoded information may be a 1-bit flag, but is not limited thereto.

FIG. 35 has been described with reference to encoding procedure, it is also possible in a decoding procedure to adjust the number of intra-prediction modes available for a current block subjected to decoding. A decoding device may adjust the number of intra-prediction modes available for a current decoding block in consideration of a size, a shape, a pattern of using intra-prediction mode of neighboring decoding block, or the like, based on information signaled through a bitstream.

When the number of intra-prediction modes available for a current encoding block is determined, an encoding device may determine an intra-prediction mode of the current encoding block among intra-prediction modes available for the current encoding block, and may encode information on the determined intra-prediction mode. Hereinafter, a method of encoding/decoding an intra-prediction mode for a current block will be described in detail.

FIG. 40 is a flowchart illustrating a procedure of encoding an optimal intra-prediction mode for a current encoding block.

Referring to FIG. 40, firstly, an encoding device may determine an MPM candidate for a current encoding block (S4001). Here, considering that the number of directional prediction modes available for the current encoding block and those for neighboring blocks of the current encoding block are different, the encoding device may set, for directional prediction mode, a quantized directional prediction mode (or an angle of a quantized directional prediction mode) as an MPM candidate.

For example, FIG. 41 is a diagram illustrating an example of setting an MPM candidate. In FIG. 41, it is exemplified that three MPM candidates are used. In the example shown in FIG. 41, L may be an intra-prediction mode having a highest occurrence frequency among neighboring blocks adjacent to a left side of a current encoding block, or may be an intra-prediction mode of a neighboring block (or any neighboring block) at a predetermined position adjacent to a left side of a current encoding block. Further, A may be an intra-prediction mode having a highest occurrence frequency among neighboring blocks adjacent to a top side a current encoding block, or may be an intra-prediction mode of a neighboring block (or any neighboring block) at a predetermined position adjacent to a top side of a current encoding block.

The L, L−1, L+1 and A may represent an index of an intra-prediction mode. When the number of directional prediction modes available for the current encoding block and those for neighboring blocks of the current encoding block are different, a case may occur in which a directional prediction mode used by a neighboring block is not available for the current encoding block. For example, mode 18 among intra-prediction modes available for the current encoding block may refer to a horizontal directional prediction mode, whereas, mode 18 among intra-prediction modes available for a neighboring block may refer to a top left directional prediction mode, not a horizontal directional mode.

In order to solve this inconsistency, when a non-directional prediction mode is assigned to an MPM candidate, index information may be used as it is, when a directional prediction mode is assigned to an MPM candidate, a prediction angle corresponding to the directional prediction mode may be assigned. As a quantized angle is set as an MPM candidate, an encoding device may determine an intra-prediction mode for a current encoding block, based on whether a prediction angle of an optimal directional prediction mode for the current encoding block is equal to a quantization angle included in MPM candidates. Accordingly, when an MPM candidate is a non-directional prediction mode, an index of an intra-prediction mode such as L, L−1, L+1, A, etc. may be used as an MPM candidate, whereas when an MPM candidate is a directional prediction mode, an angle of an intra-prediction mode such as L', (L−1)', (L+1)', A', etc. may be used as an MPM candidate.

When a directional prediction mode matching with a prediction angle of a neighboring block is not available for a current encoding block, quantization that the prediction angle of the neighboring block is reduced to be most similar to a prediction angle of a directional mode available for the current prediction block may be performed. Accordingly, when an MPM candidate is a directional prediction mode, a MPM candidate indicating a quantized angle of a directional prediction mode such as L', (L−1)', (L+1)', A', etc. may be used.

Figure 42:
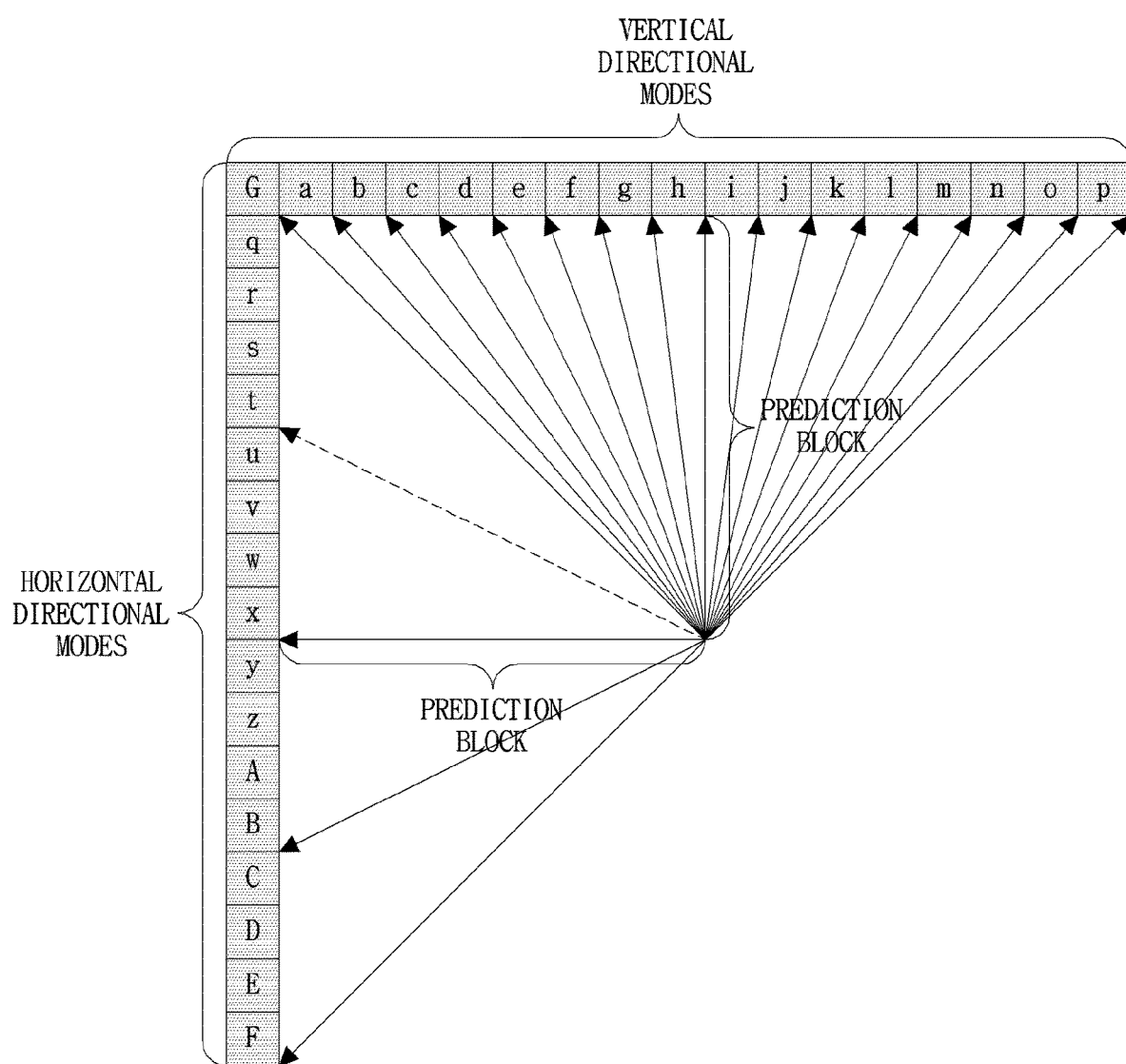
FIG. 42 and FIG. 43 are diagrams illustrating examples of quantizing a prediction angle.
Figure 43:
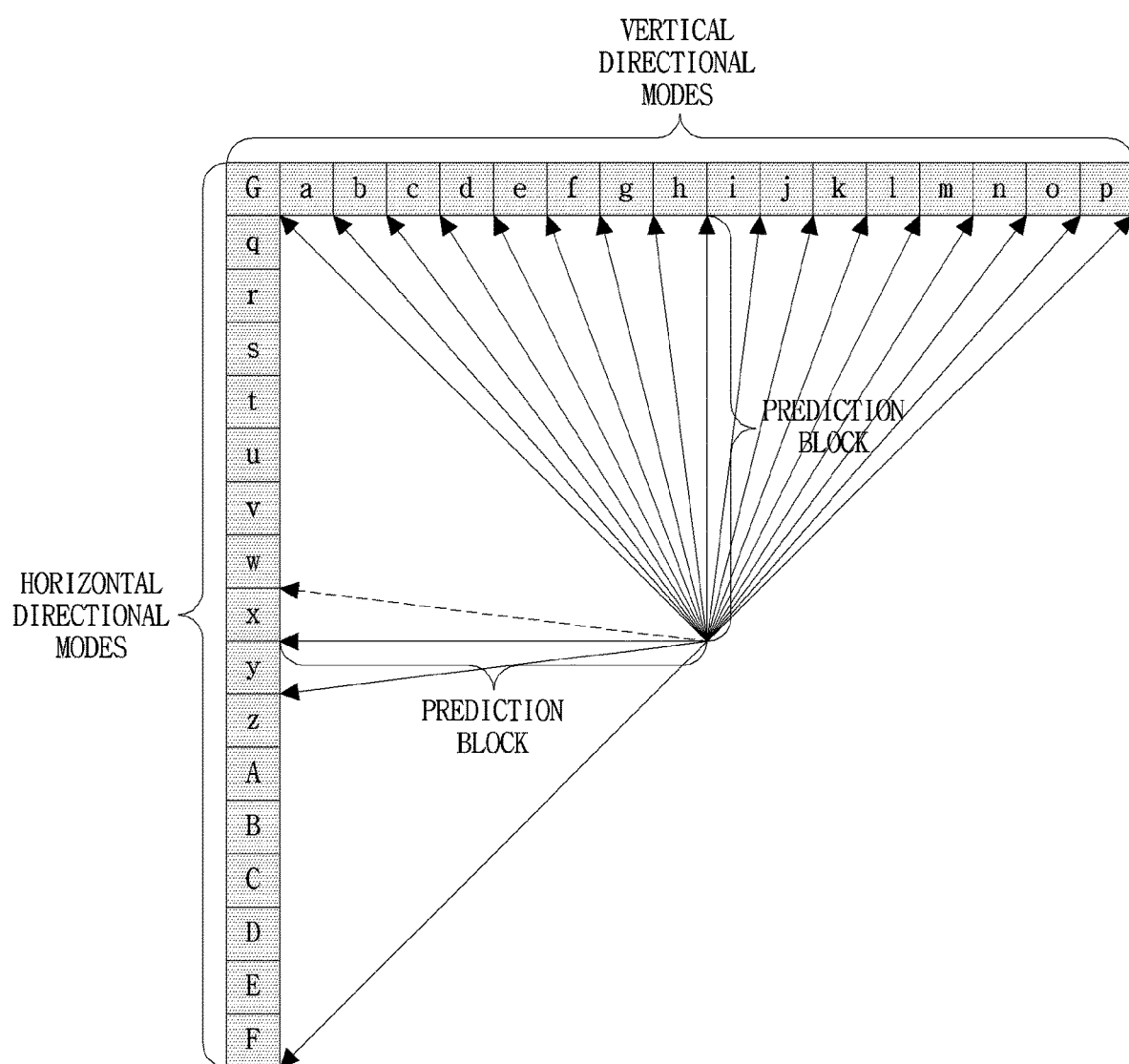

For example, FIG. 42 and FIG. 43 are diagrams illustrating examples of quantizing a prediction angle. FIG. 43 shows directional prediction modes available for neighboring blocks adjacent to a current encoding block, and FIG. 42 shows directional prediction modes available for the current encoding block. Comparing FIG. 42 and FIG. 43, it may be confirmed that directional prediction modes indicated by a dotted line in FIG. 43 are not available for the current encoding block. Accordingly, when a neighboring block is encoded using a directional prediction mode indicated by the dotted line, a prediction angle of the directional prediction mode indicated by the dotted line may be converted to a prediction angle of a most similar prediction mode among directional prediction modes available for the current block and the converted angle may be set as an MPM candidate.

In the above-described embodiment, it has been described that an MPM candidate may be set as a prediction angle for a directional prediction mode, considering a case where the number of directional prediction modes available for a current encoding block and those for neighboring blocks of the current encoding block are different.

For additional example, when the number of directional prediction modes available for a current encoding block and those for neighboring blocks of the current encoding block are equal, an MPM candidate may indicate an index of an intra-mode also for a directional prediction mode. Alternatively, when the number of directional prediction modes available for a current encoding block and those for neighboring blocks of the current encoding block are different, the MPM candidate may be set to indicate an index of an intra-prediction mode also for a directional prediction mode. In this case, a directional prediction mode of a neighboring block may be quantized (or converted) into an index of a mode having the most similar direction among directional prediction modes available for the current block.

FIG. 44 is a diagram illustrating another example of setting an MPM candidate.

An encoding device may derive an MPM candidate for a current encoding block based on neighboring blocks adjacent to the current encoding block. Here, the neighboring block adjacent to the current encoding block may include at least one of a block adjacent to a top side of the current encoding block, a block adjacent to a left side of the current encoding block and a block adjacent to a corner of the current encoding block.

For example, FIG. 45 is a diagram illustrating an example of neighboring blocks used to derive an MPM candidate of a current encoding block. Referring to FIG. 45, in order to derive an MPM candidate of a current encoding block, a left neighboring block A, a top neighboring block B, a left bottom neighboring block C, a right top neighboring block D and a left top neighboring block E may be used.

An encoding device may generate an MPM candidate according to a priority shown in FIG. 44. Assuming that the number of MPM candidates of a current encoding block is 5, firstly, intra-prediction modes of neighboring blocks may be added as MPM candidates in an order of a neighboring block A and a neighboring block B. Next, non-directional modes such as Planar mode and DC mode may be added as MPM candidates. Next, intra-prediction modes of neighboring blocks may be added as MPM candidates in an order of the neighboring block C, the neighboring block D and the neighboring block E.

When the number of MPM candidates does not reach a maximum number, and when there is a directional mode in MPM candidates that have been determined so far, an encoding device may add a mode (e.g., a directional mode with an offset of ±1) having a direction similar to a directional mode as an MPM candidate.

Nevertheless, when the number of MPM candidates does not reach the maximum number, a vertical mode, a horizontal mode, and a prediction mode in a diagonal direction (e.g., a prediction mode in a left bottom direction (a prediction mode with index 2), a prediction mode in a left top direction, a prediction mode in a right top direction, or the like) may be added to MPM candidates.

In FIG. 45, it is shown that MPM candidates may be derived from neighboring blocks adjacent to a current encoding block. In the embodiment shown in FIG. 41 and FIG. 44, an MPM candidate may be derived based on an intra-prediction mode of neighboring block not adjacent to a current encoding block, according to a size, a shape, or decoding state of the current encoding block or a neighboring block adjacent to the current encoding block.

Figure 46:
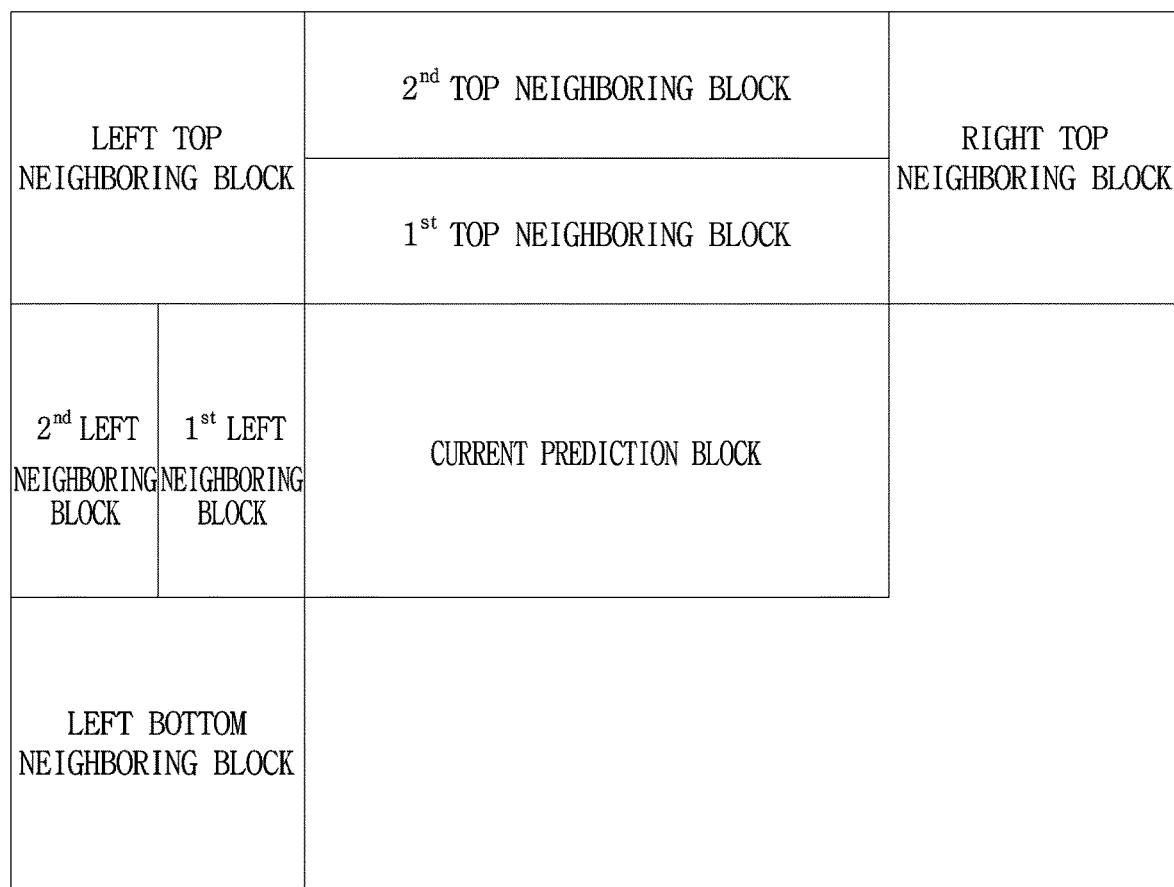
FIG. 46 is a diagram illustrating an example of deriving an MPM candidate from a neighboring block that is not adjacent to a current encoding block.

For example, FIG. 46 is a diagram illustrating an example of deriving an MPM candidate from a neighboring block that is not adjacent to a current encoding block.

When there are non-square blocks (e.g., a rectangular block having a width larger than a height) continuously in a top direction of a current encoding block, and a height of a top neighboring block adjacent to the current encoding block is smaller than a height of the current encoding block, an encoding device may predict that an intra-prediction mode of the top neighboring block is not the same as an intra-prediction mode of the current encoding block. Alternatively, when an intra-prediction mode of the neighboring block adjacent to the top side of the current encoding block is one of vertical directional prediction modes, the encoding device may predict that an intra-prediction mode of the top neighboring block is not the same as an intra-prediction mode of the current encoding block.

In this case, the encoding device may consider deriving additional MPM candidates from at least one of blocks adjacent to the current encoding block, i.e., a left, left top, right top and left bottom neighboring blocks. Alternatively, the encoding device may derive an additional MPM candidate from a block adjacent to the neighboring block, which is not adjacent to the current encoding block. For example, in the embodiment shown in FIG. 23, the encoding device may derive an MPM candidate based on, instead of a block adjacent to a top side of the current encoding block (i.e., 1st top neighboring block), a second top block (i.e., 2nd top neighboring block) or a block located further in top direction. Alternatively, the encoding device may consider an MPM candidate using only an intra-prediction mode of a neighboring block in a specific direction other than the top direction.

When there are non-square blocks (e.g., a rectangular block having a height larger than a width) continuously in a left direction of a current encoding block, and a width of a left neighboring block adjacent to the current encoding block is smaller than a width of the current encoding block, an encoding device may predict that an intra-prediction mode of the left neighboring block is not the same as an intra-prediction mode of the current encoding block. Alternatively, when an intra-prediction mode of the neighboring block adjacent to the left side of the current encoding block is one of horizontal directional prediction modes, the encoding device may predict that an intra-prediction mode of the left neighboring block is not the same as an intra-prediction mode of the current encoding block.

In this case, the encoding device may consider deriving additional MPM candidates from at least one of blocks adjacent to the current encoding block, i.e., a top, left top, right top and left bottom neighboring blocks. Alternatively, the encoding device may derive an additional MPM candidate from a block adjacent to the neighboring block, which is not adjacent to the current encoding block. For example, in the embodiment shown in FIG. 46, the encoding device may derive an MPM candidate based on, instead of a block adjacent to a left side of the current encoding block (i.e., 1st left neighboring block), a second left block (i.e., 2nd left neighboring block) or a block located further in left direction. Alternatively, the encoding device may consider an MPM candidate using only an intra-prediction mode of a neighboring block in a specific direction other than the left direction.

When MPM candidates of the current encoding block is determined, it is possible to determine whether there is an MPM candidate identical to an intra-prediction mode of the current encoding block by comparing the intra-prediction mode of the current encoding block with the MPM candidates. The encoding device may encode information indicating whether there is an MPM candidate identical to the intra-prediction mode of the current encoding block, according to the determination result (S4002). For example, when there is an MPM candidate identical to the intra-prediction mode of the current encoding block, the information is encoded as true, and when there is no MPM candidate identical to the intra-prediction mode of the current encoding block, the information is encoded as false.

When it is determined that there is an MPM candidate identical to the intra-prediction mode of the current encoding block (S4003), the encoding device may encode index information specifying an MPM candidate identical to the intra-prediction mode of the current encoding block among MPM candidates (S4004).

In addition, when it is determined that there is no MPM candidate identical to the intra-prediction mode of the current encoding block (S4003), the encoding device may encode an intra-prediction mode optimal for the current encoding block among intra-prediction modes excluding intra-prediction modes set as the MPM candidates (S4005). Specifically, among all the intra-prediction modes available for the current encoding block, after excluding intra-prediction modes set as the MPM candidates, by allocating bits so as to represent residual intra-prediction modes, information corresponding to the intra-prediction mode of the current encoding block among the residual prediction modes may be encoded.

When encoding residual intra-prediction modes, in allocating bits, it is possible to allocate fixed bits so as to represent the residual intra-prediction modes, but it is also possible to divide the residual intra-prediction modes into N groups and to differently set allocation bits for each groups. For example, when the number of intra-prediction modes available in the current encoding block is 67 and the number of MPM candidates is 6, the number of residual intra-prediction modes is 61. Here, when dividing the residual intra-prediction modes into two groups (A, B), 16 intra-prediction modes may by allocated to the group A and 45 intra-prediction modes may be allocated to the group B. Here, flag information for indicating to which group the intra-prediction mode of the current encoding block belongs may be encoded. For the group A, intra-prediction modes of the current encoding block may be encoded by allocating 4 bits, and for the group B, the group B may be divided again into two sub-groups (B-1, B-2), 19 intra-prediction modes may be allocated to the group B-1, 26 intra-prediction modes may be allocated to the group B-2, 5 bits may be allocated to the group B-1, and 6 bits may be allocated to the group B-2 to encode the intra-prediction mode of the current encoding block. The encoded information may be encoded and transmitted to a decoding device through a bitstream.

Next, a description will be given of decoding the intra-prediction mode for a current decoding block in a decoding device.

Figure 47:
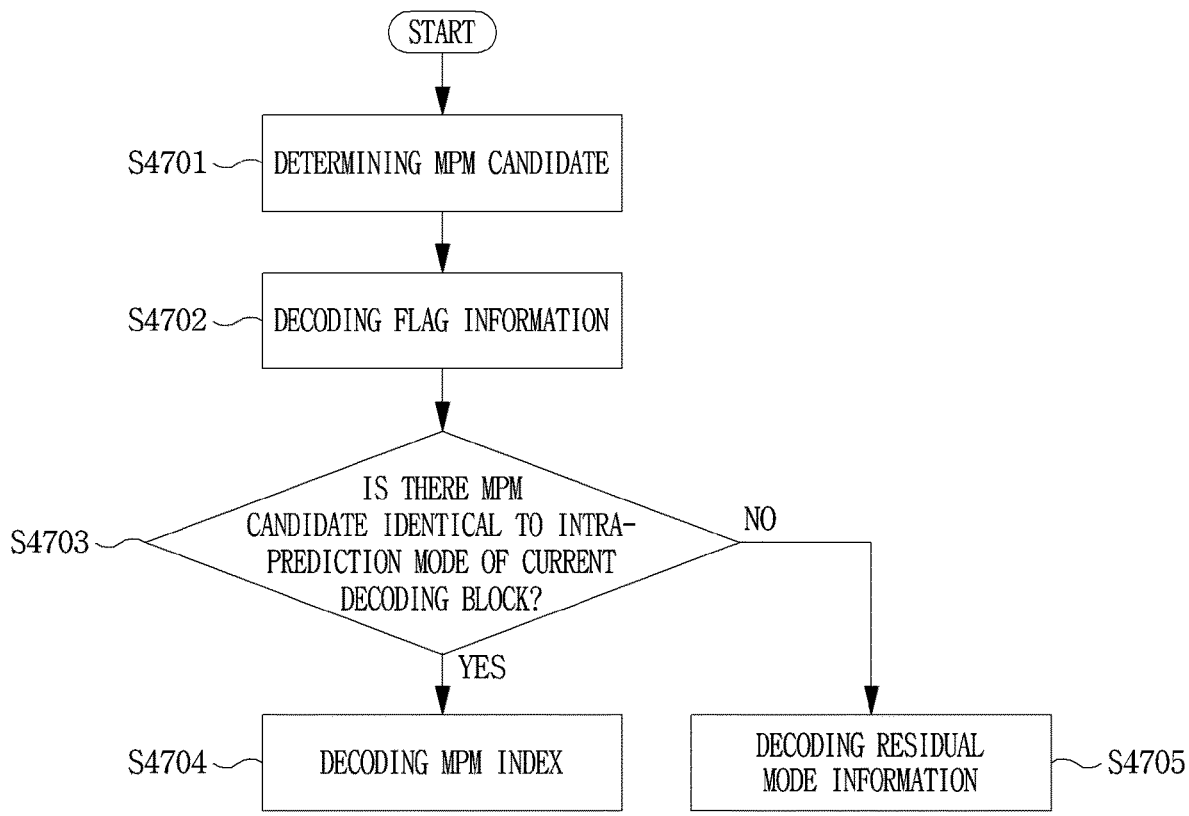
FIG. 47 is a flowchart illustrating a procedure of decoding an intra-prediction mode for a current decoding block.

FIG. 47 is a flowchart illustrating a procedure of decoding an intra-prediction mode for a current decoding block.

Referring to FIG. 47, a decoding device may determine an MPM candidate for a current decoding block (S4701). The decoding device may determine the MPM candidate for the current decoding block in consideration of intra-prediction modes of neighboring blocks neighboring the current decoding block as in the encoding procedure described above.

Thereafter, the decoding device may decode, from a bitstream, information indicating whether there is an MPM candidate identical to an intra-prediction mode of the current decoding block among the MPM candidates (S4702). The information may be a 1-bit flag, but is not limited thereto.

When it is determined that there is an MPM candidate identical to the intra-prediction mode of the current decoding block (S4703), the decoding device may decode index information specifying an MPM candidate identical to the intra-prediction mode of the current decoding block among the MPM candidates (Step S4704).

In addition, when it is determined that there is no MPM candidate identical to the intra-prediction mode of the current decoding block (S4703), the decoding device may decode residual prediction mode information indicating a prediction mode optimal for the current decoding block among residual intra-prediction modes excluding intra-prediction modes set as the MPM candidates.

In the above-described example, an intra-prediction mode of a current encoding/decoding block is determined using MPM candidates, but the intra-prediction mode of the current encoding/decoding block may be determined without using the MPM candidates. In this case, information specifying the intra-prediction mode of the current encoding/decoding block may be transmitted to the decoding device through a bitstream.

Although the exemplary methods of this disclosure are represented by a series of steps for clarity of explanation, they are not intended to limit the order in which the steps are performed, and if necessary, each step may be performed simultaneously or in a different order. In order to implement the method according to the present disclosure, it is possible to include other steps to the illustrative steps additionally, exclude some steps and include remaining steps, or exclude some steps and include additional steps.

The various embodiments of the disclosure are not intended to be exhaustive of all possible combination, but rather to illustrate representative aspects of the disclosure, and the features described in the various embodiments may be applied independently or in a combination of two or more.

In addition, various embodiments of the present disclosure may be implemented by hardware, firmware, software, or a combination thereof. A case of hardware implementation may be performed by one or more application specific integrated circuits (ASICs), digital signal processors (DSPs), digital signal processing devices (DSPDs), programmable logic devices (PLDs), field programmable gate arrays (FPGAs), a general processor, a controller, a microcontroller, a microprocessor, and the like.

The scope of the present disclosure is to encompass software or machine-executable instructions (e.g., operating system, applications, firmware, instructions, and the like) by which operations according to method of various embodiments are executed on a device or a computer, and non-transitory computer-readable media executable on the device or the computer, on which such software or instructions are stored.

INDUSTRIAL APPLICABILITY

The present invention may be applied to processing image signal.

The invention claimed is:

1. A method for decoding a video signal, comprising:
   receiving a bitstream including encoding information of a transform block, the encoding information including a flag indicating whether a current coefficient of the transform block is a non-zero coefficient;
   entropy-decoding the flag of the current coefficient by considering previous coefficients; and
   decoding the transform block based on the entropy-decoded flag,
   wherein entropy-decoding the flag comprises:
   calculating a number of non-zero coefficients among the previous coefficients;
   deriving probability information relating to the flag of the current coefficient by considering the number of the non-zero coefficients; and
   decoding the flag of the current coefficient using the probability information,
   wherein the previous coefficients are representative of residual coefficients encoded before the current coefficient according to a scan type,
   wherein, when a coordinate of the current coefficient is [x, y], coordinates of the previous coefficients include at least one of [x+2, y], [x, y+2] or [x+1, y+1], and
   wherein the scan type is determined based on at least one of transform block related information, intra-prediction related information, or prediction related information.

2. The method of claim 1, wherein a number of the previous coefficients to be considered for the entropy-decoding of the flag of the current coefficient is greater than 2.

3. The method of claim 1, wherein all of the previous coefficients to be considered for the entropy-decoding of the flag of the current coefficient belong to only a same transform block as the current coefficient.

4. A method for encoding a video signal, comprising:
   obtaining encoding information of a transform block by encoding the transform block; and
   generating a bitstream including the encoding information of the transform block,
   wherein the encoding information includes a flag of a current coefficient in the transform block, the flag indicating whether the current coefficient is a non-zero coefficient,
   wherein obtaining the encoding information comprises entropy-encoding the flag by considering previous coefficients,
   wherein entropy-encoding the flag comprises:
   calculating a number of non-zero coefficients among the previous coefficients;

deriving probability information relating to the flag of the current coefficient by considering the number of the non-zero coefficients; and encoding the flag of the current coefficient using the probability information, wherein the previous coefficients are representative of residual coefficients encoded before the current coefficient according to a scan type, wherein, when a coordinate of the current coefficient is [x, y], coordinates of the previous coefficients include at least one of [x+2, y], [x, y+2] or [x+1, y+1], and wherein the scan type is determined based on at least one of transform block related information, intra-prediction related information, or prediction related information.

5. The method of claim 4, wherein a number of the previous coefficients to be considered for the entropy-decoding of the flag of the current coefficient is greater than 2.

6. The method of claim 4, wherein all of the previous coefficients to be considered for the entropy-encoding of the flag of the current coefficient belong to only a same transform block as the current coefficient.

7. A non-transitory computer-readable medium for storing data associated with a video signal, comprising:

a data stream stored in the non-transitory computer-readable medium, the data stream comprising encoding information obtained by encoding a transform block, wherein the encoding information includes a flag indicating whether a current coefficient of the transform block is a non-zero coefficient, and wherein the flag is entropy-decoded by considering previous coefficients, wherein entropy-decoding the flag comprises:

calculating a number of non-zero coefficients among the previous coefficients;

deriving probability information relating to the flag of the current coefficient by considering the number of the non-zero coefficients; and decoding the flag of the current coefficient using the probability information, wherein the previous coefficients are representative of residual coefficients encoded before the current coefficient according to a scan type, wherein, when a coordinate of the current coefficient is [x, y], coordinates of the previous coefficients include at least one of [x+2, y], [x, y+2] or [x+1, y+1], and wherein the scan type is determined based on at least one of transform block related information, intra-prediction related information, or prediction related information.

8. The non-transitory computer-readable medium of claim 7, wherein a number of the previous coefficients to be considered for the entropy-decoding of the flag of the current coefficient is greater than 2.

9. The non-transitory computer-readable medium of claim 7, wherein all of the previous coefficients to be considered for the entropy-decoding of the flag of the current coefficient belong to only a same transform block as the current coefficient.

* * * * *